(12) United States Patent
Guo et al.

(10) Patent No.: US 10,321,414 B2
(45) Date of Patent: Jun. 11, 2019

(54) DOWNLINK INFORMATION PROCESSING METHOD AND DEVICE

(71) Applicant: Huawei Technologies Co., Ltd., Shenzhen (CN)

(72) Inventors: Fangfu Guo, Shanghai (CN); Xiaoying Xu, Shanghai (CN); Dong Chen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 165 days.

(21) Appl. No.: 14/868,345

(22) Filed: Sep. 28, 2015

(65) Prior Publication Data
US 2016/0021623 A1  Jan. 21, 2016

Related U.S. Application Data

(63) Continuation of application No. PCT/CN2013/089405, filed on Dec. 13, 2013.

(30) Foreign Application Priority Data

Apr. 3, 2013 (WO) ................ PCT/CN2013/073711
Nov. 1, 2013 (WO) ................ PCT/CN2013/086448

(51) Int. Cl.
*H04W 4/00* (2018.01)
*H04W 52/26* (2009.01)
(Continued)

(52) U.S. Cl.
CPC ......... *H04W 52/265* (2013.01); *H04L 1/1887* (2013.01); *H04W 36/18* (2013.01);
(Continued)

(58) Field of Classification Search
CPC .......... H04B 7/00; H04W 4/00; H04W 52/24; H04W 72/08; H04W 52/143;
(Continued)

(56) References Cited

U.S. PATENT DOCUMENTS 7,283,782 B2 * 10/2007 Sinnarajah ............ H04W 36/08
455/3.01
7,433,337 B2 * 10/2008 Chao .................... H04L 1/0003
370/235
(Continued)

FOREIGN PATENT DOCUMENTS

CN        1505301 A     6/2004
CN        1511384 A     7/2004
(Continued)

OTHER PUBLICATIONS

"$3^{rd}$ Generation Partnership Project; Technical Specification Group Radio Access Network; Radio Resource Control (RRC); Protocol specification (Release 11)," 3GPP TS 25.331, V11.5.0, pp. 1-2079, $3^{rd}$ Generation Partnership Project, Valbonne, France (Mar. 2013).
(Continued)

*Primary Examiner* — Hanh N Nguyen
(74) *Attorney, Agent, or Firm* — Leydig, Voit & Mayer, Ltd.

(57) ABSTRACT

Embodiments of the present invention provide a downlink information processing method and a device. The method includes: determining, by UE, whether a communication link between a cell in an active set and the UE meets a preset communication quality requirement; and if the communication link between the cell in the active set and the UE does not meet the preset communication quality requirement, stopping, by the UE, processing downlink information that is sent from a base station by using the communication link; therefore, transmission performance of the UE is not affected.

19 Claims, 14 Drawing Sheets

---

UE determines whether a communication link between a cell in an active set and the UE meets a preset communication quality requirement — 101

If the communication link between the cell in the active set and the UE does not meet the preset communication quality requirement, the UE stops processing downlink information that is sent by a base station by using the communication link — 102

(51) Int. Cl.
*H04W 36/30* (2009.01)
*H04L 1/18* (2006.01)
*H04W 52/14* (2009.01)
*H04W 72/04* (2009.01)
*H04W 36/18* (2009.01)
*H04W 52/24* (2009.01)
*H04W 52/44* (2009.01)
*H04M 1/725* (2006.01)
*H04W 52/38* (2009.01)

(52) U.S. Cl.
CPC ......... *H04W 36/30* (2013.01); *H04W 52/143* (2013.01); *H04W 52/146* (2013.01); *H04W 52/247* (2013.01); *H04W 52/248* (2013.01); *H04W 52/44* (2013.01); *H04W 72/042* (2013.01); *H04W 72/0413* (2013.01); *H04M 1/725* (2013.01); *H04W 52/386* (2013.01)

(58) Field of Classification Search
CPC ... H04W 52/30; H04W 52/146; H04W 52/08; H04W 52/26; H04W 52/241; H04W 52/40; H04W 56/001; H04W 52/18; H04W 24/10; H04W 36/00; H04W 36/06; H04W 36/24; H04W 56/00; H04W 36/08
See application file for complete search history.

(56) References Cited

U.S. PATENT DOCUMENTS

| | | | | |
|---|---|---|---|---|
| 7,647,064 | B2* | 1/2010 | Nakada | H04W 52/30 370/335 |
| 7,965,679 | B2* | 6/2011 | Ranta-aho | H04W 52/146 370/329 |
| 8,160,075 | B2* | 4/2012 | Kazmi | H04W 52/146 370/395.42 |
| 8,805,398 | B2* | 8/2014 | Morita | H04W 52/143 370/311 |
| 9,088,940 | B2* | 7/2015 | Marco | H04W 56/00 |
| 2004/0009782 | A1 | 1/2004 | Shimizu | |
| 2004/0166884 | A1 | 8/2004 | Oh et al. | |
| 2011/0223855 | A1 | 9/2011 | Frenger et al. | |
| 2012/0213092 | A1 | 8/2012 | Sun et al. | |
| 2014/0185528 | A1 | 7/2014 | Shimezawa et al. | |

FOREIGN PATENT DOCUMENTS

| | | |
|---|---|---|
| CN | 1614916 A | 5/2005 |
| CN | 1705396 A | 12/2005 |
| CN | 101296029 A | 10/2008 |
| CN | 101827419 A | 9/2010 |
| CN | 102938915 A | 2/2013 |
| EP | 1437906 A1 | 7/2004 |
| JP | 2003338786 A | 11/2003 |
| JP | 2011091734 A | 5/2011 |
| JP | 2012509611 A | 4/2012 |
| JP | 2013042264 A | 2/2013 |
| WO | WO 0076085 A1 | 12/2000 |
| WO | WO 2006081874 A1 | 8/2006 |
| WO | WO 2012002895 A1 | 1/2012 |
| WO | WO 2012112868 A1 | 8/2012 |
| WO | WO 2013024742 A1 | 2/2013 |

OTHER PUBLICATIONS

"TSN reset for common E-DCH resource release," 3GPP TSG RAN WG3 Meeting #79bis, Chicago, USA, R3-130512, 3rd Generation Partnership Project, Valbonne, France (Apr. 15-19, 2013).

"Discussions on the solution to keep the macro cell in the active set," 3GPP TSG-RAN WG2 Meeting #84, San Francisco, USA, R2-134220, pp. 1-6, 3rd Generation Partnership Project, Valbonne, France (Nov. 11-15, 2013).

"Further discussions on the solution to keep the macro cell in the active set," 3GPP TSG-RAN WG2 Meeting #85, Prague, Czech Republic, R2-140300, pp. 1-5, 3rd Generation Partnership Project, Valbonne, France (Feb. 10-14, 2014).

* cited by examiner

DOWNLINK INFORMATION PROCESSING METHOD AND DEVICE

CROSS-REFERENCE TO RELATED APPLICATIONS

This application is a continuation of International Patent Application No. PCT/CN2013/089405, filed on Dec. 13, 2013, which claims priority to International Patent Application No. PCT/CN2013/086448, filed on Nov. 1, 2013, and International Patent Application No. PCT/CN2013/073711, filed on Apr. 3, 2013, all of which are hereby incorporated by reference in their entireties.

TECHNICAL FIELD

Embodiments of the present invention relate to communications technologies, and in particular, to a downlink information processing method and a device.

BACKGROUND

A heterogeneous network (Hetnet) is a network formed by cells of different sizes and types, for example, a macro cell, a micro cell, a pico cell, a femto cell, and a cell in a form of a remote radio head (RRH).

In a scenario of intra-frequency deployment of the Hetnet, when user equipment (UE) moves from a micro cell to a macro cell or another micro cell, signal quality of a communication link between the UE and the micro cell decreases. The UE may report a quality up event (1A event) of the macro cell or another micro cell to a network side by using the communication link, and then the UE may receive an active set update (ASU) message that is sent from the network side by using the communication link and used for instructing the UE to add the macro cell or micro cell to an active set. However, because the signal quality of the communication link decreases quickly, the UE may fail to receive the ASU of the network side, thereby failing to add the macro cell or micro cell to the active set, and further causing a cell handover failure of the UE. Therefore, in the prior art, the network side increases a value of an event report evaluation parameter, such as a cell individual offset (CIO), of the macro cell or micro cell, so that the UE can report earlier the 1A event of the macro cell or micro cell and delay reporting a quality down event (1B event), and after reporting the 1B event, still retain the macro cell or micro cell in the active set; in this way, the macro cell or micro cell is added earlier to the active set and deletion of the macro cell or micro cell from the active set is delayed, thereby ensuring a cell handover success rate of the UE.

However, in a case in which the macro cell or micro cell is added to the active set, signal quality of a communication link between the UE and the macro cell or micro cell may be poor, and downlink information received by the UE by using the communication link affects transmission performance of the UE.

SUMMARY

Embodiments of the present invention provide a downlink information processing method and a device, which are used to prevent transmission performance of UE from being affected.

According to a first aspect, an embodiment of the present invention provides a downlink information processing method, including: determining, by UE, whether a communication link between a cell in an active set and the UE meets a preset communication quality requirement; and if the communication link between the cell in the active set and the UE does not meet the preset communication quality requirement, stopping, by the UE, processing downlink information that is sent from a base station by using the communication link.

In a first possible implementation manner of the first aspect, after the stopping, by the UE, processing downlink information that is sent from a base station by using the communication link, the method further includes: further determining, by the UE, whether the communication link between the cell in the active set and the UE meets the preset communication quality requirement; and if the communication link between the cell in the active set and the UE meets the preset communication quality requirement, resuming, by the UE, processing the downlink information that is sent from the base station by using the communication link.

With reference to the first aspect or the first possible implementation manner of the first aspect, in a second possible implementation manner of the first aspect, the stopping, by the UE, processing downlink information that is sent from a base station by using the communication link includes: stopping, by the UE, processing a transmit power control (TPC) command that is sent from the base station by using the communication link; and/or stopping, by the UE, processing a dedicated physical control channel (DPCCH)/dedicated physical data channel (DPDCH)/F-dedicated physical channel (DPCH)/enhanced dedicated channel relative grant channel (E-RGCH)/enhanced dedicated channel hybrid automatic repeat request acknowledgment indicator channel (E-HICH) that is sent from the base station by using the communication link.

With reference to the second possible implementation manner of the first aspect, in a third possible implementation manner of the first aspect, the stopping, by the UE, processing a dedicated physical control channel (DPCCH)/dedicated physical data channel (DPDCH)/F-dedicated physical channel (DPCH)/enhanced dedicated channel relative grant channel (E-RGCH)/enhanced dedicated channel hybrid automatic repeat request acknowledgment indicator channel (E-HICH) that is sent from the base station by using the communication link includes: stopping, by the UE, receiving the DPCCH/DPDCH/F-DPCH/E-RGCH/E-HICH that is sent from the base station by using the communication link; or receiving, by the UE, a DPDCH that is sent from the base station by using the communication link, and stopping using a signal on the DPDCH in combination processing; or receiving, by the UE, a DPCCH/DPDCH/F-DPCH that is sent from the base station by using the communication link, and stopping using a signal on the DPCCH/DPDCH/F-DPCH in signal to interference ratio (SIR) evaluation; or receiving, by the UE, an E-RGCH that is sent from the base station by using the communication link, and stopping using a relative grant signal on the E-RGCH in combination processing; or receiving, by the UE, an E-RGCH that is sent from the base station by using the communication link, and stopping sending relative grant information on the E-RGCH to an upper layer of the UE; or receiving, by the UE, an E-HICH that is sent from the base station by using the communication link, and stopping using a feedback signal on the E-HICH in combination processing; or receiving, by the UE, an E-HICH that is sent from the base station by using the communication link, and stopping sending feedback information on the E-HICH to an upper layer of the UE.

With reference to the first aspect or the first possible implementation manner of the first aspect or the second possible implementation manner of the first aspect or the third possible implementation manner of the first aspect, in a fourth possible implementation manner of the first aspect, the determining, by UE, whether a communication link between a cell in an active set and the UE meets a preset communication quality requirement includes: determining, by the UE, whether a signal to interference ratio (SIR) of a TPC command is less than an SIR threshold, where the TPC command is received by the UE by using the communication link between the cell and the UE; and if the SIR of the TPC command is less than the SIR threshold, determining, by the UE, that the communication link does not meet the preset communication quality requirement; or if the SIR of the TPC command is not less than the SIR threshold, determining, by the UE, that the communication link meets the preset communication quality requirement.

With reference to the first aspect or the first possible implementation manner of the first aspect or the second possible implementation manner of the first aspect or the third possible implementation manner of the first aspect, in a fifth possible implementation manner of the first aspect, the determining, by UE, whether a communication link between a cell in an active set and the UE meets a preset communication quality requirement includes: determining, by the UE, whether a 1B event or a 1A event occurs in the cell; and if the 1B event occurs in the cell, determining, by the UE, that the communication link does not meet the preset communication quality requirement; or if the 1A event occurs in the cell, determining, by the UE, that the communication link meets the preset communication quality requirement.

With reference to the first aspect or the first possible implementation manner of the first aspect or the second possible implementation manner of the first aspect or the third possible implementation manner of the first aspect, in a sixth possible implementation manner of the first aspect, the determining, by UE, whether a communication link between a cell in an active set and the UE meets a preset communication quality requirement includes: determining, by the UE, whether the communication link between the cell and the UE is in downlink out-of-synchronization state or downlink synchronization state; and if the communication link between the cell and the UE is in downlink out-of-synchronization state, determining, by the UE, that the communication link does not meet the preset communication quality requirement; or if the communication link between the cell and the UE is in downlink synchronization state, determining, by the UE, that the communication link meets the preset communication quality requirement.

With reference to the first aspect or the first possible implementation manner of the first aspect or the second possible implementation manner of the first aspect or the third possible implementation manner of the first aspect, in a seventh possible implementation manner of the first aspect, the determining, by UE, whether a communication link between a cell in an active set and the UE meets a preset communication quality requirement includes: determining, by the UE, whether a 1B event occurs in the cell and the communication link is in downlink out-of-synchronization state, or whether a 1A event occurs in the cell and the communication link is in downlink synchronization state; and if the 1B event occurs in the cell and the communication link is in downlink out-of-synchronization state, determining, by the UE, that the communication link does not meet the preset communication quality requirement; or if the 1A event occurs in the cell and the communication link is in downlink synchronization state, determining, by the UE, that the communication link meets the preset communication quality requirement.

With reference to the first aspect or the first possible implementation manner of the first aspect or the second possible implementation manner of the first aspect or the third possible implementation manner of the first aspect, in an eighth possible implementation manner of the first aspect, the determining, by UE, whether a communication link between a cell in an active set and the UE meets a preset communication quality requirement includes: determining, by the UE, whether quality of a common pilot channel CPICH and/or quality of a DPCCH/DPDCH/F-DPCH/E-RGCH/E-HICH of the cell is less than a preset threshold; and if the quality of the CPICH and/or the quality of the DPCCH/DPDCH/F-DPCH/E-RGCH/E-HICH of the cell is less than the preset threshold, determining, by the UE, that the communication link does not meet the preset communication quality requirement; or if the quality of the CPICH and/or the quality of the DPCCH/DPDCH/F-DPCH/E-RGCH/E-HICH of the cell is not less than the preset threshold, determining, by the UE, that the communication link meets the preset communication quality requirement.

According to a second aspect, an embodiment of the present invention provides a downlink information processing method, including: when a serving cell of user equipment (UE) is a micro cell, determining, by a radio network controller (RNC), whether a communication link between a cell in an active set and the UE meets a preset communication quality requirement; and if the communication link between the cell in the active set and the UE does not meet the preset communication quality requirement, sending, by the RNC, a first indication message to a base station, where the first indication message is used for instructing the base station to stop sending a transmit power control (TPC) command to the UE by using the communication link.

In a first possible implementation manner of the second aspect, the determining, by an RNC, whether a communication link between a cell in an active set and the UE meets a preset communication quality requirement includes: determining, by the RNC, whether a 1B event measurement report of the cell sent from the UE or failure indication information, sent from the base station, of the communication link is received; and if the 1B event measurement report of the cell sent from the UE or the failure indication information, sent from the base station, of the communication link is received, determining, by the RNC, that the communication link does not meet the preset communication quality requirement.

With reference to the second aspect or the first possible implementation manner of the second aspect, in a second possible implementation manner of the second aspect, the first indication message is specifically used for instructing the base station to: after determining that the communication link between the cell and the UE is in uplink out-of-synchronization, stop sending the TPC command to the UE by using the communication link.

With reference to the second aspect or the first possible implementation manner of the second aspect or the second possible implementation manner of the second aspect, in a third possible implementation manner of the second aspect, the first indication message is further used for instructing the base station to stop processing a TPC command that is sent from the UE by using the communication link or stop receiving information that is sent from the UE by using the communication link.

With reference to the second aspect or the first possible implementation manner of the second aspect or the second possible implementation manner of the second aspect or the third possible implementation manner of the second aspect, in a fourth possible implementation manner of the second aspect, the sending, by the RNC, a first indication message to a base station includes: sending, by the RNC, the first indication message to the base station by using a dedicated data frame or dedicated signaling or common signaling.

With reference to the second aspect or the first possible implementation manner of the second aspect or the second possible implementation manner of the second aspect or the third possible implementation manner of the second aspect or the fourth possible implementation manner of the second aspect, in a fifth possible implementation manner of the second aspect, after the sending, by the RNC, a first indication message to a base station, the method further includes: determining, by the RNC, whether the communication link meets the preset communication quality requirement; and if the communication link meets the preset communication quality requirement, sending, by the RNC, a second indication message to the base station, where the second indication message is used for instructing the base station to resume sending the TPC command to the UE by using the communication link.

With reference to the fifth possible implementation manner of the second aspect, in a sixth possible implementation manner of the second aspect, the determining, by the RNC, whether the communication link meets the preset communication quality requirement includes: determining, by the RNC, whether a 1A event measurement report of the cell sent from the UE or recovery indication information, sent from the base station, of the communication link is received; and if the 1A event measurement report of the cell sent from the UE or the recovery indication information, sent from the base station, of the communication link is received, determining, by the RNC, that the communication link meets the preset communication quality requirement.

With reference to the fifth possible implementation manner of the second aspect or the sixth possible implementation manner of the second aspect, in a seventh possible implementation manner of the second aspect, the second indication message is specifically used for instructing the base station to: after determining that the communication link between the cell and the UE is in uplink synchronization, resume sending the TPC command to the UE by using the communication link.

With reference to the fifth possible implementation manner of the second aspect or the sixth possible implementation manner of the second aspect or the seventh possible implementation manner of the second aspect, in an eighth possible implementation manner of the second aspect, the second indication message is further used for instructing the base station to resume processing the TPC command that is sent from the UE by using the communication link or resume receiving the information that is sent from the UE by using the communication link.

With reference to the fifth possible implementation manner of the second aspect or the sixth possible implementation manner of the second aspect or the seventh possible implementation manner of the second aspect or the eighth possible implementation manner of the second aspect, in a ninth possible implementation manner of the second aspect, the sending, by the RNC, a second indication message to the base station includes: sending, by the RNC, the second indication message to the base station by using a dedicated data frame or dedicated signaling or common signaling.

According to a third aspect, an embodiment of the present invention provides a downlink information processing method, including: when a serving cell of user equipment (UE) is a micro cell, receiving, by a base station, a first indication message sent from a radio network controller (RNC), where the first indication message is used for instructing the base station to stop sending a transmit power control (TPC) command to the UE by using a communication link between a cell in an active set and the UE; and stopping, by the base station according to the first indication message, sending the TPC command to the UE by using the communication link.

In a first possible implementation manner of the third aspect, the first indication message is specifically used for instructing the base station to: after determining that the communication link between the cell and the UE is in uplink out-of-synchronization, stop sending the TPC command to the UE by using the communication link; and the stopping, by the base station according to the first indication message, sending the TPC command to the UE by using the communication link includes: determining, by the base station according to the first indication message, that the communication link is in uplink out-of-synchronization; and stopping, by the base station, sending the TPC command to the UE by using the communication link.

With reference to the third aspect or the first possible implementation manner of the third aspect, in a second possible implementation manner of the third aspect, the first indication message is further used for instructing the base station to stop processing a TPC command that is sent from the UE by using the communication link or stop receiving information that is sent from the UE by using the communication link; and after the receiving, by a base station, a first indication message sent from an RNC, the method further includes: according to the first indication message, stopping, by the base station, processing the TPC command that is sent from the UE by using the communication link or stopping receiving the information that is sent from the UE by using the communication link.

With reference to the third aspect or the first possible implementation manner of the third aspect or the second possible implementation manner of the third aspect, in a third possible implementation manner of the third aspect, the first indication message is further used for indicating that the communication link is a non-serving link.

With reference to the third aspect or the first possible implementation manner of the third aspect or the second possible implementation manner of the third aspect or the third possible implementation manner of the third aspect, in a fourth possible implementation manner of the third aspect, the receiving, by a base station, a first indication message sent from an RNC includes: receiving, by the base station, the first indication message that is sent from the RNC by using a dedicated data frame or dedicated signaling or common signaling.

With reference to the third aspect or the first possible implementation manner of the third aspect or the second possible implementation manner of the third aspect or the third possible implementation manner of the third aspect or the fourth possible implementation manner of the third aspect, in a fifth possible implementation manner of the third aspect, the method further includes: receiving, by the base station, a second indication message sent from the RNC, where the second indication message is used for instructing the base station to resume sending the TPC command to the UE by using the communication link; and resuming, by the base station according to the second indication message, sending the TPC command to the UE by using the communication link.

With reference to the fifth possible implementation manner of the third aspect, in a sixth possible implementation manner of the third aspect, the second indication message is specifically used for instructing the base station to: after determining that the communication link is in uplink synchronization, resume sending the TPC command to the UE by using the communication link; and the resuming, by the base station according to the second indication message, sending the TPC command to the UE by using the communication link includes: determining, by the base station according to the second indication message, that the communication link is in uplink synchronization; and resuming, by the base station, sending the TPC command to the UE by using the communication link.

With reference to the fifth possible implementation manner of the third aspect or the sixth possible implementation manner of the third aspect, in a seventh possible implementation manner of the third aspect, the second indication message is further used for instructing the base station to resume processing the TPC command that is sent from the UE by using the communication link or resume receiving the information that is sent from the UE by using the communication link; and after the receiving, by the base station, a second indication message sent from the RNC, the method further includes: according to the second indication message, resuming, by the base station, processing the TPC command that is sent from the UE by using the communication link or resuming receiving the information that is sent from the UE by using the communication link.

With reference to the fifth possible implementation manner of the third aspect or the sixth possible implementation manner of the third aspect or the seventh possible implementation manner of the third aspect, in an eighth possible implementation manner of the third aspect, the receiving, by the base station, a second indication message sent from the RNC includes: receiving, by the base station, the second indication message that is sent from the RNC by using a dedicated data frame or dedicated signaling or common signaling.

According to a fourth aspect, an embodiment of the present invention provides user equipment (UE), including: a determining module, configured to determine whether a communication link between a cell in an active set and the UE meets a preset communication quality requirement; and a processing module, configured to: if the determining module determines that the communication link between the cell in the active set and the UE does not meet the preset communication quality requirement, stop processing downlink information that is sent from a base station by using the communication link.

In a first possible implementation manner of the fourth aspect, the UE further includes: a resuming module, where the determining module is further configured to: after the processing module stops processing the downlink information that is sent from the base station by using the communication link, further determine whether the communication link between the cell in the active set and the UE meets the preset communication quality requirement; and the resuming module is configured to: if the determining module determines that the communication link between the cell in the active set and the UE meets the preset communication quality requirement, resume processing the downlink information that is sent from the base station by using the communication link.

With reference to the fourth aspect or the first possible implementation manner of the fourth aspect, in a second possible implementation manner of the fourth aspect, the processing module includes: a first processing unit and/or a second processing unit, where the first processing unit is configured to stop processing a transmit power control (TPC) command that is sent from the base station by using the communication link; and the second processing unit is configured to stop processing a dedicated physical control channel (DPCCH)/dedicated physical data channel (DPDCH)/F-dedicated physical channel (DPCH)/enhanced dedicated channel relative grant channel (E-RGCH)/enhanced dedicated channel hybrid automatic repeat request acknowledgment indicator channel (E-HICH) that is sent from the base station by using the communication link.

With reference to the second possible implementation manner of the fourth aspect, in a third possible implementation manner of the fourth aspect, the second processing unit is specifically configured to stop receiving the DPCCH/DPDCH/F-DPCH/E-RGCH/E-HICH that is sent from the base station by using the communication link; or receive a DPDCH that is sent from the base station by using the communication link, and stop using a signal on the DPDCH in combination processing; or receive a DPCCH/DPDCH/F-DPCH that is sent from the base station by using the communication link, and stop using a signal on the DPCCH/DPDCH/F-DPCH in signal to interference ratio (SIR) evaluation; or receive an E-RGCH that is sent from the base station by using the communication link, and stop using a relative grant signal on the E-RGCH in combination processing; or receive an E-RGCH that is sent from the base station by using the communication link, and stop sending relative grant information on the E-RGCH to an upper layer of the UE; or receive an E-HICH that is sent from the base station by using the communication link, and stop using a feedback signal on the E-HICH in combination processing; or receive an E-HICH that is sent from the base station by using the communication link, and stop sending feedback information on the E-HICH to an upper layer of the UE.

With reference to the fourth aspect or the first possible implementation manner of the fourth aspect or the second possible implementation manner of the fourth aspect or the third possible implementation manner of the fourth aspect, in a fourth possible implementation manner of the fourth aspect, the determining module is specifically configured to determine whether a signal to interference ratio (SIR) of a TPC command is less than an SIR threshold, where the TPC command is received by the UE by using the communication link between the cell and the UE; if the SIR of the TPC command is less than the SIR threshold, determine that the communication link does not meet the preset communication quality requirement; and if the SIR of the TPC command is not less than the SIR threshold, determine that the communication link meets the preset communication quality requirement.

With reference to the fourth aspect or the first possible implementation manner of the fourth aspect or the second possible implementation manner of the fourth aspect or the third possible implementation manner of the fourth aspect, in a fifth possible implementation manner of the fourth aspect, the determining module is specifically configured to determine whether a 1B event or a 1A event occurs in the cell; if the 1B event occurs in the cell, determine that the communication link does not meet the preset communication quality requirement; and if the 1A event occurs in the cell, determine that the communication link meets the preset communication quality requirement.

With reference to the fourth aspect or the first possible implementation manner of the fourth aspect or the second possible implementation manner of the fourth aspect or the third possible implementation manner of the fourth aspect, in a sixth possible implementation manner of the fourth aspect, the determining module is specifically configured to determine whether the communication link between the cell and the UE is in downlink out-of-synchronization state or downlink synchronization state; if the communication link between the cell and the UE is in downlink out-of-synchronization state, determine that the communication link does not meet the preset communication quality requirement; and if the communication link between the cell and the UE is in downlink synchronization state, determine that the communication link meets the preset communication quality requirement.

With reference to the fourth aspect or the first possible implementation manner of the fourth aspect or the second possible implementation manner of the fourth aspect or the third possible implementation manner of the fourth aspect, in a seventh possible implementation manner of the fourth aspect, the determining module is specifically configured to determine whether a 1B event occurs in the cell and the communication link is in downlink out-of-synchronization state, or whether a 1A event occurs in the cell and the communication link is in downlink synchronization state; if the 1B event occurs in the cell and the communication link is in downlink out-of-synchronization state, determine that the communication link does not meet the preset communication quality requirement; and if the 1A event occurs in the cell and the communication link is in downlink synchronization state, determine that the communication link meets the preset communication quality requirement.

With reference to the fourth aspect or the first possible implementation manner of the fourth aspect or the second possible implementation manner of the fourth aspect or the third possible implementation manner of the fourth aspect, in an eighth possible implementation manner of the fourth aspect, the determining module is specifically configured to determine whether quality of a common pilot channel CPICH and/or quality of a DPCCH/DPDCH/F-DPCH/E-RGCH/E-HICH of the cell is less than a preset threshold; if the quality of the CPICH and/or the quality of the DPCCH/DPDCH/F-DPCH/E-RGCH/E-HICH of the cell is less than the preset threshold, determine that the communication link does not meet the preset communication quality requirement; and if the quality of the CPICH and/or the quality of the DPCCH/DPDCH/F-DPCH/E-RGCH/E-HICH of the cell is not less than the preset threshold, determine that the communication link meets the preset communication quality requirement.

According to a fifth aspect, an embodiment of the present invention provides a radio network controller (RNC), including: a first determining module, configured to: when a serving cell of user equipment (UE) is a micro cell, determine whether a communication link between a cell in an active set and the UE meets a preset communication quality requirement; and a first sending module, configured to: if the first determining module determines that the communication link between the cell in the active set and the UE does not meet the preset communication quality requirement, send a first indication message to a base station, where the first indication message is used for instructing the base station to stop sending a transmit power control (TPC) command to the UE by using the communication link.

In a first possible implementation manner of the fifth aspect, the first determining module is specifically configured to determine whether a 1B event measurement report of the cell sent from the UE or failure indication information, sent from the base station, of the communication link is received; and if the 1B event measurement report of the cell sent from the UE or the failure indication information, sent from the base station, of the communication link is received, determine that the communication link does not meet the preset communication quality requirement.

With reference to the fifth aspect or the first possible implementation manner of the fifth aspect, in a second possible implementation manner of the fifth aspect, the first indication message is specifically used for instructing the base station to: after determining that the communication link between the cell and the UE is in uplink out-of-synchronization, stop sending the TPC command to the UE by using the communication link.

With reference to the fifth aspect or the first possible implementation manner of the fifth aspect or the second possible implementation manner of the fifth aspect, in a third possible implementation manner of the fifth aspect, the first indication message is further used for instructing the base station to stop processing a TPC command that is sent from the UE by using the communication link or stop receiving information that is sent from the UE by using the communication link.

With reference to the fifth aspect or the first possible implementation manner of the fifth aspect or the second possible implementation manner of the fifth aspect or the third possible implementation manner of the fifth aspect, in a fourth possible implementation manner of the fifth aspect, the first sending module is specifically configured to send the first indication message to the base station by using a dedicated data frame or dedicated signaling or common signaling.

With reference to the fifth aspect or the first possible implementation manner of the fifth aspect or the second possible implementation manner of the fifth aspect or the third possible implementation manner of the fifth aspect or the fourth possible implementation manner of the fifth aspect, in a fifth possible implementation manner of the fifth aspect, the RNC further includes: a second determining module, configured to determine whether the communication link meets the preset communication quality requirement; and a second sending module, configured to: if the second determining module determines that the communication link meets the preset communication quality requirement, send a second indication message to the base station, where the second indication message is used for instructing the base station to resume sending the TPC command to the UE by using the communication link.

With reference to the fifth possible implementation manner of the fifth aspect, in a sixth possible implementation manner of the fifth aspect, the second determining module is specifically configured to determine whether a 1A event measurement report of the cell sent from the UE or recovery indication information, sent from the base station, of the communication link is received; and if the 1A event measurement report of the cell sent from the UE or the recovery indication information, sent from the base station, of the communication link is received, determine that the communication link meets the preset communication quality requirement.

With reference to the fifth possible implementation manner of the fifth aspect or the sixth possible implementation manner of the fifth aspect, in a seventh possible implementation manner of the fifth aspect, the second indication message is specifically used for instructing the base station to: after determining that the communication link between the cell and the UE is in uplink synchronization, resume sending the TPC command to the UE by using the communication link.

With reference to the fifth possible implementation manner of the fifth aspect or the sixth possible implementation manner of the fifth aspect or the seventh possible implementation manner of the fifth aspect, in an eighth possible implementation manner of the fifth aspect, the second indication message is further used for instructing the base station to resume processing the TPC command that is sent from the UE by using the communication link or resume receiving the information that is sent from the UE by using the communication link.

With reference to the fifth possible implementation manner of the fifth aspect or the sixth possible implementation manner of the fifth aspect or the seventh possible implementation manner of the fifth aspect or the eighth possible implementation manner of the fifth aspect, in a ninth possible implementation manner of the fifth aspect, the second sending module is specifically configured to send the second indication message to the base station by using a dedicated data frame or dedicated signaling or common signaling.

According to a sixth aspect, an embodiment of the present invention provides a base station, including: a first receiving module, configured to: when a serving cell of user equipment (UE) is a micro cell, receive a first indication message sent from a radio network controller (RNC), where the first indication message is used for instructing the base station to stop sending a transmit power control (TPC) command to the UE by using a communication link between a cell in an active set and the UE; and a processing module, configured to stop, according to the first indication message, sending the TPC command to the UE by using the communication link.

In a first possible implementation manner of the sixth aspect, the first indication message is specifically used for instructing the base station to: after determining that the communication link between the cell and the UE is in uplink out-of-synchronization, stop sending the TPC command to the UE by using the communication link; and the processing module is specifically configured to determine, according to the first indication message, that the communication link is in uplink out-of-synchronization; and stop sending the TPC command to the UE by using the communication link.

With reference to the sixth aspect or the first possible implementation manner of the sixth aspect, in a second possible implementation manner of the sixth aspect, the first indication message is further used for instructing the base station to stop processing a TPC command that is sent from the UE by using the communication link or stop receiving information that is sent from the UE by using the communication link; and the processing module is further configured to: after the first receiving module receives the first indication message sent from the RNC, according to the first indication message, stop processing the TPC command that is sent from the UE by using the communication link or stop receiving the information that is sent from the UE by using the communication link.

With reference to the sixth aspect or the first possible implementation manner of the sixth aspect or the second possible implementation manner of the sixth aspect, in a third possible implementation manner of the sixth aspect, the first indication message is further used for indicating that the communication link is a non-serving link.

With reference to the sixth aspect or the first possible implementation manner of the sixth aspect or the second possible implementation manner of the sixth aspect or the third possible implementation manner of the sixth aspect, in a fourth possible implementation manner of the sixth aspect, the first receiving module is specifically configured to receive the first indication message that is sent from the RNC by using a dedicated data frame or dedicated signaling or common signaling.

With reference to the sixth aspect or the first possible implementation manner of the sixth aspect or the second possible implementation manner of the sixth aspect or the third possible implementation manner of the sixth aspect or the fourth possible implementation manner of the sixth aspect, in a fifth possible implementation manner of the sixth aspect, the base station includes: a second receiving module, configured to receive a second indication message sent from the RNC, where the second indication message is used for instructing the base station to resume sending the TPC command to the UE by using the communication link; and a resuming module, configured to resume, according to the second indication message, sending the TPC command to the UE by using the communication link.

With reference to the fifth possible implementation manner of the sixth aspect, in a sixth possible implementation manner of the sixth aspect, the second indication message is specifically used for instructing the base station to: after determining that the communication link is in uplink synchronization, resume sending the TPC command to the UE by using the communication link; and the resuming module is specifically configured to determine, according to the second indication message, that the communication link is in uplink synchronization; and resume sending the TPC command to the UE by using the communication link.

With reference to the fifth possible implementation manner of the sixth aspect or the sixth possible implementation manner of the sixth aspect, in a seventh possible implementation manner of the sixth aspect, the second indication message is further used for instructing the base station to resume processing the TPC command that is sent from the UE by using the communication link or resume receiving the information that is sent from the UE by using the communication link; and the resuming module is further configured to: after the second receiving module receives the second indication message sent from the RNC, according to the second indication message, resume processing the TPC command that is sent from the UE by using the communication link or resume receiving the information that is sent from the UE by using the communication link.

With reference to the fifth possible implementation manner of the sixth aspect or the sixth possible implementation manner of the sixth aspect or the seventh possible implementation manner of the sixth aspect, in an eighth possible implementation manner of the sixth aspect, the second receiving module is specifically configured to receive the second indication message that is sent from the RNC by using a dedicated data frame or dedicated signaling or common signaling.

According to a seventh aspect, an embodiment of the present invention provides user equipment (UE), including: a processor, configured to determine whether a communication link between a cell in an active set and the UE meets a preset communication quality requirement; and if the communication link between the cell in the active set and the UE does not meet the preset communication quality requirement, stop processing downlink information that is sent from a base station by using the communication link.

In a first possible implementation manner of the seventh aspect, the processor is further configured to: after stopping processing the downlink information that is sent from the base station by using the communication link, further determine whether the communication link between the cell in the active set and the UE meets the preset communication quality requirement; and if the communication link between the cell in the active set and the UE meets the preset communication quality requirement, resume processing the downlink information that is sent from the base station by using the communication link.

With reference to the seventh aspect or the first possible implementation manner of the seventh aspect, in a second possible implementation manner of the seventh aspect, the processor is specifically configured to stop processing a transmit power control (TPC) command that is sent from the base station by using the communication link; and/or stop processing a dedicated physical control channel (DPCCH)/dedicated physical data channel (DPDCH)/F-dedicated physical channel (DPCH)/enhanced dedicated channel relative grant channel (E-RGCH)/enhanced dedicated channel hybrid automatic repeat request acknowledgment indicator channel (E-HICH) that is sent from the base station by using the communication link.

With reference to the second possible implementation manner of the seventh aspect, in a third possible implementation manner of the seventh aspect, the UE further including a receiver, where the processor is specifically configured to stop receiving the DPCCH/DPDCH/F-DPCH/E-RGCH/E-HICH that is sent from the base station by using the communication link; or the receiver is configured to receive a DPDCH that is sent from the base station by using the communication link, and the processor is specifically configured to stop using a signal on the DPDCH in combination processing; or the receiver is configured to receive a DPCCH/DPDCH/F-DPCH that is sent from the base station by using the communication link, and the processor is specifically configured to stop using a signal on the DPCCH/DPDCH/F-DPCH in signal to interference ratio (SIR) evaluation; or the receiver is configured to receive an E-RGCH that is sent from the base station by using the communication link, and the processor is specifically configured to stop using a relative grant signal on the E-RGCH in combination processing; or the receiver is configured to receive an E-RGCH that is sent from the base station by using the communication link, and the processor is specifically configured to stop sending relative grant information on the E-RGCH to an upper layer of the UE; or the receiver is configured to receive an E-HICH that is sent from the base station by using the communication link, and the processor is specifically configured to stop using a feedback signal on the E-HICH in combination processing; or the receiver is configured to receive an E-HICH that is sent from the base station by using the communication link, and the processor is specifically configured to stop sending feedback information on the E-HICH to an upper layer of the UE.

With reference to the seventh aspect or the first possible implementation manner of the seventh aspect or the second possible implementation manner of the seventh aspect or the third possible implementation manner of the seventh aspect, in a fourth possible implementation manner of the seventh aspect, the processor is specifically configured to determine whether a signal to interference ratio (SIR) of a TPC command is less than an SIR threshold, where the TPC command is received by the UE by using the communication link between the cell and the UE; if the SIR of the TPC command is less than the SIR threshold, determine that the communication link does not meet the preset communication quality requirement; and if the SIR of the TPC command is not less than the SIR threshold, determine that the communication link meets the preset communication quality requirement.

With reference to the seventh aspect or the first possible implementation manner of the seventh aspect or the second possible implementation manner of the seventh aspect or the third possible implementation manner of the seventh aspect, in a fifth possible implementation manner of the seventh aspect, the processor is specifically configured to determine whether a 1B event or a 1A event occurs in the cell; if the 1B event occurs in the cell, determine that the communication link does not meet the preset communication quality requirement; and if the 1A event occurs in the cell, determine that the communication link meets the preset communication quality requirement.

With reference to the seventh aspect or the first possible implementation manner of the seventh aspect or the second possible implementation manner of the seventh aspect or the third possible implementation manner of the seventh aspect, in a sixth possible implementation manner of the seventh aspect, the processor is specifically configured to determine whether the communication link between the cell and the UE is in downlink out-of-synchronization state or downlink synchronization state; if the communication link between the cell and the UE is in downlink out-of-synchronization state, determine that the communication link does not meet the preset communication quality requirement; and if the communication link between the cell and the UE is in downlink synchronization state, determine that the communication link meets the preset communication quality requirement.

With reference to the seventh aspect or the first possible implementation manner of the seventh aspect or the second possible implementation manner of the seventh aspect or the third possible implementation manner of the seventh aspect, in a seventh possible implementation manner of the seventh aspect, the processor is specifically configured to determine whether a 1B event occurs in the cell and the communication link is in downlink out-of-synchronization state, or whether a 1A event occurs in the cell and the communication link is in downlink synchronization state; if the 1B event occurs in the cell and the communication link is in downlink out-of-synchronization state, determine that the communication link does not meet the preset communication quality requirement; and if the 1A event occurs in the cell and the communication link is in downlink synchronization state, determine that the communication link meets the preset communication quality requirement.

With reference to the seventh aspect or the first possible implementation manner of the seventh aspect or the second possible implementation manner of the seventh aspect or the third possible implementation manner of the seventh aspect, in an eighth possible implementation manner of the seventh aspect, the processor is specifically configured to determine whether quality of a common pilot channel CPICH and/or quality of a DPCCH/DPDCH/F-DPCH/E-RGCH/E-HICH of the cell is less than a preset threshold; if the quality of the CPICH and/or the quality of the DPCCH/DPDCH/F-DPCH/

E-RGCH/E-HICH of the cell is less than the preset threshold, determine that the communication link does not meet the preset communication quality requirement; and if the quality of the CPICH and/or the quality of the DPCCH/ DPDCH/F-DPCH/E-RGCH/E-HICH of the cell is not less than the preset threshold, determine that the communication link meets the preset communication quality requirement.

According to an eighth aspect, an embodiment of the present invention provides a radio network controller (RNC), including: a processor, configured to: when a serving cell of user equipment (UE) is a micro cell, determine whether a communication link between a cell in an active set and the UE meets a preset communication quality requirement; and a transmitter, configured to: if the communication link between the cell in the active set and the UE does not meet the preset communication quality requirement, send a first indication message to a base station, where the first indication message is used for instructing the base station to stop sending a transmit power control (TPC) command to the UE by using the communication link.

In a first possible implementation manner of the eighth aspect, the processor is specifically configured to determine whether a 1B event measurement report of the cell sent from the UE or failure indication information, sent from the base station, of the communication link is received; and if the 1B event measurement report of the cell sent from the UE or the failure indication information, sent from the base station, of the communication link is received, determine that the communication link does not meet the preset communication quality requirement.

With reference to the eighth aspect or the first possible implementation manner of the eighth aspect, in a second possible implementation manner of the eighth aspect, the first indication message is specifically used for instructing the base station to: after determining that the communication link between the cell and the UE is in uplink out-of-synchronization, stop sending the TPC command to the UE by using the communication link.

With reference to the eighth aspect or the first possible implementation manner of the eighth aspect or the second possible implementation manner of the eighth aspect, in a third possible implementation manner of the eighth aspect, the first indication message is further used for instructing the base station to stop processing a TPC command that is sent from the UE by using the communication link or stop receiving information that is sent from the UE by using the communication link.

With reference to the eighth aspect or the first possible implementation manner of the eighth aspect or the second possible implementation manner of the eighth aspect or the third possible implementation manner of the eighth aspect, in a fourth possible implementation manner of the eighth aspect, the transmitter is specifically configured to send the first indication message to the base station by using a dedicated data frame or dedicated signaling or common signaling.

With reference to the eighth aspect or the first possible implementation manner of the eighth aspect or the second possible implementation manner of the eighth aspect or the third possible implementation manner of the eighth aspect or the fourth possible implementation manner of the eighth aspect, in a fifth possible implementation manner of the eighth aspect, the processor is further configured to: after the transmitter sends the first indication message to the base station, determine whether the communication link meets the preset communication quality requirement; and the transmitter is further configured to: if the processor determines that the communication link meets the preset communication quality requirement, send a second indication message to the base station, where the second indication message is used for instructing the base station to resume sending the TPC command to the UE by using the communication link.

With reference to the fifth possible implementation manner of the eighth aspect, in a sixth possible implementation manner of the eighth aspect, the processor is specifically configured to determine whether a 1A event measurement report of the cell sent from the UE or recovery indication information, sent from the base station, of the communication link is received; and if the 1A event measurement report of the cell sent from the UE or the recovery indication information, sent from the base station, of the communication link is received, determine that the communication link meets the preset communication quality requirement.

With reference to the fifth possible implementation manner of the eighth aspect or the sixth possible implementation manner of the eighth aspect, in a seventh possible implementation manner of the eighth aspect, the second indication message is specifically used for instructing the base station to: after determining that the communication link between the cell and the UE is in uplink synchronization, resume sending the TPC command to the UE by using the communication link.

With reference to the fifth possible implementation manner of the eighth aspect or the sixth possible implementation manner of the eighth aspect or the seventh possible implementation manner of the eighth aspect, in an eighth possible implementation manner of the eighth aspect, the second indication message is further used for instructing the base station to resume processing the TPC command that is sent from the UE by using the communication link or resume receiving the information that is sent from the UE by using the communication link.

With reference to the fifth possible implementation manner of the eighth aspect or the sixth possible implementation manner of the eighth aspect or the seventh possible implementation manner of the eighth aspect or the eighth possible implementation manner of the eighth aspect, in a ninth possible implementation manner of the eighth aspect, the transmitter is specifically configured to send the second indication message to the base station by using a dedicated data frame or dedicated signaling or common signaling.

According to a ninth aspect, an embodiment of the present invention provides a base station, including: a first receiver, configured to: when a serving cell of user equipment (UE) is a micro cell, receive a first indication message sent from a radio network controller (RNC), where the first indication message is used for instructing the base station to stop sending a transmit power control (TPC) command to the UE by using a communication link between a cell in an active set and the UE; and a processor, configured to stop, according to the first indication message, sending the TPC command to the UE by using the communication link.

In a first possible implementation manner of the ninth aspect, the first indication message is specifically used for instructing the base station to: after determining that the communication link between the cell and the UE is in uplink out-of-synchronization, stop sending the TPC command to the UE by using the communication link; and the processor is specifically configured to determine, according to the first indication message, that the communication link is in uplink out-of-synchronization; and stop sending the TPC command to the UE by using the communication link.

With reference to the ninth aspect or the first possible implementation manner of the ninth aspect, in a second possible implementation manner of the ninth aspect, the first indication message is further used for instructing the base station to stop processing a TPC command that is sent from the UE by using the communication link or stop receiving information that is sent from the UE by using the communication link; and the processor is further configured to: after the first receiver receives the first indication message sent from the RNC, according to the first indication message, stop processing the TPC command that is sent from the UE by using the communication link or stop receiving information that is sent from the UE by using the communication link.

With reference to the ninth aspect or the first possible implementation manner of the ninth aspect or the second possible implementation manner of the ninth aspect, in a third possible implementation manner of the ninth aspect, the first indication message is further used for indicating that the communication link is a non-serving link.

With reference to the ninth aspect or the first possible implementation manner of the ninth aspect or the second possible implementation manner of the ninth aspect or the third possible implementation manner of the ninth aspect, in a fourth possible implementation manner of the ninth aspect, the receiver is specifically configured to receive the first indication message that is sent from the RNC by using a dedicated data frame or dedicated signaling or common signaling.

With reference to the ninth aspect or the first possible implementation manner of the ninth aspect or the second possible implementation manner of the ninth aspect or the third possible implementation manner of the ninth aspect or the fourth possible implementation manner of the ninth aspect, in a fifth possible implementation manner of the ninth aspect, the receiver is further configured to receive a second indication message sent from the RNC, where the second indication message is used for instructing the base station to resume sending the TPC command to the UE by using the communication link; and the processor is further configured to resume, according to the second indication message, sending the TPC command to the UE by using the communication link.

With reference to the fifth possible implementation manner of the ninth aspect, in a sixth possible implementation manner of the ninth aspect, the second indication message is specifically used for instructing the base station to: after determining that the communication link is in uplink synchronization, resume sending the TPC command to the UE by using the communication link; and the processor is specifically configured to determine, according to the second indication message, that the communication link is in uplink synchronization; and resume sending the TPC command to the UE by using the communication link.

With reference to the fifth possible implementation manner of the ninth aspect or the sixth possible implementation manner of the ninth aspect, in a seventh possible implementation manner of the ninth aspect, the second indication message is further used for instructing the base station to resume processing the TPC command that is sent from the UE by using the communication link or resume receiving the information that is sent from the UE by using the communication link; and the processor is further configured to: after the receiver receives the second indication message sent from the RNC, according to the second indication message, resume processing the TPC command that is sent from the UE by using the communication link or resume receiving the information that is sent from the UE by using the communication link.

With reference to the fifth possible implementation manner of the ninth aspect or the sixth possible implementation manner of the ninth aspect or the seventh possible implementation manner of the ninth aspect, in an eighth possible implementation manner of the ninth aspect, the receiver is specifically configured to receive the second indication message that is sent from the RNC by using a dedicated data frame or dedicated signaling or common signaling.

According to a tenth aspect, an embodiment of the present invention further provides a downlink information processing method, including: receiving, by user equipment (UE), stop indication information sent from a network side device, where the stop indication information is used for instructing the UE to stop processing downlink information that is sent from a base station by using a communication link between a cell in an active set and the UE; and stopping, by the UE according to the stop indication information, processing the downlink information that is sent from the base station by using the communication link.

In a first possible implementation manner of the tenth aspect, the receiving, by UE, stop indication information sent from a network side device includes: receiving, by the UE, the stop indication information sent from the base station; or receiving, by the UE, the stop indication information sent from a radio network controller (RNC).

With reference to the tenth aspect or the first possible implementation manner of the tenth aspect, in a second possible implementation manner of the tenth aspect, after the stopping, by the UE according to the stop indication information, processing the downlink information that is sent from the base station by using the communication link, the method further includes: receiving, by the UE, resumption indication information sent from the network side device, where the resumption indication information is used for instructing the UE to resume processing the downlink information that is sent from the base station by using the communication link; and resuming, by the UE according to the resumption indication information, processing the downlink information that is sent from the base station by using the communication link.

With reference to the tenth aspect or the first possible implementation manner of the tenth aspect or the second possible implementation manner of the tenth aspect, in a third possible implementation manner of the tenth aspect, the stopping, by the UE, processing downlink information that is sent from a base station by using the communication link includes: stopping, by the UE, processing a transmit power control (TPC) command that is sent from the base station by using the communication link; and/or stopping, by the UE, processing a dedicated physical control channel (DPCCH)/dedicated physical data channel (DPDCH)/F-dedicated physical channel (DPCH)/enhanced dedicated channel relative grant channel (E-RGCH)/enhanced dedicated channel hybrid automatic repeat request acknowledgment indicator channel (E-HICH) that is sent from the base station by using the communication link.

With reference to the third possible implementation manner of the tenth aspect, in a fourth possible implementation manner of the tenth aspect, the stopping, by the UE, processing a dedicated physical control channel (DPCCH)/dedicated physical data channel (DPDCH)/F-dedicated physical channel (DPCH)/enhanced dedicated channel relative grant channel (E-RGCH)/enhanced dedicated channel hybrid automatic repeat request acknowledgment indicator channel (E-HICH) that is sent from the base station by using the communication link includes: stopping, by the UE, receiving the DPCCH/DPDCH/F-DPCH/E-RGCH/E-HICH that is sent from the base station by using the communication link; or receiving, by the UE, a DPDCH that is sent from the base station by using the communication link, and stopping using a signal on the DPDCH in combination processing; or receiving, by the UE, a DPCCH/DPDCH/F-DPCH that is sent from the base station by using the communication link, and stopping using a signal on the DPCCH/DPDCH/F-DPCH in signal to interference ratio (SIR) evaluation; or receiving, by the UE, an E-RGCH that is sent from the base station by using the communication link, and stopping using a relative grant signal on the E-RGCH in combination processing; or receiving, by the UE, an E-RGCH that is sent from the base station by using the communication link, and stopping sending relative grant information on the E-RGCH to an upper layer of the UE; or receiving, by the UE, an E-HICH that is sent from the base station by using the communication link, and stopping using a feedback signal on the E-HICH in combination processing; or receiving, by the UE, an E-HICH that is sent from the base station by using the communication link, and stopping sending feedback information on the E-HICH to an upper layer of the UE.

With reference to the tenth aspect or the first possible implementation manner of the tenth aspect or the second possible implementation manner of the tenth aspect or the third possible implementation manner of the tenth aspect or the fourth possible implementation manner of the tenth aspect, in a fifth possible implementation manner of the tenth aspect, before the receiving, by user equipment (UE), stop indication information sent from a network side device, the method further includes: sending, by the UE, capability indication information to the network side device, where the capability indication information is used for indicating that the UE has a capability of stopping processing the downlink information and/or resuming processing the downlink information.

According to an eleventh aspect, an embodiment of the present invention further provides user equipment (UE), including: a receiving module, configured to receive stop indication information sent from a network side device, where the stop indication information is used for instructing the UE to stop processing downlink information that is sent from a base station by using a communication link between a cell in an active set and the UE; and a processing module, configured to stop, according to the stop indication information, processing the downlink information that is sent from the base station by using the communication link.

In a first possible implementation manner of the eleventh aspect, the receiving module is specifically configured to receive the stop indication information sent from the base station; or receive the stop indication information sent from a radio network controller (RNC).

With reference to the eleventh aspect or the first possible implementation manner of the eleventh aspect, in a second possible implementation manner of the eleventh aspect, the UE further includes: a resuming module, where the receiving module is further configured to: after the processing module stops, according to the stop indication information, processing the downlink information that is sent from the base station by using the communication link, receive resumption indication information sent from the network side device, where the resumption indication information is used for instructing the UE to resume processing the downlink information that is sent from the base station by using the communication link; and the resuming module is configured to resume, according to the resumption indication information, processing the downlink information that is sent from the base station by using the communication link.

With reference to the eleventh aspect or the first possible implementation manner of the eleventh aspect or the second possible implementation manner of the eleventh aspect, in a third possible implementation manner of the eleventh aspect, the processing module includes: a first processing unit and/or a second processing unit, where the first processing unit is configured to stop processing a transmit power control (TPC) command that is sent from the base station by using the communication link; and the second processing unit is configured to stop processing a dedicated physical control channel (DPCCH)/dedicated physical data channel (DPDCH)/F-dedicated physical channel (DPCH)/ enhanced dedicated channel relative grant channel (E-RGCH)/enhanced dedicated channel hybrid automatic repeat request acknowledgment indicator channel (E-HICH) that is sent from the base station by using the communication link.

With reference to the third possible implementation manner of the eleventh aspect, in a fourth possible implementation manner of the eleventh aspect, the second processing unit is specifically configured to stop receiving the DPCCH/ DPDCH/F-DPCH/E-RGCH/E-HICH that is sent from the base station by using the communication link; or receive a DPDCH that is sent from the base station by using the communication link, and stop using a signal on the DPDCH in combination processing; or receive a DPCCH/DPDCH/ F-DPCH that is sent from the base station by using the communication link, and stop using a signal on the DPCCH/ DPDCH/F-DPCH in signal to interference ratio (SIR) evaluation; or receive an E-RGCH that is sent from the base station by using the communication link, and stop using a relative grant signal on the E-RGCH in combination processing; or receive an E-RGCH that is sent from the base station by using the communication link, and stop sending relative grant information on the E-RGCH to an upper layer of the UE; or receive an E-HICH that is sent from the base station by using the communication link, and stop using a feedback signal on the E-HICH in combination processing; or receive an E-HICH that is sent from the base station by using the communication link, and stop sending feedback information on the E-HICH to an upper layer of the UE.

With reference to the eleventh aspect or the first possible implementation manner of the eleventh aspect or the second possible implementation manner of the eleventh aspect or the third possible implementation manner of the eleventh aspect or the fourth possible implementation manner of the eleventh aspect, in a fifth possible implementation manner of the eleventh aspect, the UE further includes: a sending module, configured to: before the receiving module receives the stop indication information sent from the network side device, send capability indication information to the network side device, where the capability indication information is used for indicating that the UE has a capability of stopping processing the downlink information and/or resuming processing the downlink information.

According to a twelfth aspect, an embodiment of the present invention further provides user equipment (UE), including: a receiver, configured to receive stop indication information sent from a network side device, where the stop indication information is used for instructing the UE to stop processing downlink information that is sent from a base station by using a communication link between a cell in an active set and the UE; and a processor, configured to stop, according to the stop indication information, processing the downlink information that is sent from the base station by using the communication link.

In a first possible implementation manner of the twelfth aspect, the receiver is specifically configured to receive the stop indication information sent from the base station; or receive the stop indication information sent from a radio network controller (RNC).

With reference to the twelfth aspect or the first possible implementation manner of the twelfth aspect, in a second possible implementation manner of the twelfth aspect, the receiver is further configured to: after the processor stops, according to the stop indication information, processing the downlink information that is sent from the base station by using the communication link, receive resumption indication information sent from the network side device, where the resumption indication information is used for instructing the UE to resume processing the downlink information that is sent from the base station by using the communication link; and the processor is further configured to resume, according to the resumption indication information, processing the downlink information that is sent from the base station by using the communication link.

With reference to the twelfth aspect or the first possible implementation manner of the twelfth aspect or the second possible implementation manner of the twelfth aspect, in a third possible implementation manner of the twelfth aspect, the processor is specifically configured to stop processing a transmit power control (TPC) command that is sent from the base station by using the communication link; and/or stop processing a dedicated physical control channel (DPCCH)/ dedicated physical data channel (DPDCH)/F-dedicated physical channel (DPCH)/enhanced dedicated channel relative grant channel (E-RGCH)/enhanced dedicated channel hybrid automatic repeat request acknowledgment indicator channel (E-HICH) that is sent from the base station by using the communication link.

With reference to the third possible implementation manner of the twelfth aspect, in a fourth possible implementation manner of the twelfth aspect, the processor is specifically configured to stop receiving the DPCCH/DPDCH/F-DPCH/ E-RGCH/E-HICH that is sent from the base station by using the communication link; or the receiver is further configured to receive a DPDCH that is sent from the base station by using the communication link, and the processor is specifically configured to stop using a signal on the DPDCH in combination processing; or the receiver is further configured to receive a DPCCH/DPDCH/F-DPCH that is sent from the base station by using the communication link, and the processor is specifically configured to stop using a signal on the DPCCH/DPDCH/F-DPCH in signal to interference ratio (SIR) evaluation; or the receiver is further configured to receive an E-RGCH that is sent from the base station by using the communication link, and the processor is specifically configured to stop using a relative grant signal on the E-RGCH in combination processing; or the receiver is further configured to receive an E-RGCH that is sent from the base station by using the communication link, and the processor is specifically configured to stop sending relative grant information on the E-RGCH to an upper layer of the UE; or the receiver is further configured to receive an E-HICH that is sent from the base station by using the communication link, and the processor is specifically configured to stop using a feedback signal on the E-HICH in combination processing; or the receiver is further configured to receive an E-HICH that is sent from the base station by using the communication link, and the processor is specifically configured to stop sending feedback information on the E-HICH to an upper layer of the UE.

With reference to the twelfth aspect or the first possible implementation manner of the twelfth aspect or the second possible implementation manner of the twelfth aspect or the third possible implementation manner of the twelfth aspect or the fourth possible implementation manner of the twelfth aspect, in a fifth possible implementation manner of the twelfth aspect, the UE further includes: a transmitter, configured to: before the receiver receives the stop indication information sent from the network side device, send capability indication information to the network side device, where the capability indication information is used for indicating that the UE has a capability of stopping processing the downlink information and/or resuming processing the downlink information.

According to a thirteenth aspect, an embodiment of the present invention provides a computer program product, including a computer readable medium, where the computer readable medium includes a set of program code, used for executing any method of the methods provided in the embodiment of the present invention according to the first aspect.

According to a fourteenth aspect, an embodiment of the present invention provides a computer program product, including a computer readable medium, where the computer readable medium includes a set of program code, used for executing any method of the methods provided in the embodiment of the present invention according to the second aspect.

According to a fifteenth aspect, an embodiment of the present invention provides a computer program product, including a computer readable medium, where the computer readable medium includes a set of program code, used for executing any method of the methods provided in the embodiment of the present invention according to the third aspect.

According to a sixteenth aspect, an embodiment of the present invention provides a computer program product, including a computer readable medium, where the computer readable medium includes a set of program code, used for executing any method of the methods provided in the embodiment of the present invention according to the tenth aspect.

In the downlink information processing method and the device provided in the embodiments of the present invention, when UE determines that a communication link between a cell in an active set and the UE does not meet a preset communication quality requirement, the UE stops processing downlink information that is sent from a base station by using the communication link; therefore, transmission performance of the UE is not affected.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
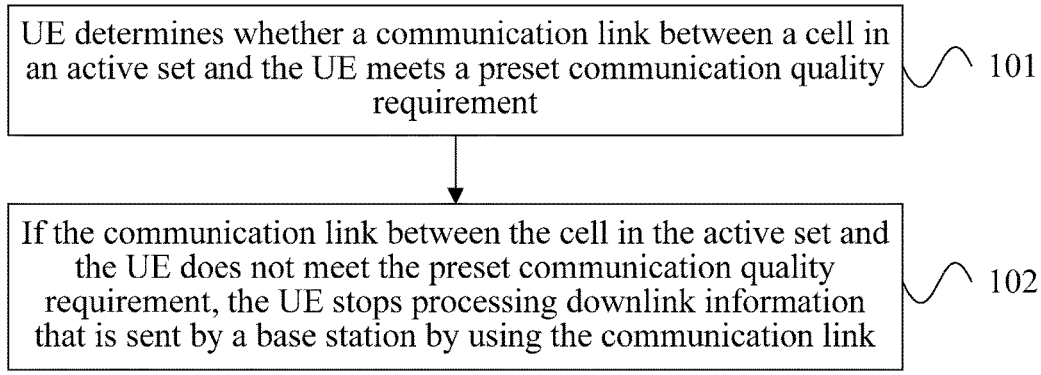
FIG. 1 is a flowchart of Embodiment 1 of a downlink information processing method according to the present invention.

FIG. 1 is a flowchart of Embodiment 1 of a downlink information processing method according to the present invention. As shown in FIG. 1, the method in this embodiment is described as follows:

101: UE determines whether a communication link between a cell in an active set and the UE meets a preset communication quality requirement.

In this embodiment, when a serving cell of the UE is a micro cell, because the UE reports earlier a 1A event of a cell in an active set and delays reporting a 1B event, and after reporting the 1B event, still retains the cell in the active set, the cell is added earlier to the active set and deletion of the cell from the active set is delayed; as a result, signal quality of a communication link between the UE and the cell in the active set is poor. Therefore, when the serving cell of the UE is a micro cell, the UE determines whether the communication link between the cell in the active set and the UE meets the preset communication quality requirement, and if the communication link meets the preset communication quality requirement, it indicates that the signal quality of the communication link is good, and has a small impact on transmission performance of the UE, or if the communication link does not meet the preset communication quality requirement, it indicates that the signal quality of the communication link is poor, and has a large impact on transmission performance of the UE.

102: If the communication link between the cell in the active set and the UE does not meet the preset communication quality requirement, the UE stops processing downlink information that is sent from a base station by using the communication link.

If the communication link between the cell in the active set and the UE does not meet the preset communication quality requirement, it indicates that the signal quality of the communication link is poor, and has a large impact on the transmission performance of the UE. Therefore, the UE stops processing downlink information that is sent from a base station by using the communication link. The UE does not delete the communication link, the cell is still retained in the active set, but the UE stops processing the downlink information sent from the cell, so that the downlink information sent from the cell does not affect the transmission performance of the UE. The stopping processing may be stopping receiving or ignoring after receiving.

Optionally, after the stopping, by the UE, processing downlink information that is sent from a base station by using the communication link, the method further includes: further determining, by the UE, whether the communication link between the cell in the active set and the UE meets the preset communication quality requirement; and if the communication link between the cell in the active set and the UE meets the preset communication quality requirement, resuming, by the UE, processing the downlink information that is sent from the base station by using the communication link.

In the downlink information processing method provided in Embodiment 1 of the present invention, when UE determines that a communication link between a cell in an active set and the UE does not meet a preset communication quality requirement, the UE stops processing downlink information that is sent from a base station by using the communication link; therefore, the UE is not affected by the downlink information, and further transmission performance of the UE is not affected.

Figure 2:
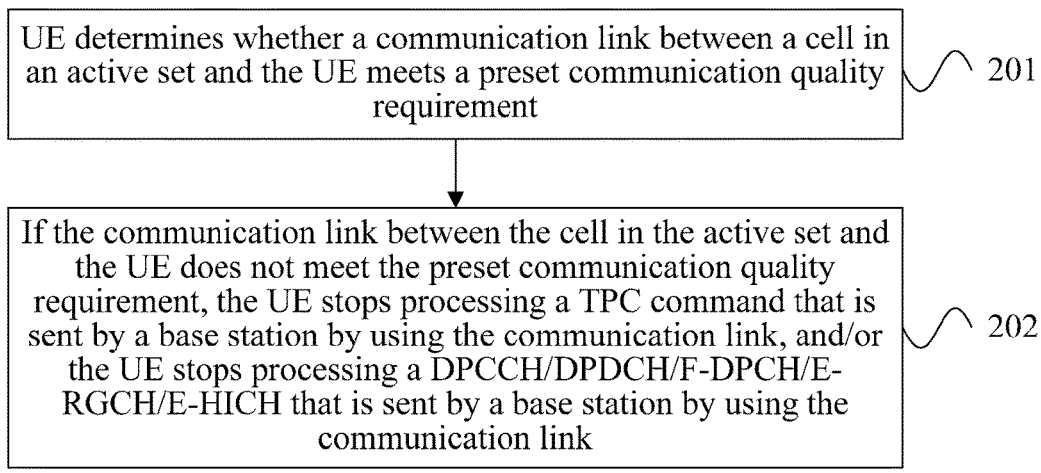
FIG. 2 is a flowchart of Embodiment 2 of a downlink information processing method according to the present invention.

FIG. 2 is a flowchart of Embodiment 2 of a downlink information processing method according to the present invention. As shown in FIG. 2, the method in this embodiment is described as follows:

201: UE determines whether a communication link between a cell in an active set and the UE meets a preset communication quality requirement.

In this embodiment, when a serving cell of the UE is a micro cell, because the UE reports earlier a 1A event of a cell in an active set and delays reporting a 1B event, and after reporting the 1B event, still retains the cell in the active set, the cell is added earlier to the active set and deletion of the cell from the active set is delayed; therefore, signal quality of the communication link between the UE and the cell in the active set is poor. A macro cell or a micro cell sends a transmit power increasing command to the UE, because the signal quality of the communication link is poor, the UE may mistakenly interpret the transmit power increasing command as a transmit power decreasing command, thereby affecting uplink sending performance of the UE. When the UE performs data receiving by combining downlink data channels, a downlink data channel transmitted by using a communication link with poor quality may affect performance of combined reception. If a network side stops sending a downlink data channel on a communication link with poor quality, the UE receives noise on the communication link, and if the noise is used in combined reception, the performance of combined reception is also affected.

Therefore, when the serving cell of the UE is a micro cell, the UE determines whether the communication link between the cell in the active set and the UE meets the preset communication quality requirement, and if the communication link meets the preset communication quality requirement, it indicates that the signal quality of the communication link is good, the UE does not mistakenly interpret a transmit power increasing command sent from the cell as a transmit power decreasing command, and when the UE uses a downlink data channel, which is transmitted by using the communication link, in combined data reception, the performance of combined reception of the UE is not affected; or if the communication link does not meet the preset communication quality requirement, it indicates that the signal quality of the communication link is poor, the UE mistakenly interprets a transmit power increasing command sent from the cell as a transmit power decreasing command, and when the UE uses a downlink data channel, which is transmitted by using the communication link, in combined data reception, the performance of combined reception of the UE is affected.

In addition, when the UE performs downlink power control, the UE involves a dedicated physical control channel (DPCCH)/dedicated physical data channel (DPDCH)/F (Fractional)-dedicated physical channel (DPCH) of each communication link in the active set in signal to interference ratio (SIR) evaluation, and compares an evaluated value with a predefined target value, and if the evaluated value is less than the predefined target value, the UE requests a network to increase transmit power, or if the evaluated value is greater than the predefined target value, the UE requests a network to decrease transmit power. When the UE performs SIR evaluation on the DPCCH/DPDCH/F-DPCH, a communication link with poor quality affects SIR evaluation on a normal communication link. In addition, after a base station stops downlink sending of a communication link, when involved in SIR evaluation, the link has only pure noise, that is, an SIR evaluation value is decreased, and a transmit power increasing command is sent to the network. Therefore, downlink power control of a normal link is affected, and downlink interference is increased.

Therefore, the UE needs to determine, according to the quality of the communication link, whether to involve a DPCCH/DPDCH/F-DPCH received by using the communication link in SIR evaluation. If the quality of the communication link is greater than a preset threshold, the communication link is involved in SIR evaluation on the DPCCH/DPDCH/F-DPCH, or if the quality of the communication link is less than a preset threshold, the communication link is not involved in SIR evaluation on the DPCCH/DPDCH/F-DPCH.

The UE may combine enhanced dedicated channel relative grant channels (E-RGCHs) of all the communication links in the active set. If the quality of the communication link is poor, the UE may mistakenly detect a DOWN command or HOLD command on an E-RGCH on the communication link, for example, mistakenly detecting a HOLD command as a DOWN command. After the mistakenly detected command is sent to an upper layer, uplink transmit power is mistakenly decreased, affecting an uplink throughput. Therefore, the UE needs to determine, according to the quality of the communication link, whether to send relative grant information on the E-RGCH to the high layer of the UE.

The UE may combine signals on enhanced dedicated channel hybrid automatic repeat request acknowledgment indicator channels (E-HICHs) of all the communication links in the active set. If the quality of the communication link is poor, the UE may mistakenly detect an acknowledge (ACK) command on an E-HICH on the communication link as a not acknowledge (NACK) command or a discontinuous transmission (DTX) command. After the mistakenly detected command is sent to the upper layer, it may cause that the upper layer considers that sending does not succeed, and uplink data is sent again. Conversely, a DTX or an NACK is mistakenly detected as an ACK, causing that retransmission is not performed in time, and affecting an uplink throughput. Therefore, the UE needs to determine, according to the quality of the communication link, whether to use a feedback signal on the E-HICH of the communication link in combination processing.

It should be noted that, in this embodiment of the present invention, the "DPCCH/DPDCH/F-DPCH" represents "at least one of the DPCCH, the DPDCH, and the F-DPCH".

202: If the communication link between the cell in the active set and the UE does not meet the preset communication quality requirement, the UE stops processing a transmit power control (TPC) command that is sent from a base station by using the communication link, and/or the UE stops processing a DPCCH/DPDCH/F-DPCH/E-RGCH/E-HICH that is sent from a base station by using the communication link.

In this embodiment, in a first feasible implementation manner, if the UE determines that the communication link between the cell in the active set and the UE does not meet the preset communication quality requirement, it indicates that the signal quality of the communication link is poor, and the UE mistakenly interprets a transmit power increasing command sent from the cell as a transmit power decreasing command; therefore, the UE may stop processing a TPC command that is sent from a base station by using the communication link, that is, the UE does not delete the communication link, the cell is still retained in the active set, but the UE stops processing the TPC command sent from the cell, that is, the UE does not use the TPC command received by using the communication link in performing a power control algorithm to combine TPC commands, that is, no matter the cell instructs the UE to increase transmit power or decrease transmit power, a final TPC command determined by the UE is not limited at all. In addition, the stopping, by the UE, processing a TPC command that is sent from a base station by using the communication link may be implemented by stopping receiving a power control channel sent from using the communication link.

In this embodiment, if the UE determines that the communication link between the cell in the active set and the UE does not meet the preset communication quality requirement, it indicates that the signal quality of the communication link is poor. The UE does not delete the communication link, the communication link is still retained in the active set, and if the base station stops sending a downlink DPDCH by using the communication link, the UE still combines and evaluates DPDCHs in the active set, but the UE receives pure noise on the communication link on which no DPDCH is sent; therefore, DPDCH combination is affected. Therefore, in this embodiment, the UE may stop processing a DPCCH/DPDCH/F-DPCH that is sent from the base station by using the communication link. For example, the stopping, by the UE, a DPCCH/DPDCH/F-DPCH that is sent from the base station by using the communication link includes: stopping, by the UE, receiving the DPCCH/DPDCH/F-DPCH that is sent from the base station by using the communication link; or receiving, by the UE, a DPDCH that is sent from the base station by using the communication link, and stopping using a signal on the DPDCH in combination processing, that is, the UE stops combining the signal on the DPDCH with a signal on a DPDCH transmitted by using another communication link to obtain data; or receiving, by the UE, the DPCCH/DPDCH/F-DPCH that is sent from the base station by using the communication link, and stopping using a signal on the DPCCH/DPDCH/F-DPCH in signal to interference ratio (SIR) evaluation. Therefore, the UE needs to determine, according to the quality of the communication link, whether to use data sent on the DPDCH of the communication link in combination and evaluation. Specifically, if the quality of the communication link is greater than a predefined threshold, the UE uses the DPDCH of the communication link in combined reception, or if the quality of the communication link is less than a predefined threshold, the UE does not use the DPDCH of the link in combined reception.

In this embodiment, the UE needs to determine, according to the quality of the communication link, whether to involve the communication link in SIR evaluation on the DPCCH/DPDCH/F-DPCH. If the quality of the communication link meets the preset communication quality requirement (for example, the quality of the communication link is greater than a threshold), the communication link is involved in SIR evaluation on the DPCCH/DPDCH/F-DPCH, or if the quality of the communication link does not meet the preset communication quality requirement (for example, the quality of the communication link is less than a threshold), the communication link is not involved in SIR evaluation on the DPCCH/DPDCH/F-DPCH.

In this embodiment, the UE needs to determine, according to the quality of the communication link, whether to involve the communication link in E-RGCH processing. If the quality of the communication link meets the preset communication quality requirement (for example, the quality of the communication link is greater than a threshold), a relative grant signal on an E-RGCH of the communication link is used in combination processing, or if the quality of the communication link does not meet the preset communication quality requirement (for example, the quality of the communication link is less than a threshold), for example, E-RGCH channel quality is less than a threshold, the UE stops processing an E-RGCH that is sent from the base station by using the communication link, for example, the stopping, by the UE, processing an E-RGCH that is sent from the base station by using the communication link includes: stopping, by the UE, receiving the E-RGCH that is sent from the base station by using the communication link; or receiving, by the UE, the E-RGCH that is sent from the base station by using the communication link, and stopping using a relative grant signal on the E-RGCH in combination processing, that is, after the UE receives the E-RGCH of the communication link, the relative grant signal on the E-RGCH is not involved in combination of relative grant signals on E-RGCHs of a wireless link set in which the communication link is located.

In this embodiment, if the quality of the communication link does not meet the preset communication quality requirement, the UE receives an E-RGCH that is sent from the base station by using the communication link, and stops sending relative grant information on the E-RGCH to the upper layer of the UE. When the wireless link set has only the communication link, the UE discards a detection signal of the E-RGCH or does not send a detection signal of the E-RGCH to the upper layer of the UE, where the upper layer of the UE may be a Media Access Control (MAC) layer of the UE.

In this embodiment, the UE needs to determine, according to the quality of the communication link, whether to involve the communication link in E-HICH processing. If the quality of the communication link meets the preset communication quality requirement (for example, the quality of the communication link is greater than a threshold), a feedback signal on the E-HICH of the communication link is used in combination processing, or if the quality of the communication link does not meet the preset communication quality requirement (for example, the quality of the communication link is less than a threshold), for example, E-HICH channel quality is less than a threshold, the UE stops processing an E-HICH that is sent from the base station by using the communication link, for example, the stopping, by the UE, processing an E-HICH that is sent from the base station by using the communication link includes: stopping, by the UE, receiving the E-HICH that is sent from the base station by using the communication link; or receiving, by the UE, the E-HICH that is sent from the base station by using the communication link, and stopping using a feedback signal on the E-HICH in combination processing, that is, after the UE receives the E-HICH of the communication link, the feedback signal on the E-HICH is not involved in combination of ACK/NACK/DTX signals of E-HICHs of the wireless link set in which the communication link is located.

In this embodiment, if the quality of the communication link does not meet the preset communication quality requirement, the UE receives an E-HICH that is sent from the base station by using the communication link, and stops sending feedback information on the E-HICH to the upper layer of the UE. When the wireless link set has only the communication link, the UE discards a detection signal of the E-HICH or does not send a detection signal of the E-HICH to the upper layer of the UE.

The "DPCCH/DPDCH/F-DPCH/E-RGCH/E-HICH" may represent "at least one of the DPCCH, the DPDCH, the F-DPCH, the E-RGCH, and the E-HICH".

In addition, an implementation manner in which the quality of the communication link does not meet a preset or agreed communication quality requirement may be that, the quality of the communication link does not meet both channel quality of at least one channel in the DPCCH/DPDCH/F-DPCH/E-RGCH/E-HICH and channel quality of a common pilot channel (CPICH).

It should be noted that, the cell in the active set mentioned in this embodiment may be a macro cell in the active set, or may be a micro cell in the active set, which is not limited in this embodiment.

Preferably, the cell in the active set mentioned in this embodiment is a macro cell in the active set.

In the downlink information processing method provided in Embodiment 2 of the present invention, when UE determines that a communication link between a cell in an active set and the UE does not meet a preset communication quality requirement, if the UE stops processing a TPC command that is sent from a base station by using the communication link, the UE does not mistakenly interpret a transmit power increasing command as a transmit power decreasing command, so that uplink sending performance of the UE is not affected, and if the UE stops processing a DPCCH/DPDCH/F-DPCH/E-RGCH/E-HICH that is sent from a base station by using the communication link, the UE does not use a signal on a DPDCH transmitted by using the communication link with poor quality in combined data reception, or does not use a signal on a DPCCH/DPDCH/F-DPCH transmitted by using the communication link with poor quality in SIR evaluation, or does not use an E-RGCH of the communication link with poor quality in combination of relative grant signals, or does not use an E-HICH of the communication link with poor quality in combination of ACK/NACK/DTX signals, so that performance of combined data reception by the UE is not affected, downlink interference is not increased, and an uplink throughput is not affected, either.

Figure 3:
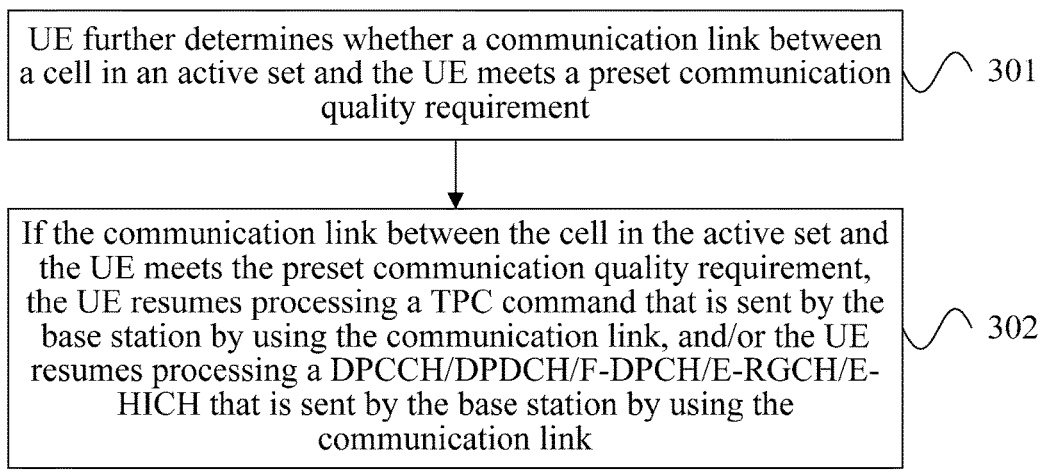
FIG. 3 is a flowchart of Embodiment 3 of a downlink information processing method according to the present invention.

FIG. 3 is a flowchart of Embodiment 3 of a downlink information processing method according to the present invention. As shown in FIG. 3, based on Embodiment 2 of the downlink information processing method shown in FIG. 2, the method in this embodiment may further include the following content:

301: UE further determines whether a communication link between a cell in an active set and the UE meets a preset communication quality requirement.

In this embodiment, after 202 shown in FIG. 2 is performed, 301 may be further performed, that is, after the UE stops processing the TPC command that is sent from the base station by using the communication link between the cell in the active set and the UE and/or the UE stops processing the downlink information, for example, DPCCH/DPDCH/F-DPCH/E-RGCH/E-HICH, that is sent from the base station by using the communication link, the UE may move to the cell, so that the signal quality of the communication link between the cell and the UE is improved, and therefore, the UE may further determine whether the communication link between the cell in the active set and the UE meets the preset communication quality requirement, and if the communication link meets the preset communication quality requirement, it indicates that the quality of the communication link is improved, the UE does not mistakenly interpret a transmit power increasing command sent from the cell as a transmit power decreasing command, and when the UE uses the DPDCH transmitted by using the communication link in combined data reception, the performance of combined reception of the UE is not affected or when the DPCCH/DPDCH/F-DPCH of the link is involved in SIR evaluation, downlink power control is not affected; or if the communication link does not meet the preset communication quality requirement, it indicates that the signal quality of the communication link is still poor, the UE mistakenly interprets a transmit power increasing command sent from the cell as a transmit power decreasing command, and when the UE uses the DPDCH transmitted by using the communication link in combined data reception, the performance of combined reception of the UE is affected, or when the DPCCH/DPDCH/F-DPCH of the communication link is involved in SIR evaluation, downlink power control is affected, or when the E-RGCH of the communication link is used in combination of relative grant signals, the uplink throughput is affected, or when the E-HICH of the communication link is used in combination of ACK/NACK/DTX signals, the uplink throughput is affected.

302: If the communication link between the cell in the active set and the UE meets the preset communication quality requirement, the UE resumes processing a TPC command that is sent from a base station by using the communication link, and/or the UE resumes processing a DPCCH/DPDCH/F-DPCH/E-RGCH/E-HICH that is sent from the base station by using the communication link.

In this embodiment, in a first feasible implementation manner, if the UE determines that the communication link between the cell in the active set and the UE meets the preset communication quality requirement, it indicates that the signal quality of the communication link is improved, and the UE does not mistakenly interpret a transmit power increasing command sent from the cell as a transmit power decreasing command, that is, the UE correctly interprets the transmit power increasing command sent from the cell. Therefore, in this case, the UE may resume processing the TPC command that is sent from the base station by using the communication link, that is, the UE resumes, based on that the communication link is not deleted and the cell is still retained in the active set, processing the TPC command sent from the cell, that is, the UE uses the TPC command received by using the communication link in performing a power control algorithm to combine TPC commands, so as to ensure that when the cell requires the UE to increase or decrease transmit power, the UE can increase or decrease the transmit power in time, ensuring the uplink sending performance of the UE.

In a second feasible implementation manner, if the UE determines that the communication link between the cell in the active set and the UE meets the preset communication quality requirement, it indicates that the signal quality of the communication link is improved, and the UE resumes processing the DPCCH/DPDCH/F-DPCH/E-RGCH/E-HICH sent from using the communication link. The resuming, by the UE, processing the DPCCH/DPDCH/F-DPCH/E-RGCH/E-HICH that is sent from the base station by using the communication link includes: resuming, by the UE, receiving the DPCCH/DPDCH/F-DPCH/E-RGCH/E-HICH that is sent from the base station by using the communication link; or receiving, by the UE, the DPDCH that is sent from the base station by using the communication link, and resuming using the signal on the DPDCH in combination processing; or receiving, by the UE, the DPCCH/DPDCH/F-DPCH that is sent from the base station by using the communication link, and resuming using the signal on the DPCCH/DPDCH/F-DPCH in SIR evaluation; or receiving, by the UE, the E-RGCH sent from using the communication link, and resuming using the relative grant signal on the E-RGCH in combination processing; or receiving, by the UE, the E-RGCH sent from using the communication link, and resuming sending the relative grant information on the E-RGCH to the upper layer of the UE; or receiving, by the UE, the E-HICH sent from using the communication link, and resuming using the feedback signal on the E-HICH in combination processing; or receiving, by the UE, the E-HICH that is sent from the base station by using the communication link, and resuming sending the feedback information on the E-HICH to the upper layer of the UE. For example, if the quality of the communication link is greater than a predefined threshold, the UE uses the DPDCH of the communication link in combined reception of channels, or uses the DPCCH/DPDCH in SIR evaluation, or uses the E-RGCH in combination of relative grant information, or sends a relative grant command of the communication link to the upper layer of the UE, or uses the E-HICH in combination of ACK/NACK/DTX signals, or sends the feedback information of the communication link to the upper layer of the UE.

It should be noted that, the cell in the active set mentioned in this embodiment may be a macro cell in the active set, or may be a micro cell in the active set, which is not limited in this embodiment.

Preferably, the cell in the active set mentioned in this embodiment is a macro cell in the active set.

In the downlink information processing method provided in Embodiment 3 of the present invention, when UE determines that a communication link between a cell in an active set and the UE meets a preset communication quality requirement, the UE can resume processing a TPC command that is sent from a base station by using the communication link, so that the UE can correctly interpret a transmit power increasing or decreasing command, and further increase or decrease transmit power, thereby ensuring uplink sending performance of the UE, and the UE can resume processing a DPCCH/DPDCH/F-DPCH/E-RGCH/E-HICH that is sent from a base station by using the communication link, thereby ensuring performance of combined data reception by the UE, ensuring downlink power control of a normal link, and further ensuring an uplink throughput of the UE.

Figure 4:
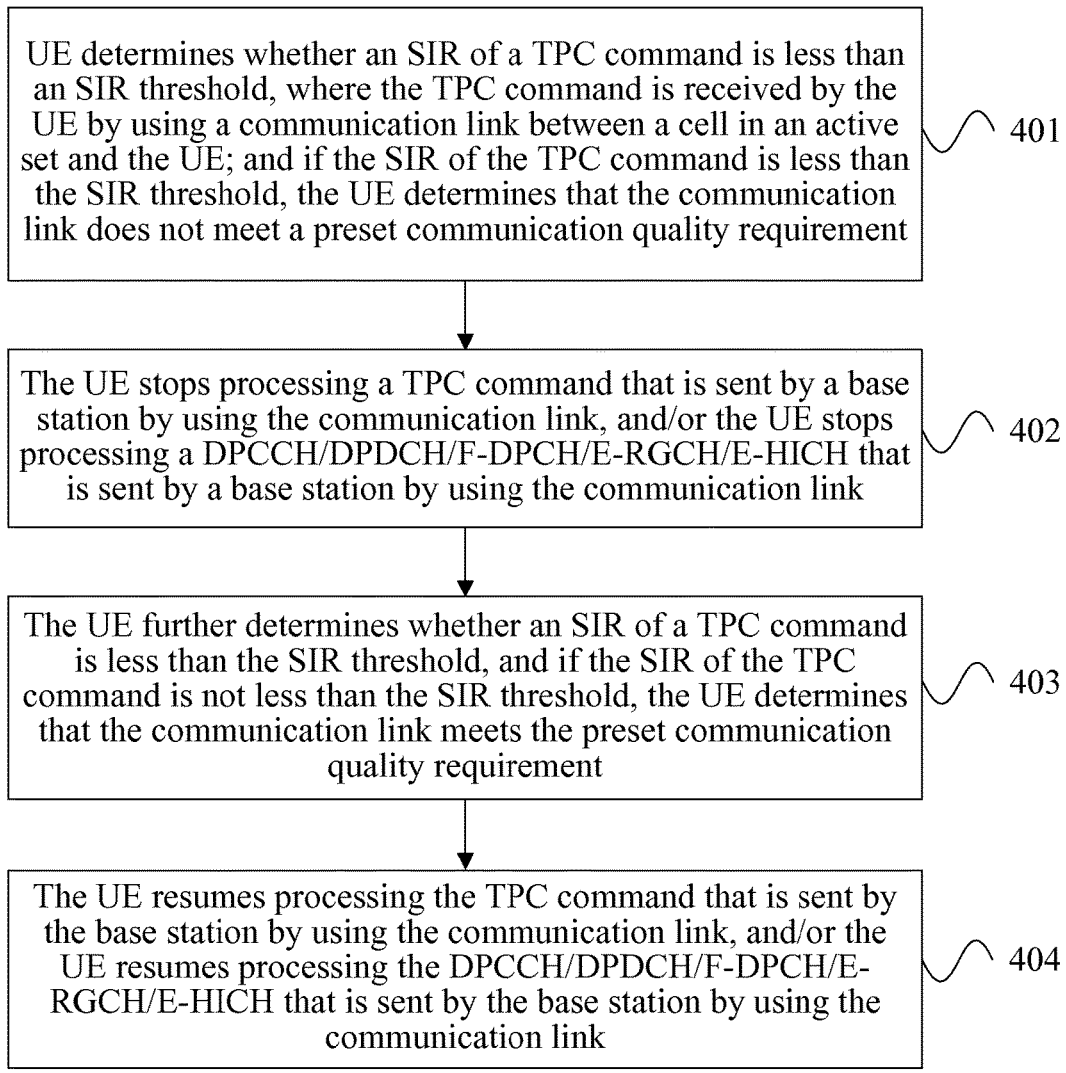
FIG. 4 is a flowchart of Embodiment 4 of a downlink information processing method according to the present invention.

FIG. 4 is a flowchart of Embodiment 4 of a downlink information processing method according to the present invention. As shown in FIG. 4, the method in this embodiment may be described as follows:

401: UE determines whether a signal to interference ratio (SIR) of a TPC command is less than an SIR threshold, where the TPC command is received by the UE by using a communication link between a cell in an active set and the UE; and if the SIR of the TPC command is less than the SIR threshold, the UE determines that the communication link does not meet a preset communication quality requirement.

In this embodiment, when a serving cell of the UE is a micro cell, the UE determines whether the communication link between the cell in the active set and the UE meets the preset communication quality requirement, that is, the UE determines whether the SIR of the TPC command is less than the SIR threshold, where the TPC command is received by the UE by using the communication link between the cell in the active set and the UE, and the SIR threshold is preset; and if the UE determines that the SIR of the TPC command is not less than the SIR threshold, it indicates that the communication link meets the preset communication quality requirement, that is, signal quality of the communication link is good, the UE does not mistakenly interpret a transmit power increasing command sent from the cell as a transmit power decreasing command, and when the UE uses a DPDCH transmitted by using the communication link in combined data reception, performance of combined reception of the UE is not affected, or when a DPCCH/DPDCH/F-DPCH of the link is involved in SIR evaluation, downlink power control is affected; or if the UE determines that the SIR of the TPC command is less than the SIR threshold, it indicates that the communication link does not meet the preset communication quality requirement, that is, signal quality of the communication link is poor, the UE mistakenly interprets a transmit power increasing command sent from the cell as a transmit power decreasing command, and when the UE uses a DPDCH transmitted by using the communication link in combined data reception, performance of combined reception of the UE is affected, or when a DPCCH/DPDCH/F-DPCH of the link is involved in SIR evaluation, downlink power control is not affected, or when an E-RGCH of the communication link is used in combination of relative grant information, an uplink throughput is affected, or when an E-HICH of the communication link is used in combination of ACK/NACK/DTX signals, an uplink throughput is affected, and then 402 may be performed.

402: The UE stops processing a TPC command that is sent from a base station by using the communication link, and/or the UE stops processing a DPCCH/DPDCH/F-DPCH/E-RGCH/E-HICH that is sent from a base station by using the communication link.

In this embodiment, a specific implementation process of 402 is similar to the specific implementation process of 202 in the embodiment of the downlink information processing method shown in FIG. 2, and reference may be made to the record in 202 for a detailed process, which is not further described in this embodiment.

Further, the method in this embodiment may further include the following:

403: The UE further determines whether an SIR of a TPC command is less than the SIR threshold, and if the SIR of the TPC command is not less than the SIR threshold, the UE determines that the communication link meets the preset communication quality requirement.

In this embodiment, after the UE determines that the SIR of the TPC command is less than the SIR threshold and the UE stops processing the transmit power control (TPC) command that is sent from the base station by using the communication link and/or the UE stops processing the DPCCH/DPDCH/F-DPCH/E-RGCH/E-HICH that is sent from the base station by using the communication link, the UE may move to the cell, so that the signal quality of the communication link between the cell and the UE is improved, and the UE determines whether the communication link meets the preset communication quality requirement, that is, the UE determines whether an SIR of a TPC command received by using the communication link is less than the SIR threshold, and if the SIR of the TPC command is less than the SIR threshold, the communication link does not meet the preset communication quality requirement, that is, it indicates that the signal quality of the communication link is still poor, the UE mistakenly interprets a transmit power increasing command sent from the cell as a transmit power decreasing command, and when the UE uses the DPDCH transmitted by using the communication link in combined data reception, the performance of combined reception of the UE is affected, or when the DPCCH/DPDCH/F-DPCH of the link is involved in SIR evaluation, downlink power control is affected; or if the SIR of the TPC command is not less than the SIR threshold, it indicates that the communication link meets the preset communication quality requirement, that is, the quality of the communication link is improved, the UE does not mistakenly interpret a transmit power increasing command sent from the cell as a transmit power decreasing command, and when the UE uses the DPDCH transmitted by using the communication link in combined data reception, the performance of combined reception of the UE is not affected, or when the DPCCH/DPDCH/F-DPCH of the communication link is involved in SIR evaluation, downlink power control is not affected, or when the E-RGCH of the communication link is used in combination of relative grant information, the uplink throughput is not affected, or when the E-HICH of the communication link is used in combination of ACK/NACK/DTX signals, the uplink throughput is not affected, and then 404 may be performed. It should be noted that the SIR threshold may be preset by the UE, or may be delivered by a radio network controller (RNC) to the UE, which is not limited in this embodiment.

404: The UE resumes processing the TPC command that is sent from the base station by using the communication link, and/or the UE resumes processing the DPCCH/DPDCH/F-DPCH/E-RGCH/E-HICH that is sent from the base station by using the communication link.

In this embodiment, a specific implementation process of 404 is similar to the specific implementation process of 302 in the embodiment of the downlink information processing method shown in FIG. 3, and reference may be made to the record in 302 for a detailed process, which is not further described in this embodiment.

It should be noted that, the cell in the active set mentioned in this embodiment may be a macro cell in the active set, or may be a micro cell in the active set, which is not limited in this embodiment.

Preferably, the cell in the active set mentioned in this embodiment is a macro cell in the active set.

In the downlink information processing method provided in Embodiment 4 of the present invention, when UE determines that an SIR of a TPC command is less than an SIR threshold, the UE stops processing a TPC command that is sent from a base station by using a communication link between a cell in an active set and the UE and/or stops processing a DPCCH/DPDCH/F-DPCH/E-RGCH/E-HICH that is sent from the base station by using the communication link, and then when the UE determines that the SIR of the TPC command is not less than the SIR threshold, the UE resumes processing the TPC command that is sent from the base station by using the communication link and/or resumes processing the DPCCH/DPDCH/F-DPCH/E-RGCH/E-HICH that is sent from the base station by using the communication link, so that the UE does not mistakenly interpret a transmit power increasing command as a transmit power decreasing command, and further uplink sending performance of the UE is not affected, performance of combined data reception by the UE is not affected, downlink interference is not increased, and an uplink throughput is not affected, either.

Figure 5:
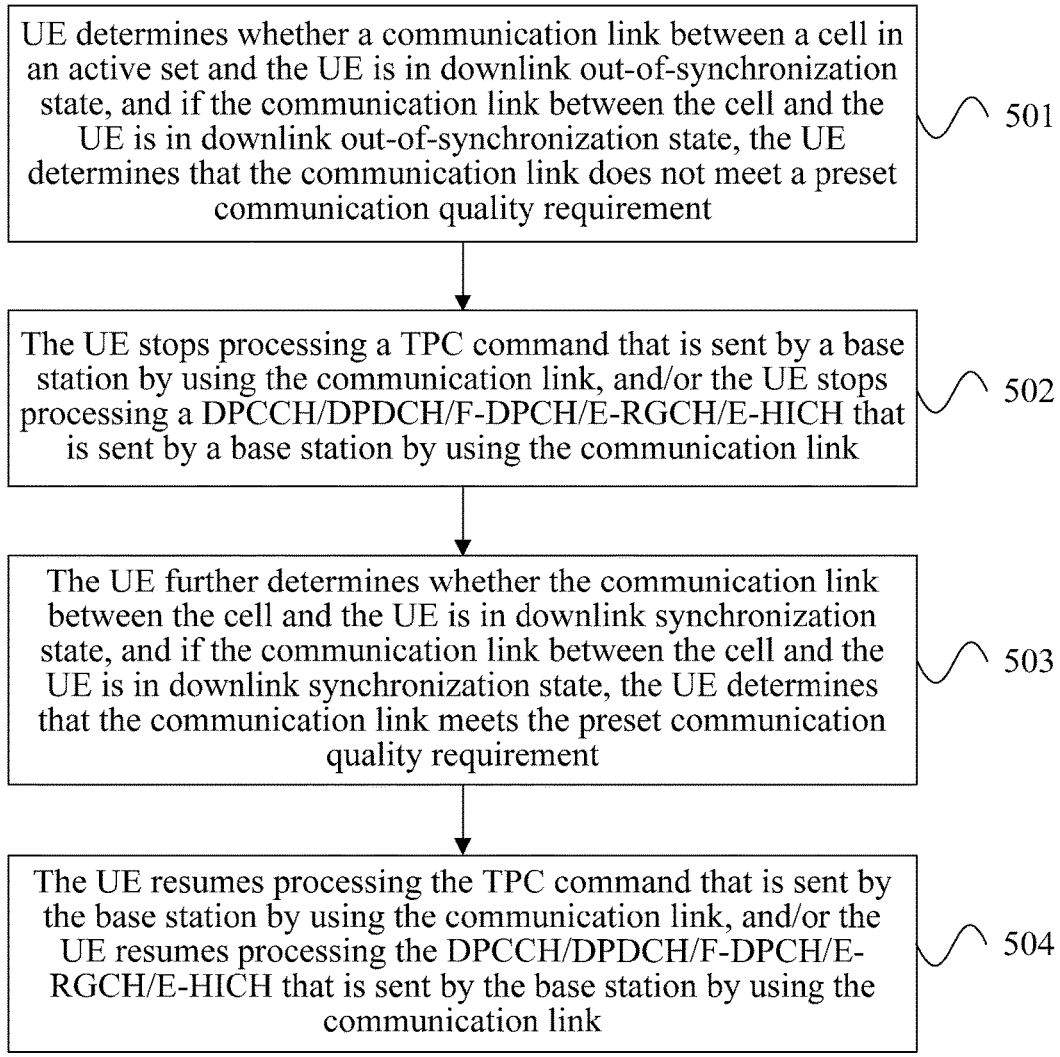
FIG. 5 is a flowchart of Embodiment 5 of a downlink information processing method according to the present invention.

FIG. 5 is a flowchart of Embodiment 5 of a downlink information processing method according to the present invention. As shown in FIG. 5, the method in this embodiment may be described as follows:

501: UE determines whether a communication link between a cell in an active set and the UE is in downlink out-of-synchronization state, and if the communication link between the cell and the UE is in downlink out-of-synchronization state, the UE determines that the communication link does not meet a preset communication quality requirement.

In this embodiment, when a serving cell of the UE is a micro cell, the UE determines whether the communication link between the cell in the active set and the UE meets the preset communication quality requirement, that is, the UE determines, according to whether the communication link between the cell and the UE is in downlink out-of-synchronization state, whether the communication link between the cell and the UE meets the preset communication quality requirement, and if the UE determines that the communication link is in downlink out-of-synchronization state, it indicates that the communication link does not meet the preset communication quality requirement, that is, signal quality of the communication link is poor, the UE mistakenly interprets a transmit power increasing command sent from the cell as a transmit power decreasing command, and when the UE uses a DPDCH transmitted by using the communication link in combined data reception, performance of combined reception of the UE is affected, or when a DPCCH/DPDCH/F-DPCH of the communication link is involved in SIR evaluation, downlink power control is affected, or when an E-RGCH of the communication link is used in combination of relative grant information, an uplink throughput is affected, or when an E-HICH of the communication link is used in combination of ACK/NACK/DTX signals, an uplink throughput is affected, and then 502 may be performed. It should be noted that, the determining, by the UE, whether a communication link is in downlink out-of-synchronization state is consistent with that in the prior art, and details are not described in this embodiment.

502: The UE stops processing a TPC command that is sent from a base station by using the communication link, and/or the UE stops processing a DPCCH/DPDCH/F-DPCH/E-RGCH/E-HICH that is sent from a base station by using the communication link.

In this embodiment, a specific implementation process of 502 is similar to the specific implementation process of 202 in the embodiment of the downlink information processing method shown in FIG. 2, and reference may be made to the record in 202 for a detailed process, which is not further described in this embodiment.

Further, the method in this embodiment may further include the following:

503: The UE further determines whether the communication link between the cell and the UE is in downlink synchronization state, and if the communication link between the cell and the UE is in downlink synchronization state, the UE determines that the communication link meets the preset communication quality requirement.

In this embodiment, after the UE determines that the communication link is in downlink out-of-synchronization state and the UE stops processing the transmit power control (TPC) command that is sent from the base station by using the communication link and/or the UE stops processing the DPCCH/DPDCH/F-DPCH/E-RGCH/E-HICH that is sent from the base station by using the communication link, the UE may move to the cell, so that the signal quality of the communication link between the cell and the UE is improved, and the UE determines whether the communication link meets the preset communication quality requirement, that is, the UE determines whether the communication link is in downlink synchronization state, and if the communication link is in downlink synchronization state, it indicates that the communication link meets the preset communication quality requirement, that is, the quality of the communication link is improved, the UE does not mistakenly interpret a transmit power increasing command sent from the cell as a transmit power decreasing command, and when the UE uses the DPDCH transmitted by using the communication link in combined data reception, the performance of combined reception of the UE is not affected, or when the DPCCH/DPDCH/F-DPCH of the link is involved in SIR evaluation, downlink power control is not affected, or when the E-RGCH of the communication link is used in combination of relative grant information, the uplink throughput is not affected, or when the E-HICH of the communication link is used in combination of ACK/NACK/DTX signals, the uplink throughput is not affected, and then 504 may be performed.

504: The UE resumes processing the TPC command that is sent from the base station by using the communication link, and/or the UE resumes processing the DPCCH/DPDCH/F-DPCH/E-RGCH/E-HICH that is sent from the base station by using the communication link.

In this embodiment, a specific implementation process of 504 is similar to the specific implementation process of 302 in the embodiment of the downlink information processing method shown in FIG. 3, and reference may be made to the record in 302 for a detailed process, which is not further described in this embodiment.

It should be noted that, the cell in the active set mentioned in this embodiment may be a macro cell in the active set, or may be a micro cell in the active set, which is not limited in this embodiment.

Preferably, the cell in the active set mentioned in this embodiment is a macro cell in the active set.

In the downlink information processing method provided in Embodiment 5 of the present invention, when UE determines that a communication link between a cell in an active set and the UE is in downlink out-of-synchronization state, the UE stops processing a TPC command that is sent from a base station by using the communication link and/or stops processing a DPCCH/DPDCH/F-DPCH/E-RGCH/E-HICH that is sent from a base station by using the communication link, and further, when the UE determines that the communication link is in downlink synchronization state, the UE resumes processing the TPC command that is sent from the base station by using the communication link and/or resumes processing the DPCCH/DPDCH/F-DPCH/E-RGCH/E-HICH that is sent from the base station by using the communication link, so that the UE does not mistakenly interpret a transmit power increasing command as a transmit power decreasing command, and further uplink sending performance of the UE is not affected, performance of combined data reception by the UE is not affected, downlink interference is not increased, and an uplink throughput is not affected, either.

Figure 6:
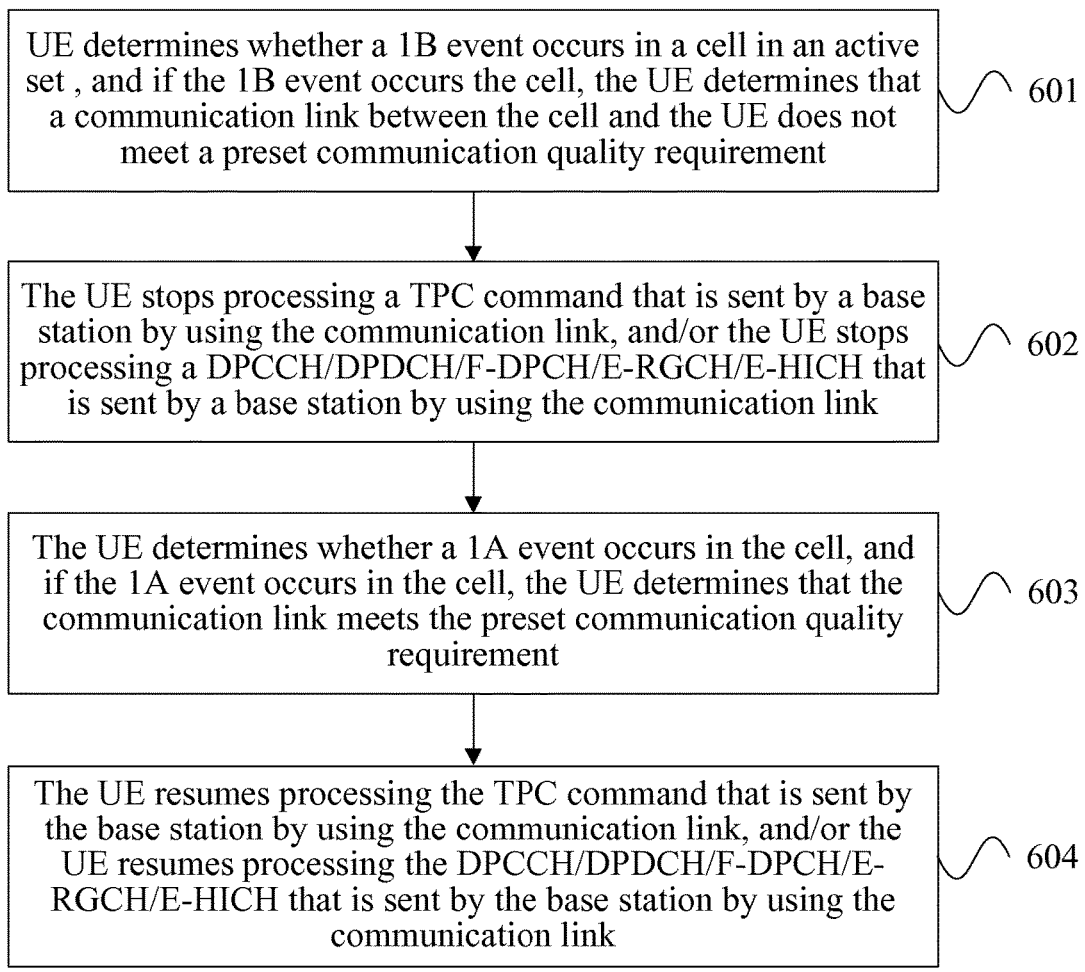
FIG. 6 is a flowchart of Embodiment 6 of a downlink information processing method according to the present invention.

FIG. 6 is a flowchart of Embodiment 6 of a downlink information processing method according to the present invention. As shown in FIG. 6, the method in this embodiment may be described as follows:

601: UE determines whether a cell in an active set meets a 1B event, and if the 1B event occurs in the cell, the UE determines that a communication link between the cell and the UE does not meet a preset communication quality requirement.

In this embodiment, when a serving cell of the UE is a micro cell, the UE determines whether the communication link between the cell in the active set and the UE meets the preset communication quality requirement, that is, the UE determines, according to whether the 1B event occurs in the cell, whether the communication link between the cell and the UE meets the preset communication quality requirement, and if the UE determines that the 1B event occurs in the cell, it indicates that the communication link does not meet the preset communication quality requirement, that is, signal quality of the communication link is poor, the UE mistakenly interprets a transmit power increasing command sent from the cell as a transmit power decreasing command, and when the UE uses a DPDCH transmitted by using the communication link in combined data reception, performance of combined reception of the UE is affected, or when a DPCCH/DPDCH/F-DPCH of the communication link is involved in SIR evaluation, downlink power control is affected, or when an E-RGCH of the communication link is used in combination of relative grant information, an uplink throughput is affected, or when an E-HICH of the communication link is used in combination of ACK/NACK/DTX signals, an uplink throughput is affected, and then 602 may be performed. It should be noted that, the 1B event is consistent with that in the prior art, which is not described in detail in this embodiment.

Further, after determining that the 1B event occurs in the cell, the UE may further determine whether the communication link is in downlink out-of-synchronization state, and if the communication link is not in downlink out-of-synchronization state, it indicates that the communication link meets the preset communication quality requirement, that is, the signal quality of the communication link is good; or if the communication link is in downlink out-of-synchronization state, it indicates that the communication link does not meet the preset communication quality requirement, that is, the signal quality of the communication link is poor, and then 602 may be performed.

Further, after determining that the 1B event occurs in the cell, the UE may further determine whether signal quality of a DPCCH/DPDCH/F-DPCH/E-RGCH/E-HICH of the communication link between the cell and the UE is less than a threshold, or the UE may further determine a difference between signal quality of a DPCCH/DPDCH/F-DPCH/E-RGCH/E-HICH of the communication link between the cell and the UE and signal quality of a DPCCH/DPDCH/F-DPCH/E-RGCH/E-HICH of a reference communication link (for example, a communication link between the serving cell of the UE and the UE) is less than a threshold, and if it is less than the threshold, it indicates that the communication link between the cell and the UE does not meet the preset communication quality requirement.

Optionally, after determining that the cell in the active set meets the 1B event, a wireless link control protocol (RRC) layer of the UE instructs a physical layer to stop signal processing of the communication link between the cell and the UE. For example, the RRC layer of the UE sends an indication primitive of deleting or suspending the communication link to the physical layer, and the physical layer releases or suspends the communication link; or the RRC layer sets a variable, to instruct the physical layer not to perform or to suspend signal processing of the communication link.

602: The UE stops processing a TPC command that is sent from a base station by using the communication link, and/or the UE stops processing a DPCCH/DPDCH/F-DPCH/E-RGCH/E-HICH that is sent from a base station by using the communication link.

In this embodiment, a specific implementation process of 602 is similar to the specific implementation process of 202 in the embodiment of the downlink information processing method shown in FIG. 2, and reference may be made to the record in 202 for a detailed process, which is not further described in this embodiment.

Further, the method in this embodiment may further include the following:

603: The UE determines whether a 1A event occurs in the cell, and if the 1A event occurs in the cell, the UE determines that the communication link meets the preset communication quality requirement.

In this embodiment, after the UE determines that the 1B event occurs in the cell and the UE stops processing the transmit power control (TPC) command that is sent from the base station by using the communication link and/or the UE stops processing the DPCCH/DPDCH/F-DPCH/E-RGCH/E-HICH that is sent from the base station by using the communication link, the UE may move to the cell, so that the signal quality of the communication link between the cell and the UE is improved, and the UE determines whether the communication link meets the preset communication quality requirement, that is, the UE determines whether a 1A event occurs in the cell, and if the 1A event occurs in the cell, it indicates that the communication link meets the preset communication quality requirement, that is, the quality of the communication link is improved, the UE does not mistakenly interpret a transmit power increasing command sent from the cell as a transmit power decreasing command, and when the UE uses the DPDCH transmitted by using the communication link in combined data reception, the performance of combined reception of the UE is not affected, or when the DPCCH/DPDCH/F-DPCH of the link is involved in SIR evaluation, downlink power control is not affected, or when the E-RGCH of the communication link is used in combination of relative grant information, the uplink throughput is not affected, or when the E-HICH of the communication link is used in combination of ACK/NACK/DTX signals, the uplink throughput is not affected, and then 604 may be performed.

Further, after determining that the 1A event occurs in the cell, the UE may further determine whether the communication link is in downlink synchronization state, and if the communication link is not in downlink synchronization state, it indicates that the communication link still does not meet the preset communication quality requirement, that is, the signal quality of the communication link is still poor; or if the communication link is in downlink synchronization state, it indicates that the communication link meets the preset communication quality requirement, that is, the signal quality of the communication link is good, and then 604 may be performed.

Further, after determining that the 1A event occurs in the cell, the UE may further determine whether the signal quality of the DPCCH/DPDCH/F-DPCH/E-RGCH/E-HICH of the communication link between the cell and the UE is greater than a threshold, or the UE may further determine the difference between the signal quality of the DPCCH/DPDCH/F-DPCH/E-RGCH/E-HICH of the communication link between the cell and the UE and the signal quality of the DPCCH/DPDCH/F-DPCH/E-RGCH/E-HICH of the reference communication link (for example, the communication link between the serving cell of the UE and the UE) is greater than a threshold, and if it is greater than the threshold, it indicates that the communication link meets the preset communication quality requirement.

Optionally, after determining that the cell in the active set meets the 1A event, the RRC layer of the UE instructs the physical layer to resume signal processing of the communication link between the cell and the UE. For example, the RRC layer of the UE sends an indication primitive of establishing or resuming the communication link to the physical layer, and the physical layer establishes or resumes the communication link; or the RRC layer sets a variable, to instruct the physical layer to process signal processing of the communication link.

Further, the UE may execute a synchronization process B for the communication link according to indication of a primitive or variable, where the synchronization process B is that the UE performs downlink synchronization state detection according to timing offset information configured by a network, and when determining that quality of a DPCCH or quality of a TPC command is greater than a threshold, synchronization is reported to an upper layer, or when determining that quality of a DPCCH or quality of a TPC command is less than a threshold, out-of-synchronization is reported to an upper layer.

604: The UE resumes processing the TPC command that is sent from the base station by using the communication link, and/or the UE resumes processing the DPCCH/DPDCH/F-DPCH/E-RGCH/E-HICH that is sent from the base station by using the communication link.

In this embodiment, a specific implementation process of 604 is similar to the specific implementation process of 302 in the embodiment of the downlink information processing method shown in FIG. 3, and reference may be made to the record in 302 for a detailed process, which is not further described in this embodiment.

It should be noted that, the cell in the active set mentioned in this embodiment may be a macro cell in the active set, or may be a micro cell in the active set, which is not limited in this embodiment.

Preferably, the cell in the active set mentioned in this embodiment is a macro cell in the active set.

In the downlink information processing method provided in Embodiment 6 of the present invention, when UE determines that a 1B event occurs in a cell in an active set and further determines that a communication link is in downlink out-of-synchronization state, the UE stops processing a TPC command that is sent from a base station by using the communication link and/or stops processing a DPCCH/DPDCH/F-DPCH/E-RGCH/E-HICH that is sent from a base station by using the communication link, and then, when the UE determines that a 1A event occurs in the cell and further determines that the communication link is in downlink synchronization state, the UE resumes processing the TPC command that is sent from the base station by using the communication link and/or resumes processing the DPCCH/DPDCH/F-DPCH/E-RGCH/E-HICH that is sent from the base station by using the communication link, so that the UE does not mistakenly interpret a transmit power increasing command as a transmit power decreasing command, and further uplink sending performance of the UE is not affected, performance of combined data reception by the UE is not affected, downlink power control is not affected, and an uplink throughput is not affected, either.

Figure 7:
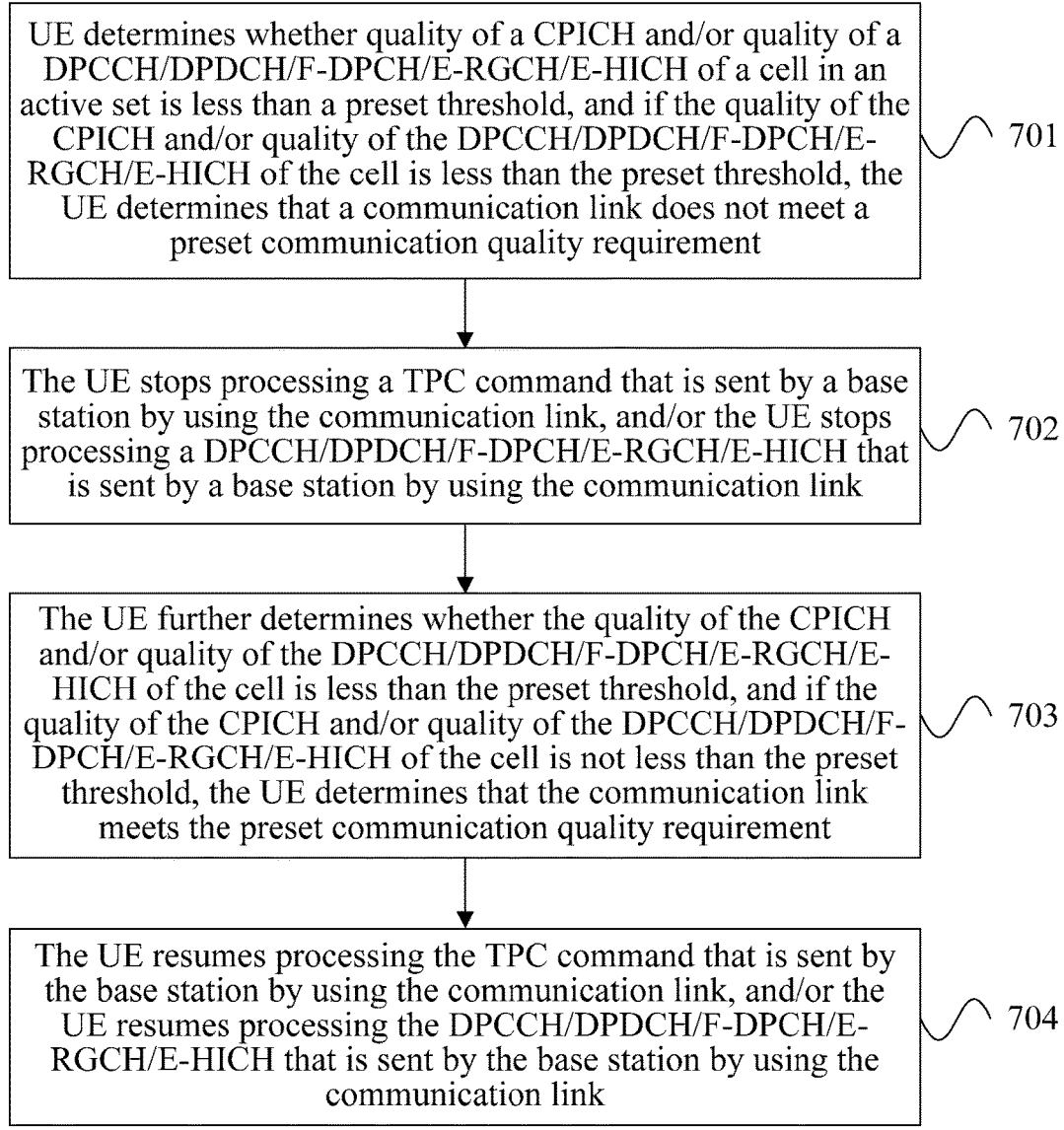
FIG. 7 is a flowchart of Embodiment 7 of a downlink information processing method according to the present invention.

FIG. 7 is a flowchart of Embodiment 7 of a downlink information processing method according to the present invention. As shown in FIG. 7, the method in this embodiment may be described as follows:

701: UE determines whether quality of a CPICH and/or quality of a DPCCH/DPDCH/F-DPCH/E-RGCH/E-HICH of a cell in an active set is less than a preset threshold, and if the quality of the CPICH and/or quality of the DPCCH/DPDCH/F-DPCH/E-RGCH/E-HICH of the cell is less than the preset threshold, the UE determines that a communication link does not meet a preset communication quality requirement.

In this embodiment, when a serving cell of the UE is a micro cell, the UE determines whether a communication link between the cell in the active set and the UE meets the preset communication quality requirement, that is, the UE determines, according to whether the quality of the CPICH and/or the quality of the DPCCH/DPDCH/F-DPCH/E-RGCH/E-HICH of the cell is less than the preset threshold, whether the communication link between the cell and the UE meets the preset communication quality requirement, where it should be noted that for different channels, the preset threshold is a threshold for a corresponding channel, and if the UE determines that the quality of the CPICH and/or quality of the DPCCH/DPDCH/F-DPCH/E-RGCH/E-HICH of the cell is less than the preset threshold, it indicates that the communication link does not meet the preset communication quality requirement, that is, signal quality of the communication link is poor, the UE mistakenly interprets a transmit power increasing command sent from the cell as a transmit power decreasing command, and when the UE uses a DPDCH transmitted by using the communication link in combined data reception, performance of combined reception of the UE is affected, or when a DPCCH/DPDCH/F-DPCH of the communication link is involved in SIR evaluation, downlink power control is affected, or when an E-RGCH of the communication link is used in combination of relative grant information, an uplink throughput is affected, or when an E-HICH of the communication link is used in combination of ACK/NACK/DTX signals, an uplink throughput is affected, and then 702 may be performed. The F-DPCH represents an F (Fractional)-dedicated physical channel (DPCH).

Optionally, after determining that the signal quality of the CPICH of the communication link is less than a threshold, an RRC layer of the UE instructs a physical layer to stop signal processing of the communication link. For example, the RRC layer of the UE sends an indication primitive of deleting or suspending the communication link to the physical layer, and the physical layer releases or suspends the communication link; or the RRC layer sets a variable or sends an indication primitive to the physical layer, to instruct the physical layer not to perform or to suspend signal processing of the communication link or indicate to the physical layer that the quality of the CPICH is less than a threshold.

Optionally, when receiving the indication primitive from the RRC layer or when determining that the signal quality of the CPICH is less than a threshold and a channel in the DPCCH/DPDCH/F-DPCH/E-RGCH/E-HICH is less than a threshold, the physical layer of the UE does not process or suspends a downlink signal of the channel.

702: The UE stops processing a TPC command that is sent from a base station by using the communication link, and/or the UE stops processing a DPCCH/DPDCH/F-DPCH/E-RGCH/E-HICH that is sent from a base station by using the communication link.

In this embodiment, a specific implementation process of 702 is similar to the specific implementation process of 202 in the embodiment of the downlink information processing method shown in FIG. 2, and reference may be made to the record in 202 for a detailed process, which is not further described in this embodiment.

Further, the method in this embodiment may further include the following:

703: The UE further determines whether the quality of the CPICH and/or quality of the DPCCH/DPDCH/F-DPCH/E-RGCH/E-HICH of the cell is less than the preset threshold, and if the quality of the CPICH and/or quality of the DPCCH/DPDCH/F-DPCH/E-RGCH/E-HICH of the cell is not less than the preset threshold, the UE determines that the communication link meets the preset communication quality requirement.

In this embodiment, after the UE determines that the quality of the CPICH and/or quality of the DPCCH/DPDCH/F-DPCH/E-RGCH/E-HICH of the cell is less than the preset threshold and the UE stops processing the transmit power control (TPC) command that is sent from the base station by using the communication link and/or the UE stops processing the DPCCH/DPDCH/F-DPCH/E-RGCH/E-HICH that is sent from the base station by using the communication link, the UE may move to the cell, so that the signal quality of the communication link between the cell and the UE is improved, and the UE determines whether the communication link meets the preset communication quality requirement, that is, the UE determines whether the quality of the CPICH and/or quality of the DPCCH/DPDCH/F-DPCH/E-RGCH/E-HICH of the cell is less than the preset threshold, and if the quality of the CPICH and/or quality of the DPCCH/DPDCH/F-DPCH/E-RGCH/E-HICH of the cell is not less than the preset threshold, it indicates that the communication link meets the preset communication quality requirement, that is, the quality of the communication link is improved, the UE does not mistakenly interpret a transmit power increasing command sent from the cell as a transmit power decreasing command, and when the UE uses the DPDCH transmitted by using the communication link in combined data reception, the performance of combined reception of the UE is not affected, or when the DPCCH/DPDCH/F-DPCH of the communication link is involved in SIR evaluation, downlink power control is not affected, or when the E-RGCH of the communication link is used in combination of relative grant information, the uplink throughput is not affected, or when the E-HICH of the communication link is used in combination of ACK/NACK/DTX signals, the uplink throughput is not affected, and then 704 may be performed.

Optionally, after determining that the signal quality of the CPICH of the communication link is greater than a threshold, the RRC layer of the UE instructs the physical layer to resume signal processing of the communication link. For example, the RRC layer of the UE sends an indication primitive of establishing or resuming the communication link to the physical layer, and the physical layer establishes or resumes the communication link; or the RRC layer sets a variable or sends an indication primitive to the physical layer, to instruct the physical layer to resume signal processing of the communication link or indicate to the physical layer that the quality of the CPICH is greater than a threshold.

Optionally, when receiving the indication primitive from the RRC layer or when determining that the signal quality of the CPICH is greater than a threshold and a channel in the DPCCH/DPDCH/F-DPCH/E-RGCH/E-HICH is greater than a threshold, the physical layer of the UE processes a downlink signal of the channel.

Further, the UE may execute a synchronization process B for the link according to indication of a primitive or variable, where the synchronization process B is that the UE performs downlink synchronization state detection according to timing offset information configured by a network, and when determining that quality of a DPCCH or quality of a TPC command is greater than a threshold, synchronization is reported to an upper layer, or when determining that quality of a DPCCH or quality of a TPC command is less than a threshold, out-of-synchronization is reported to an upper layer.

704: The UE resumes processing the TPC command that is sent from the base station by using the communication link, and/or the UE resumes processing the DPCCH/DP-DCH/F-DPCH/E-RGCH/E-HICH that is sent from the base station by using the communication link.

In this embodiment, a specific implementation process of 704 is similar to the specific implementation process of 302 in the embodiment of the downlink information processing method shown in FIG. 3, and reference may be made to the record in 302 for a detailed process, which is not further described in this embodiment.

Optionally, the preset threshold of the quality of the CPICH and/or the preset threshold of the quality of the DPCCH/DPDCH/F-DPCH/E-RGCH/E-HICH may be configured by a network for the UE, or may be agreed by the UE in advance.

It should be noted that, the cell in the active set mentioned in this embodiment may be a macro cell in the active set, or may be a micro cell in the active set, which is not limited in this embodiment.

Preferably, the cell in the active set mentioned in this embodiment is a macro cell in the active set.

In the downlink information processing method provided in Embodiment 7 of the present invention, when UE determines that quality of a CPICH and/or quality of a DPCCH/DPDCH/F-DPCH/E-RGCH/E-HICH of a cell in an active set is less than a preset threshold, the UE stops processing a TPC command that is sent from a base station by using a communication link and/or stops processing a DPCCH/DPDCH/F-DPCH/E-RGCH/E-HICH that is sent from a base station by using a communication link, and further, when the UE determines that the quality of the CPICH and/or quality of the DPCCH/DPDCH/F-DPCH/E-RGCH/E-HICH of the cell is not less than the preset threshold, the UE resumes processing the TPC command that is sent from the base station by using the communication link and/or resumes processing the DPCCH/DPDCH/F-DPCH/E-RGCH/E-HICH that is sent from the base station by using the communication link, so that the UE does not mistakenly interpret a transmit power increasing command as a transmit power decreasing command, and further uplink sending performance of the UE is not affected, performance of combined data reception by the UE is not affected, downlink power control is not affected, and an uplink throughput is not affected, either.

In an embodiment of a downlink information processing method according to the present invention, UE receives stop indication information sent from a network side device, where the stop indication information is used for instructing the UE to stop processing downlink information that is sent from a base station by using a communication link between a cell in an active set and the UE; and the UE stops, according to the stop indication information, processing the downlink information that is sent from the base station by using the communication link.

In this embodiment, UE stops, according to stop indication information sent from a network side device, processing downlink information that is sent from a base station by using a communication link; therefore, the UE is not affected by the downlink information, and further transmission performance of the UE is not affected.

Optionally, the receiving, by UE, stop indication information sent from a network side device includes: receiving, by the UE, the stop indication information sent from the base station. Specifically, the base station may determine whether the communication link between the cell in the active set and the UE meets a preset communication quality requirement, for example, the base station may determine whether quality of a DPCCH of the communication link is less than a preset threshold, and if the quality of the DPCCH of the communication link is not less than the preset threshold, the base station may determine that the communication link meets the preset communication quality requirement; or if the quality of the DPCCH of the communication link is less than the preset threshold, the base station may determine that the communication link does not meet the preset communication quality requirement, and the base station sends stop indication information to the UE, where the stop indication information sent from the base station is a physical layer instruction.

Optionally, the receiving, by UE, stop indication information sent from a network side device includes: receiving, by the UE, the stop indication information sent from an RNC. Specifically, an RNC may determine whether the communication link between the cell in the active set and the UE meets a preset communication quality requirement, and if the communication link between the cell in the active set and the UE does not meet the preset communication quality requirement, the RNC may determine that the communication link meets the preset communication quality requirement; or if the communication link between the cell in the active set and the UE meets the preset communication quality requirement, the RNC may determine that the communication link does not meet the preset communication quality requirement, and send stop indication information to the UE, where the stop indication information sent from the RNC is an RRC layer instruction or a MAC layer instruction, and the MAC layer instruction may be a MAC layer instruction carried in a data packet. If the stop indication information is an RRC layer instruction, an RRC layer of the UE may receive the stop indication information, and then the RRC layer of the UE stops, by using a physical layer of the UE, processing downlink information. If the stop indication information is a MAC layer instruction, a MAC layer of the UE may receive the stop indication information, and then the MAC layer of the UE stops, by using a physical layer of the UE, processing downlink information. Optionally, when receiving a 1B event of the communication link or determining that signal quality of the communication link is less than a threshold, the RNC may determine that the communication link does not meet the preset communication quality requirement, and then send, to the UE, an instruction for instructing the UE to stop processing the communication link; and when receiving a 1A event of the communication link or determining that signal quality of the communication link is greater than a threshold, the RNC may determine that the communication link meets the communication quality requirement, and then send, to the UE, an instruction for instructing the UE to resume processing the communication link.

Optionally, after the stopping, by the UE according to the stop indication information, processing the downlink information that is sent from the base station by using the communication link, the method further includes: receiving, by the UE, resumption indication information sent from the network side device, where the resumption indication information is used for instructing the UE to resume processing the downlink information that is sent from the base station by using the communication link; and resuming, by the UE according to the resumption indication information, processing the downlink information that is sent from the base station by using the communication link. Reference may be made to the foregoing related record in this embodiment for a specific implementation process, which is not further described herein.

Optionally, the stopping, by the UE, processing the downlink information that is sent from the base station by using the communication link includes: stopping, by the UE, processing a transmit power control (TPC) command that is sent from the base station by using the communication link; and/or stopping, by the UE, processing a dedicated physical control channel (DPCCH)/dedicated physical data channel (DPDCH)/F-dedicated physical channel (DPCH)/enhanced dedicated channel relative grant channel (E-RGCH)/enhanced dedicated channel hybrid automatic repeat request acknowledgment indicator channel (E-HICH) that is sent from the base station by using the communication link. Optionally, the stopping, by the UE, processing a DPCCH/DPDCH/F-DPCH/E-RGCH/E-HICH that is sent from the base station by using the communication link includes: stopping, by the UE, receiving the DPCCH/DPDCH/F-DPCH/E-RGCH/E-HICH that is sent from the base station by using the communication link; or receiving, by the UE, a DPDCH that is sent from the base station by using the communication link, and stopping using a signal on the DPDCH in combination processing; or receiving, by the UE, a DPCCH/DPDCH/F-DPCH that is sent from the base station by using the communication link, and stopping using a signal on the DPCCH/DPDCH/F-DPCH in signal to interference ratio (SIR) evaluation; or receiving, by the UE, an E-RGCH that is sent from the base station by using the communication link, and stopping using a relative grant signal on the E-RGCH in combination processing; or receiving, by the UE, an E-RGCH that is sent from the base station by using the communication link, and stopping sending relative grant information on the E-RGCH to an upper layer of the UE; or receiving, by the UE, an E-HICH that is sent from the base station by using the communication link, and stopping using a feedback signal on the E-HICH in combination processing; or receiving, by the UE, an E-HICH that is sent from the base station by using the communication link, and stopping sending feedback information on the E-HICH to an upper layer of the UE. Reference may be made to the related record in Embodiment 2 of the method according to the present invention for a specific implementation process, which is not further described herein.

Optionally, before the receiving, by UE, stop indication information sent from a network side device, the method further includes: sending, by the UE, capability indication information to the network side device, where the capability indication information is used for indicating that the UE has a capability of stopping processing the downlink information and/or resuming processing the downlink information. Therefore, before delivering the stop indication information or the resumption indication information to the UE, the network side device may learn, according to the capability indication information reported by the UE, that the UE has a capability of supporting an operation indicated by the stop indication information and/or the UE has a capability of supporting an operation indicated by the resumption indication information, and then the network side device delivers the stop indication information or the resumption indication information to the UE. For example, if the UE supports the capability, when determining that the quality of the communication link is less than a threshold, the network side device delivers the stop indication information (for example, a processing stop instruction), and when determining that the quality of the communication link is greater than a threshold, the network side device delivers the resumption indication information (for example, a processing resumption instruction).

Figure 8:
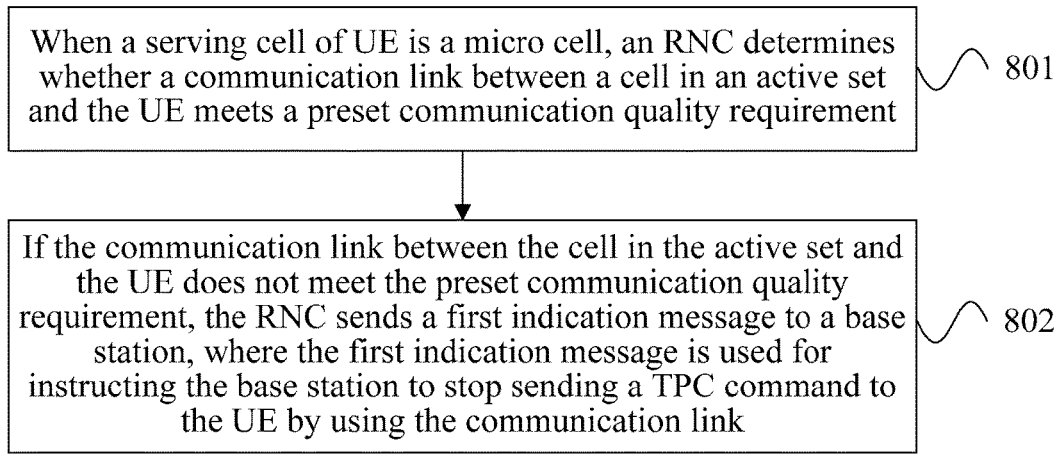
FIG. 8 is a flowchart of Embodiment 8 of a downlink information processing method according to the present invention.

FIG. 8 is a flowchart of Embodiment 8 of a downlink information processing method according to the present invention. As shown in FIG. 8, the method in this embodiment may be described as follows:

801: When a serving cell of UE is a micro cell, an RNC determines whether a communication link between a cell in an active set and the UE meets a preset communication quality requirement.

In this embodiment, when the serving cell of the UE is a micro cell, because the UE reports earlier a 1A event of a cell in an active set and delays reporting a 1B event, and after reporting the 1B event, still retains the cell in the active set, the cell is added earlier to the active set and deletion of the cell from the active set is delayed; as a result, signal quality of a communication link between the UE and the cell in the active set is poor. Therefore, the RNC determines whether the communication link between the cell in the active set and the UE meets the preset communication quality requirement, and if the communication link meets the preset communication quality requirement, it indicates that the signal quality of the communication link is good, the UE does not mistakenly interpret a transmit power increasing command sent from the cell as a transmit power decreasing command; or if the communication link does not meet the preset communication quality requirement, it indicates that the signal quality of the communication link is poor, and the UE mistakenly interprets a transmit power increasing command sent from the cell as a transmit power decreasing command.

802: If the communication link between the cell in the active set and the UE does not meet the preset communication quality requirement, the RNC sends a first indication message to a base station, where the first indication message is used for instructing the base station to stop sending a TPC command to the UE by using the communication link.

In this embodiment, if the RNC determines that the communication link between the cell in the active set and the UE does not meet the preset communication quality requirement, it indicates that the signal quality of the communication link is poor, and the UE mistakenly interprets a transmit power increasing command sent from the cell as a transmit power decreasing command; therefore, the RNC sends a first indication message to a base station, where the first indication message is used for instructing the base station to stop sending a TPC command to the UE by using the communication link, so that after the base station receives the first indication message, the base station stops, according to the first indication message, sending the TPC command to the UE by using the communication link, and therefore, the UE receives no TPC command that is sent from the base station by using the communication link, and the UE does not mistakenly interpret a transmit power increasing command as a transmit power decreasing command. It should be noted that, the RNC does not instruct the UE and the base station to delete the communication link, and therefore, the cell is still retained in the active set.

It should be noted that, the cell in the active set mentioned in this embodiment may be a macro cell in the active set, or may be a micro cell in the active set, which is not limited in this embodiment.

Preferably, the cell in the active set mentioned in this embodiment is a macro cell in the active set.

In the downlink information processing method provided in Embodiment 8 of the present invention, when an RNC determines that a communication link between a cell in an active set and UE does not meet a preset communication quality requirement, the RNC sends a first indication message to a base station, where the first indication message is used for instructing the base station to stop sending a TPC command to the UE by using the communication link, so that the base station stops sending the TPC command to the UE by using the communication link; in this way, a problem that the UE mistakenly interprets a transmit power increasing command as a transmit power decreasing command is solved, and further uplink sending performance of the UE is not affected.

Figure 9:
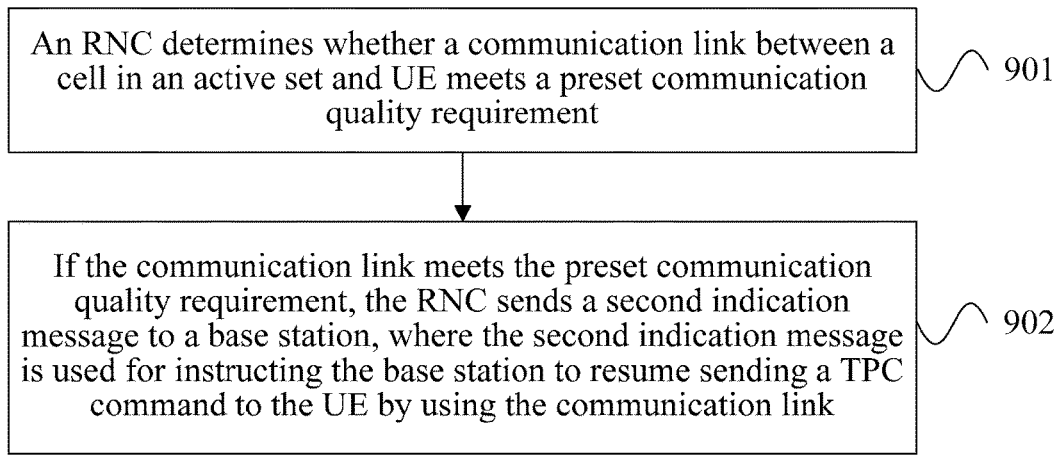
FIG. 9 is a flowchart of Embodiment 9 of a downlink information processing method according to the present invention.

FIG. 9 is a flowchart of Embodiment 9 of a downlink information processing method according to the present invention. As shown in FIG. 9, based on Embodiment 8 of the downlink information processing method shown in FIG. 8, the method in this embodiment may further include the following content:

901: An RNC determines whether a communication link between a cell in an active set and UE meets a preset communication quality requirement.

In this embodiment, after 802 shown in FIG. 8 is performed, 901 may be further performed, that is, after the RNC sends the first indication message to the base station, to instruct the base station to stop sending the TPC command to the UE by using the communication link, the UE may move to the cell, so that the signal quality of the communication link between the cell and the UE is improved, and therefore, the RNC may further determine whether the communication link meets the preset communication quality requirement, and if the communication link meets the preset communication quality requirement, it indicates that the quality of the communication link is improved, and the UE does not mistakenly interpret a transmit power increasing command sent from the cell as a transmit power decreasing command; or if the communication link does not meet the preset communication quality requirement, it indicates that the signal quality of the communication link is still poor, and the UE mistakenly interprets a transmit power increasing command sent from the cell as a transmit power decreasing command.

902: If the communication link meets the preset communication quality requirement, the RNC sends a second indication message to a base station, where the second indication message is used for instructing the base station to resume sending a TPC command to the UE by using the communication link.

In this embodiment, if the RNC determines that the communication link between the cell in the active set and the UE meets the preset communication quality requirement, it indicates that the signal quality of the communication link is improved, and the UE does not mistakenly interpret a transmit power increasing command sent from the cell as a transmit power decreasing command, that is, the UE correctly interprets the transmit power increasing command sent from the cell. Therefore, in this case, the RNC sends a second indication message to the base station, where the second indication message is used for instructing the base station to resume sending the TPC command to the UE by using the communication link, so that after the base station receives the second indication message, the base station resumes, according to the second indication message, sending the TPC command to the UE by using the communication link, that is, the base station resumes, based on that the communication link is not deleted, sending the TPC command to the UE by using the communication link; therefore, the UE uses the TPC command received by using the communication link in performing a power control algorithm to combine TPC commands, so as to ensure that when the cell requires the UE to increase or decrease transmit power, the UE can increase or decrease the transmit power in time, improving uplink sending performance of the UE and ensuring the uplink sending performance of the UE.

It should be noted that, the cell in the active set mentioned in this embodiment may be a macro cell in the active set, or may be a micro cell in the active set, which is not limited in this embodiment.

Preferably, the cell in the active set mentioned in this embodiment is a macro cell in the active set.

In the downlink information processing method provided in Embodiment 9 of the present invention, further, when an RNC determines that a communication link between a cell and UE meets a preset communication quality requirement, the RNC sends a second indication message to a base station, where the second indication message is used for instructing the base station to resume sending a TPC command to the UE by using the communication link, so that the base station resumes sending the TPC command to the UE by using the communication link; in this way, the UE can correctly interpret a transmit power increasing or decreasing command, and further increase or decrease transmit power, thereby ensuring uplink sending performance of the UE.

Figure 10:
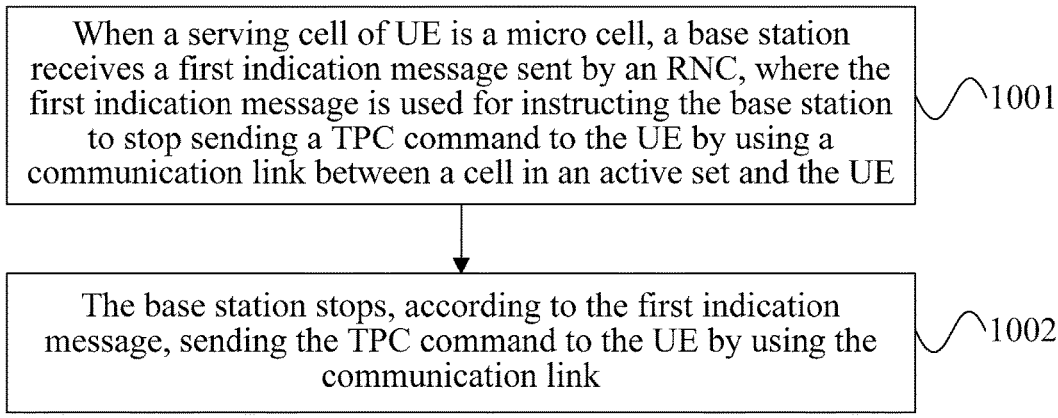
FIG. 10 is a flowchart of Embodiment 10 of a downlink information processing method according to the present invention.

FIG. 10 is a flowchart of Embodiment 10 of a downlink information processing method according to the present invention. As shown in FIG. 10, the method in this embodiment may be described as follows:

1001: When a serving cell of UE is a micro cell, a base station receives a first indication message sent from an RNC, where the first indication message is used for instructing the base station to stop sending a TPC command to the UE by using a communication link between a cell in an active set and the UE.

In this embodiment, when the serving cell of the UE is a micro cell, because the UE reports earlier a 1A event of a cell in an active set and delays reporting a 1B event, and after reporting the 1B event, still retains the cell in the active set, the cell is added earlier to the active set and deletion of the cell from the active set is delayed; as a result, signal quality of the communication link between the UE and the cell in the active set is poor. Therefore, the base station receives the first indication message sent from the RNC, where the first indication message is used for instructing the base station to stop sending a TPC command to the UE by using the communication link between the cell in the active set and the UE, that is, the RNC learns that the UE mistakenly interprets a transmit power increasing command sent from the cell as a transmit power decreasing command, and therefore, the RNC may instruct the base station to stop sending the TPC command to the UE by using the communication link, where the RNC may send the first indication message to the base station when determining that the communication link does not meet a preset communication quality requirement, but this embodiment is not limited thereto. It should be noted that, because the RNC does not instruct the base station to delete the communication link, the base station does not delete the communication link.

1002: The base station stops, according to the first indication message, sending the TPC command to the UE by using the communication link.

In this embodiment, after receiving the first indication message, the base station learns that the RNC instructs the base station to stop sending the TPC command to the UE by using the communication link between the cell and the UE, and therefore, the base station stops, according to the first indication message, sending the TPC command to the UE by using the communication link; therefore, the UE receives no TPC command that is sent from the base station by using the communication link, and the UE does not mistakenly interpret a transmit power increasing command as a transmit power decreasing command.

In the downlink information processing method provided in Embodiment 10 of the present invention, a base station receives a first indication message sent from an RNC, where the first indication message is used for instructing the base station to stop sending a TPC command to UE by using a communication link between a cell in an active set and the UE, so that the base station stops, according to the first indication message, sending the TPC command to the UE by using the communication link; in this way, a problem that the UE mistakenly interprets a transmit power increasing command as a transmit power decreasing command is solved, and further uplink sending performance of the UE is not affected.

Figure 11:
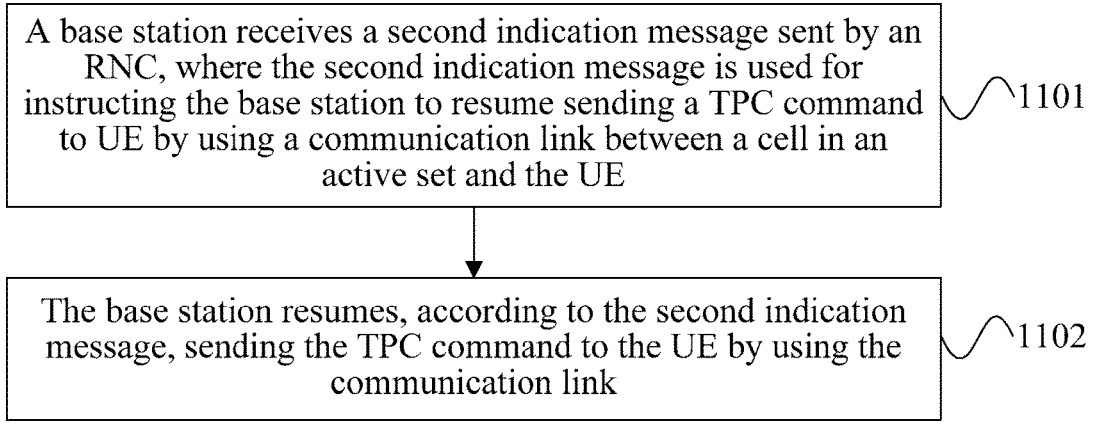
FIG. 11 is a flowchart of Embodiment 11 of a downlink information processing method according to the present invention.

FIG. 11 is a flowchart of Embodiment 11 of a downlink information processing method according to the present invention. As shown in FIG. 11, based on Embodiment 10 of the downlink information processing method shown in FIG. 10, the method in this embodiment may further include the following content:

1101: A base station receives a second indication message sent from an RNC, where the second indication message is used for instructing the base station to resume sending a TPC command to UE by using a communication link between a cell in an active set and the UE.

In this embodiment, after 1002 shown in FIG. 10 is performed, 1101 may be further performed, that is, after the base station stops, according to the first indication message, sending the TPC command to the UE by using the communication link, the UE may move to the cell, so that the signal quality of the communication link between the cell and the UE is improved, and the base station receives the second indication message sent from the RNC, where the second indication message is used for instructing the base station to resume sending the TPC command to the UE by using the communication link between the cell in the active set and the UE, that is, the RNC learns that the UE does not mistakenly interpret a transmit power increasing command sent from the cell as a transmit power decreasing command, and therefore, the RNC may instruct the base station to resume sending the TPC command to the UE by using the communication link, where the RNC may send the second indication message to the base station when determining that the communication link meets the preset communication quality requirement, but this embodiment is not limited thereto.

1102: The base station resumes, according to the second indication message, sending the TPC command to the UE by using the communication link.

In this embodiment, after receiving the second indication message, the base station learns that the RNC instructs the base station to resume sending the TPC command to the UE by using the communication link between the cell and the UE, and therefore, the base station resumes, according to the second indication message, sending the TPC command to the UE by using the communication link, that is, the base station resumes, based on that the communication link is not deleted, sending the TPC command to the UE by using the communication link; therefore, the UE uses the TPC command received by using the communication link in performing a power control algorithm to combine TPC commands, so as to ensure that when the cell requires the UE to increase or decrease transmit power, the UE can increase or decrease the transmit power in time, improving uplink sending performance of the UE and ensuring the uplink sending performance of the UE.

It should be noted that, the cell in the active set mentioned in this embodiment may be a macro cell in the active set, or may be a micro cell in the active set, which is not limited in this embodiment.

Preferably, the cell in the active set mentioned in this embodiment is a macro cell in the active set.

In the downlink information processing method provided in Embodiment 11 of the present invention, further, a base station receives a second indication message sent from an RNC, where the second indication message is used for instructing the base station to resume sending a TPC command to UE by using a communication link between a cell in an active set and the UE, so that the base station resumes, according to the second indication message, sending the TPC command to the UE by using the communication link; in this way, the UE can correctly interpret a transmit power increasing or decreasing command, and further increase or decrease transmit power, thereby ensuring uplink sending performance of the UE.

Figure 12:
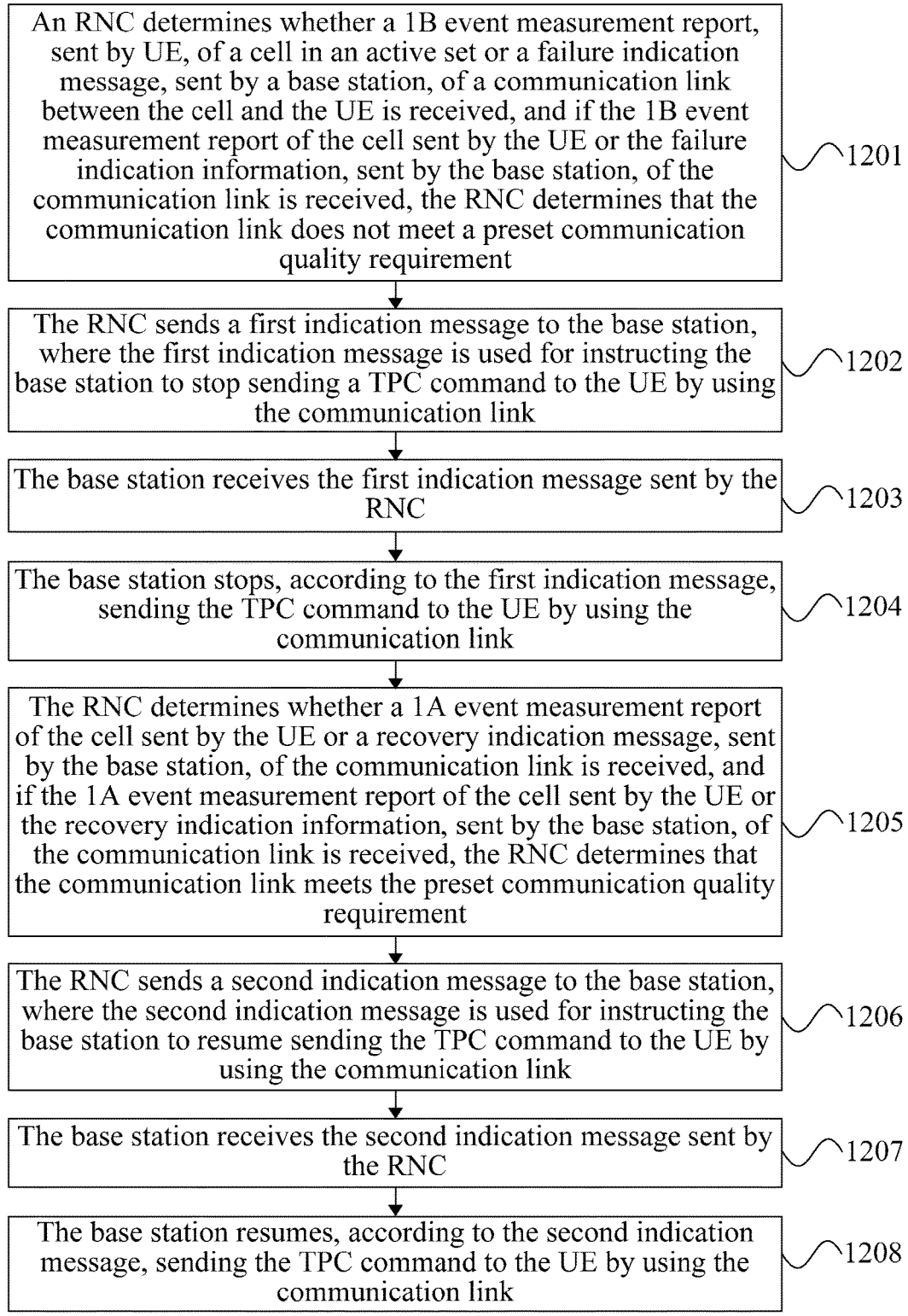
FIG. 12 is a flowchart of Embodiment 12 of a downlink information processing method according to the present invention.

FIG. 12 is a flowchart of Embodiment 12 of a downlink information processing method according to the present invention. As shown in FIG. 12, the method in this embodiment may be described as follows:

1201: An RNC determines whether a 1B event measurement report, sent from UE, of a cell in an active set or a failure indication message, sent from a base station, of a communication link between the cell and the UE is received, and if the 1B event measurement report of the cell sent from the UE or the failure indication information, sent from the base station, of the communication link is received, the RNC determines that the communication link does not meet a preset communication quality requirement.

In this embodiment, when a serving cell of the UE is a micro cell, the RNC determines whether the communication link between the cell in the active set and the UE meets a preset communication quality requirement.

In a first possible implementation manner, the RNC determines, according to whether a 1B event measurement report of the cell sent from the UE is received, whether the communication link between the cell and the UE meets the preset communication quality requirement, and if the RNC receives the 1B event measurement report of the cell sent from the UE, it indicates that the communication link does not meet the preset communication quality requirement, that is, signal quality of the communication link is poor, and the UE mistakenly interprets a transmit power increasing command sent from the cell as a transmit power decreasing command, and then 1202 may be performed. It should be noted that, a 1B event measurement report is consistent with that in the prior art, which is not described in detail in this embodiment.

In a second possible implementation manner, the RNC determines, according to whether the failure indication message, sent from the base station, of the communication link between the cell and the UE is received, whether the communication link between the cell and the UE meets the preset communication quality requirement, and if the RNC receives the failure indication message, sent from the base station, of the communication link, it indicates that the communication link does not meet the preset communication quality requirement, that is, signal quality of the communication link is poor, and the UE mistakenly interprets a transmit power increasing command sent from the cell as a transmit power decreasing command, and then 1202 may be performed. It should be noted that, when the base station determines, within a preset time, the communication link between the cell in the active set and the UE is continuously in uplink out-of-synchronization for a preset quantity of times, the base station determines that the communication link fails, and sends, to the RNC, the failure indication message of the communication link.

1202: The RNC sends a first indication message to the base station, where the first indication message is used for instructing the base station to stop sending a TPC command to the UE by using the communication link.

In this embodiment, a specific implementation process of 1202 is similar to the specific implementation process of 802 in the embodiment of the downlink information processing method shown in FIG. 8, and reference may be made to the record in 802 for a detailed process, which is not further described in this embodiment.

Further, in a first possible implementation manner, the first indication message is specifically used for instructing the base station to: after determining that the communication link between the cell and the UE is in uplink out-of-synchronization, stop sending the TPC command to the UE by using the communication link, so that after determining that the communication link between the cell and the UE is in uplink out-of-synchronization, the base station stops sending the TPC command to the UE by using the communication link.

Optionally, the first indication message is further used for instructing the base station to stop processing a TPC command that is sent from the UE by using the communication link or stop receiving information that is sent from the UE by using the communication link, so that the base station further stops processing the TPC command that is sent from the UE by using the communication link or stops receiving the information that is sent from the UE by using the communication link.

Further, the sending, by the RNC, a first indication message to the base station includes: sending, by the RNC, the first indication message to the base station by using a dedicated data frame or dedicated signaling or common signaling.

1203: The base station receives the first indication message sent from the RNC.

In this embodiment, after the RNC receives the 1B event measurement report of the cell sent from the UE or the failure indication message, sent from the base station, of the communication link between the cell and the UE, the RNC sends the first indication message to the base station, and correspondingly, the base station receives the first indication message sent from the RNC.

Further, the receiving, by the base station, the first indication message sent from the RNC includes: receiving, by the base station, the first indication message that is sent from the RNC by using the dedicated data frame or dedicated signaling or common signaling.

1204: The base station stops, according to the first indication message, sending the TPC command to the UE by using the communication link.

In this embodiment, a specific implementation process of 1204 is similar to the specific implementation process of 1002 in the embodiment of the downlink information processing method shown in FIG. 10, and reference may be made to the record in 1002 for a detailed process, which is not further described in this embodiment.

Further, in a first possible implementation manner, when the first indication message is specifically used for instructing the base station to: after determining that the communication link between the cell and the UE is in uplink out-of-synchronization, stop sending the TPC command to the UE by using the communication link, the stopping, by the base station according to the first indication message, sending the TPC command to the UE by using the communication link includes: determining, by the base station according to the first indication message, that the communication link is in uplink out-of-synchronization; and then stopping, by the base station, sending the TPC command to the UE by using the communication link. If the base station determines that the communication link is not in uplink out-of-synchronization, the base station does not stop sending the TPC command to the UE by using the communication link.

Optionally, when the first indication message is further used for instructing the base station to stop processing the TPC command that is sent from the UE by using the communication link or stop receiving the information that is sent from the UE by using the communication link, after the receiving, by the base station, the first indication message sent from the RNC, the method further includes: according to the first indication message, stopping, by the base station, processing the TPC command that is sent from the UE by using the communication link or stopping receiving the information that is sent from the UE by using the communication link.

Further, the method in this embodiment may further include the following:

1205: The RNC determines whether a 1A event measurement report of the cell sent from the UE or a recovery indication message, sent from the base station, of the communication link is received, and if the 1A event measurement report of the cell sent from the UE or the recovery indication information, sent from the base station, of the communication link is received, the RNC determines that the communication link meets the preset communication quality requirement.

In this embodiment, after the RNC receives the 1B event measurement report of the cell sent from the UE and sends the first indication message to the base station, the UE may move to the cell, so that the signal quality of the communication link between the cell and the UE is improved, and therefore, the RNC may further determine whether the communication link meets the preset communication quality requirement.

In a first possible implementation manner, the RNC determines whether the 1A event measurement report of the cell sent from the UE is received, and if the 1A event measurement report of the cell sent from the UE is received, it indicates that the communication link meets the preset communication quality requirement, that is, the quality of the communication link is improved, and the UE does not mistakenly interpret a transmit power increasing command sent from the cell as a transmit power decreasing command, and then 1206 may be performed; if the 1A event measurement report of the cell sent from the UE is not received, the procedure ends.

In a second possible implementation manner, the RNC determines, according to whether the recovery indication message, sent from the base station, of the communication link is received, whether the communication link between the cell and the UE meets the preset communication quality requirement, and if the communication link between the cell and the UE meets the preset communication quality requirement, it indicates that the communication link meets the preset communication quality requirement, that is, the quality of the communication link is improved, and the UE does not mistakenly interpret a transmit power increasing command sent from the cell as a transmit power decreasing command, and then 1206 may be performed; if the communication link between the cell and the UE does not meet the preset communication quality requirement, the procedure ends. It should be noted that, when the base station determines, within a preset time, the communication link between the cell in the active set and the UE is continuously in uplink synchronization for a preset quantity of times, the base station determines that the communication link recovers, and sends, to the RNC, the recovery indication message of the communication link.

1206: The RNC sends a second indication message to the base station, where the second indication message is used for instructing the base station to resume sending the TPC command to the UE by using the communication link.

In this embodiment, a specific implementation process of 1206 is similar to the specific implementation process of 902 in the embodiment of the downlink information processing method shown in FIG. 9, and reference may be made to the record in 902 for a detailed process, which is not further described in this embodiment.

Further, in a first possible implementation manner, the second indication message is specifically used for instructing the base station to: after determining that the communication link between the cell and the UE is in uplink synchronization, resume sending the TPC command to the UE by using the communication link, so that after determining that the communication link between the cell and the UE is in uplink synchronization, the base station resumes sending the TPC command to the UE by using the communication link.

Optionally, the second indication message is further used for instructing the base station to resume processing the TPC command that is sent from the UE by using the communication link or resume receiving the information that is sent from the UE by using the communication link, so that the base station further resumes the TPC command that is sent from the UE by using the communication link or resumes receiving the information that is sent from the UE by using the communication link.

Further, the sending, by the RNC, a second indication message to the base station includes: sending, by the RNC, the second indication message to the base station by using a dedicated data frame or dedicated signaling or common signaling.

1207: The base station receives the second indication message sent from the RNC.

In this embodiment, after the RNC receives the 1A event measurement report of the cell sent from the UE or the recovery indication message, sent from the base station, of the communication link, the RNC sends the second indication message to the base station, and correspondingly, the base station receives the second indication message sent from the RNC.

Further, the receiving, by the base station, the second indication message sent from the RNC includes: receiving, by the base station, the second indication message that is sent from the RNC by using the dedicated data frame or dedicated signaling or common signaling.

1208: The base station resumes, according to the second indication message, sending the TPC command to the UE by using the communication link.

In this embodiment, a specific implementation process of 1208 is similar to the specific implementation process of 1102 in the embodiment of the downlink information processing method shown in FIG. 11, and reference may be made to the record in 1102 for a detailed process, which is not further described in this embodiment.

Further, in a first possible implementation manner, when the second indication message is specifically used for instructing the base station to: after determining that the communication link is in uplink synchronization, resume sending the TPC command to the UE by using the communication link, the resuming, by the base station according to the second indication message, sending the TPC command to the UE by using the communication link includes: determining, by the base station according to the second indication message, that the communication link is in uplink synchronization; and resuming, by the base station, sending the TPC command to the UE by using the communication link. If the base station determines that the communication link is not in uplink synchronization, the base station does not resume sending the TPC command to the UE by using the communication link.

Optionally, when the second indication message is further used for instructing the base station to resume processing the TPC command that is sent from the UE by using the communication link or resume receiving the information that is sent from the UE by using the communication link, after the receiving, by the base station, the second indication message sent from the RNC, the method further includes: according to the second indication message, resuming, by the base station, processing the TPC command that is sent from the UE by using the communication link or resuming receiving the information that is sent from the UE by using the communication link.

Based on this embodiment, after receiving the 1A event measurement report sent from the UE, the RNC re-configures transmit power and/or a timing offset of the cell according to a signal parameter, carried in the 1A event measurement report, of the cell in the active set, adds the transmit power and/or timing offset of the cell to a second indication message, and sends the second indication message to the base station; and after receiving the second indication message, the base station acquires the transmit power and/or timing offset, re-configured by the RNC, of the cell, and then the base station sends a TPC command to the UE at the transmit power by using the communication link between the cell and the UE, and/or determines, according to the timing offset, when to send a TPC command to the UE by using the communication link between the cell and the UE; in this way, it can be solved that in the prior art, when the base station resumes sending information to the UE by using the communication link between the cell and the UE, the base station cannot determine an initial value of downlink transmit power and/or the timing offset of the cell.

It should be noted that, the cell in the active set mentioned in this embodiment may be a macro cell in the active set, or may be a micro cell in the active set, which is not limited in this embodiment.

Preferably, the cell in the active set mentioned in this embodiment is a macro cell in the active set.

In the downlink information processing method provided in Embodiment 12 of the present invention, when an RNC determines that a 1B event measurement report, sent from UE, of a cell in an active set or a failure indication message, sent from a base station, of a communication link is received, the RNC sends a first indication message to the base station, and the base station stops, according to the first indication message, sending a TPC command to the UE by using the communication link; and then when the RNC determines that a 1A event measurement report of the cell sent from the UE or a recovery indication message, sent from the base station, of the communication link is received, the RNC sends a second indication message to the base station, and the base station resumes, according to the second indication message, sending the TPC command to the UE by using the communication link; in this way, the UE can correctly interpret a transmit power increasing or decreasing command, and further increase or decrease transmit power, thereby ensuring uplink sending performance of the UE.

Figure 13:
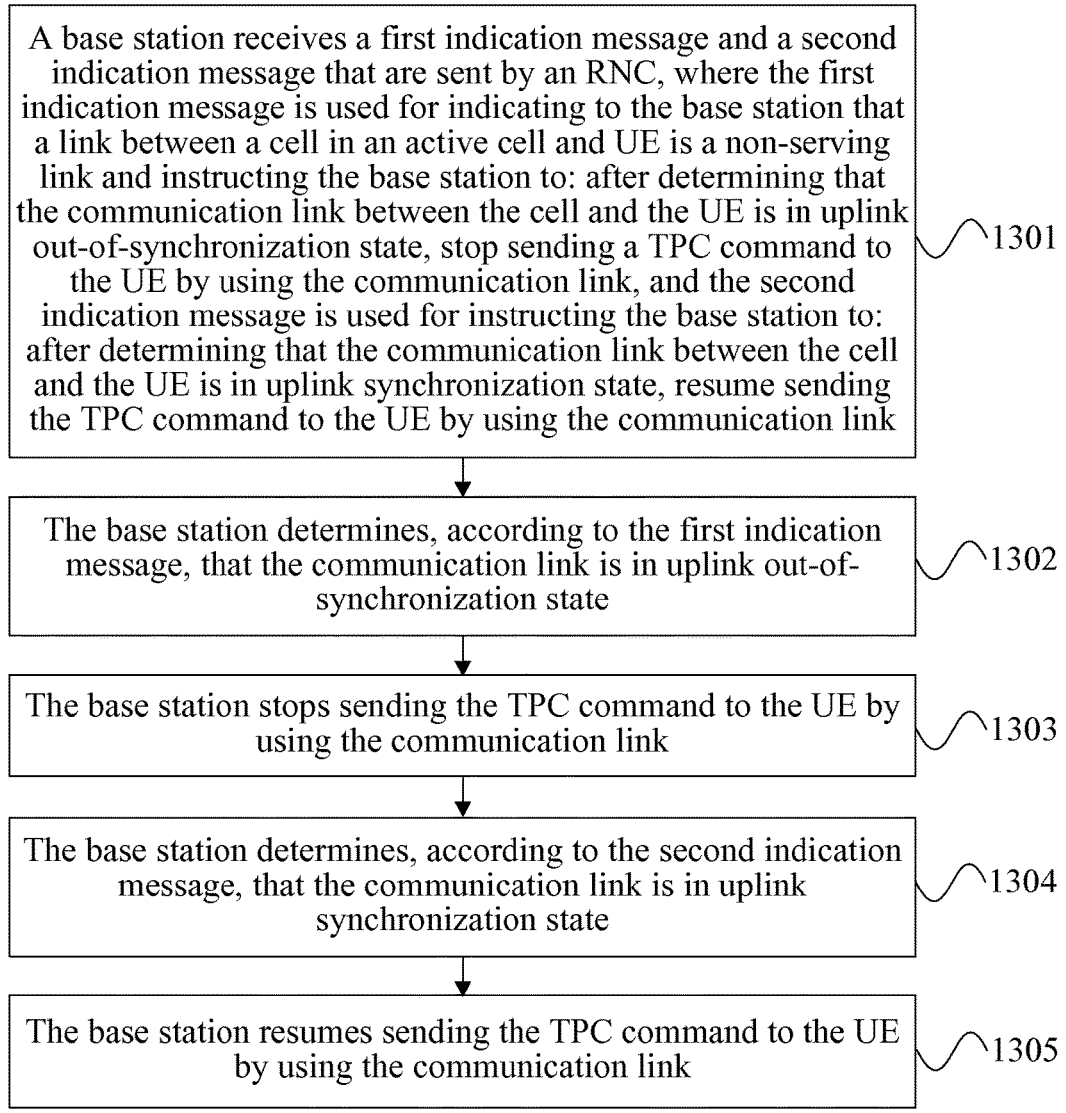
FIG. 13 is a flowchart of Embodiment 13 of a downlink information processing method according to the present invention.

FIG. 13 is a flowchart of Embodiment 13 of a downlink information processing method according to the present invention. As shown in FIG. 13, the method in this embodiment may be described as follows:

1301: A base station receives a first indication message and a second indication message that are sent from an RNC, where the first indication message is used for indicating to the base station that a communication link between a cell in an active cell and UE is a non-serving link and instructing the base station to: after determining that the communication link between the cell and the UE is in uplink out-of-synchronization, stop sending a TPC command to the UE by using the communication link, and the second indication message is used for instructing the base station to: after determining that the communication link between the cell and the UE is in uplink synchronization, resume sending the TPC command to the UE by using the communication link.

In this embodiment, when an RNC determines that a serving cell of UE is a micro cell, the RNC sends a first indication message to a base station, where the first indication message indicates to the base station communication links that are non-serving links exist between which cells in an active set and the UE, and further instructs the base station to: after determining that a communication link between a cell and the UE is in uplink out-of-synchronization, stop sending a TPC command to the UE by using the communication link; in addition, the RNC further sends a second indication message to the base station, where the second indication message instructs the base station to: after stopping sending the TPC command to the UE by using the communication link, and then determining that the communication link between the cell and the UE is in uplink synchronization, resume sending the TPC command to the UE by using the communication link. It should be noted that, the base station may simultaneously receive the first indication message and the second indication message that are sent from the RNC, or may first receive the first indication message sent from the RNC and then receive the second indication message sent from the RNC, or the first indication message and the second indication message may be one same indication message.

Optionally, the first indication message is further used for instructing the base station to stop processing a TPC command that is sent from the UE by using the communication link or stop receiving information that is sent from the UE by using the communication link.

Further, the receiving, by a base station, a first indication message and a second indication message that are sent from an RNC includes: receiving, by the base station, the first indication message and the second indication message that are sent from the RNC by using a dedicated data frame or dedicated signaling or common signaling.

1302: The base station determines, according to the first indication message that the communication link is in uplink out-of-synchronization.

In this embodiment, the base station may learn, according to the first indication message, that the communication link between the cell in the active set and the UE is a non-serving link, and then the base station may stop sending the TPC command to the UE by using the communication link; however, before stopping sending the TPC command to the UE by using the communication link, the base station needs to determine whether the communication link is in uplink out-of-synchronization, and if the base station determines that the communication link is in uplink out-of-synchronization, the base station performs 1303; otherwise, the base station does not perform 1303, and the procedure ends.

1303: The base station stops sending the TPC command to the UE by using the communication link.

In this embodiment, a specific implementation process of 1303 is similar to the specific implementation process of 1002 in the embodiment of the downlink information processing method shown in FIG. 10, and reference may be made to the record in 1002 for a detailed process, which is not further described in this embodiment.

Optionally, when the first indication message is further used for instructing the base station to stop processing the TPC command that is sent from the UE by using the communication link or stop receiving the information that is sent from the UE by using the communication link, after the receiving, by a base station, a first indication message sent from an RNC, the method further includes: according to the first indication message, stopping, by the base station, processing the TPC command that is sent from the UE by using the communication link or stopping receiving the information that is sent from the UE by using the communication link.

Further, the method in this embodiment may further include the following:

1304: The base station determines, according to the second indication message that the communication link is in uplink synchronization.

In this embodiment, after the base station determines, according to the first indication message, that the communication link is in uplink out-of-synchronization and stops sending the TPC command to the UE by using the communication link, the base station may resume sending the TPC command to the UE by using the communication link, but before resuming sending the TPC command to the UE by using the communication link, the base station needs to determine whether the communication link is in uplink synchronization, and if the base station determines that the communication link is in uplink synchronization, the base station performs 1305; otherwise, the base station does not perform 1305, and the procedure ends.

1305: The base station resumes sending the TPC command to the UE by using the communication link.

In this embodiment, a specific implementation process of 1305 is similar to the specific implementation process of 1102 in the embodiment of the downlink information processing method shown in FIG. 11, and reference may be made to the record in 1102 for a detailed process, which is not further described in this embodiment.

Optionally, when the second indication message is further used for instructing the base station to resume processing the TPC command that is sent from the UE by using the communication link or resume receiving the information that is sent from the UE by using the communication link, after the determining, by the base station, that the communication link is in uplink synchronization, the method further includes: according to the second indication message, resuming, by the base station, processing the TPC command that is sent from the UE by using the communication link or resuming receiving the information that is sent from the UE by using the communication link.

It should be noted that, the cell in the active set mentioned in this embodiment may be a macro cell in the active set, or may be a micro cell in the active set, which is not limited in this embodiment.

Preferably, the cell in the active set mentioned in this embodiment is a macro cell in the active set.

In the downlink information processing method provided in Embodiment 13 of the present invention, after a base station learns that a communication link between a cell in an active set and UE is a non-serving link, after determining, according to an indication of an RNC, that the communication link is in uplink out-of-synchronization, the base station stops sending a TPC command to the UE by using the communication link; and then after determining, according to an indication of the RNC, that the communication link is in uplink synchronization, the base station resumes sending the TPC command to the UE by using the communication link; in this way, the UE can correctly interpret a transmit power increasing or decreasing command, and further increase or decrease transmit power, thereby ensuring uplink sending performance of the UE.

Figure 14:
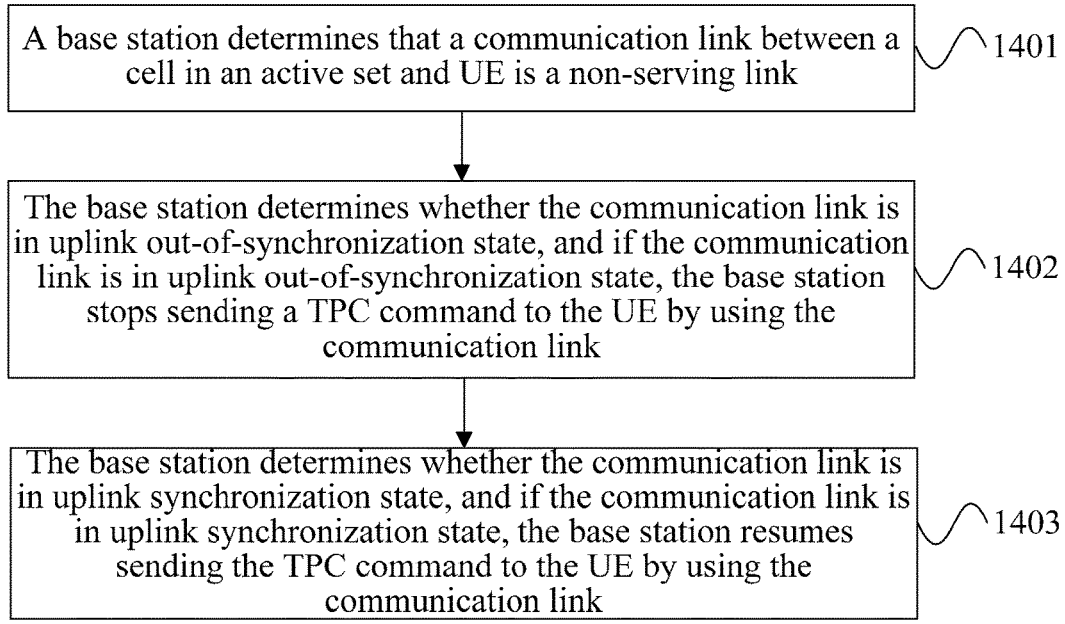
FIG. 14 is a flowchart of Embodiment 14 of a downlink information processing method according to the present invention.

FIG. 14 is a flowchart of Embodiment 14 of a downlink information processing method according to the present invention. As shown in FIG. 14, the method in this embodiment may be described as follows:

1401: A base station determines that a communication link between a cell in an active set and UE is a non-serving link.

In this embodiment, before stopping sending a TPC command to UE by using a communication link between a cell in an active set and the UE, a base station may determine that the communication link is a non-serving link. In a first feasible implementation manner, the base station receives a first indication message sent from an RNC, where the first indication message is used for indicating that the communication link is a non-serving link, so that the base station determines, according to the first indication message, that the communication link is a non-serving link. In a second feasible implementation manner, if the communication link is an enhanced dedicated channel (E-DCH) link, the base station can independently determine whether the communication link is a non-serving link.

1402: The base station determines whether the communication link is in uplink out-of-synchronization, and if the communication link is in uplink out-of-synchronization, the base station stops sending a TPC command to the UE by using the communication link.

In this embodiment, the base station determines whether the communication link is in uplink out-of-synchronization, and if the communication link is in uplink out-of-synchronization, the base station determines that the communication link does not meet a preset communication quality requirement, and therefore, the base station may stop sending a TPC command to the UE by using the communication link.

Optionally, the base station may further stop processing a TPC command that is sent from the UE by using the communication link or stop receiving information that is sent from the UE by using the communication link.

1403: The base station determines whether the communication link is in uplink synchronization, and if the communication link is in uplink synchronization, the base station resumes sending the TPC command to the UE by using the communication link.

In this embodiment, after the base station determines that the communication link is in uplink out-of-synchronization and stops sending the TPC command to the UE by using the communication link, the base station may determine whether the communication link is in uplink synchronization, and if the communication link is in uplink synchronization, the base station resumes sending the TPC command to the UE by using the communication link.

Optionally, the base station may further resume processing the TPC command that is sent from the UE by using the communication link or resume receiving the information that is sent from the UE by using the communication link.

It should be noted that, the cell in the active set mentioned in this embodiment may be a macro cell in the active set, or may be a micro cell in the active set, which is not limited in this embodiment.

Preferably, the cell in the active set mentioned in this embodiment is a macro cell in the active set.

In the downlink information processing method provided in Embodiment 14 of the present invention, when a base station determines that a communication link between a cell in an active set and UE is a non-serving link, after determining that the communication link is in uplink out-of-synchronization, the base station stops sending a TPC command to the UE by using the communication link; and then after determining that the communication link is in uplink synchronization, the base station resumes sending the TPC command to the UE by using the communication link; in this way, the UE can correctly interpret a transmit power increasing or decreasing command, and further increase or decrease transmit power, thereby ensuring uplink sending performance of the UE.

It should be noted that, any embodiment in Embodiments 1 to 7 of the present invention may be combined with any embodiment in Embodiments 8 to 14 of the present invention in use to control transmit power.

Figure 15:
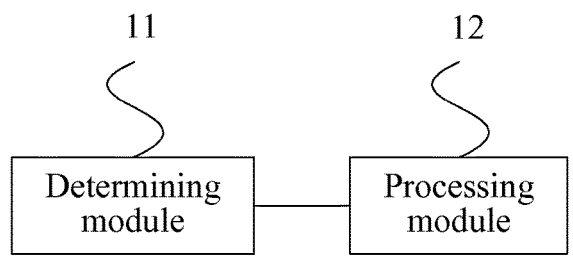
FIG. 15 is a schematic structural diagram of Embodiment 1 of UE according to the present invention.

FIG. 15 is a schematic structural diagram of Embodiment 1 of UE according to the present invention. As shown in FIG. 15, the UE in this embodiment may include: a determining module 11 and a processing module 12, where the determining module 11 is configured to determine whether a communication link between a cell in an active set and the UE meets a preset communication quality requirement; and the processing module 12 is configured to: if the determining module 11 determines that the communication link between the cell in the active set and the UE does not meet the preset communication quality requirement, stop processing downlink information that is sent from a base station by using the communication link.

The UE in this embodiment can be configured to execute the technical solutions, executed by UE, in the foregoing embodiments of the downlink information processing methods according to the present invention, of which the implementation principles and technical effects are similar, and reference may be made to the related record in the foregoing embodiments for details, which are not described herein again.

Figure 16:
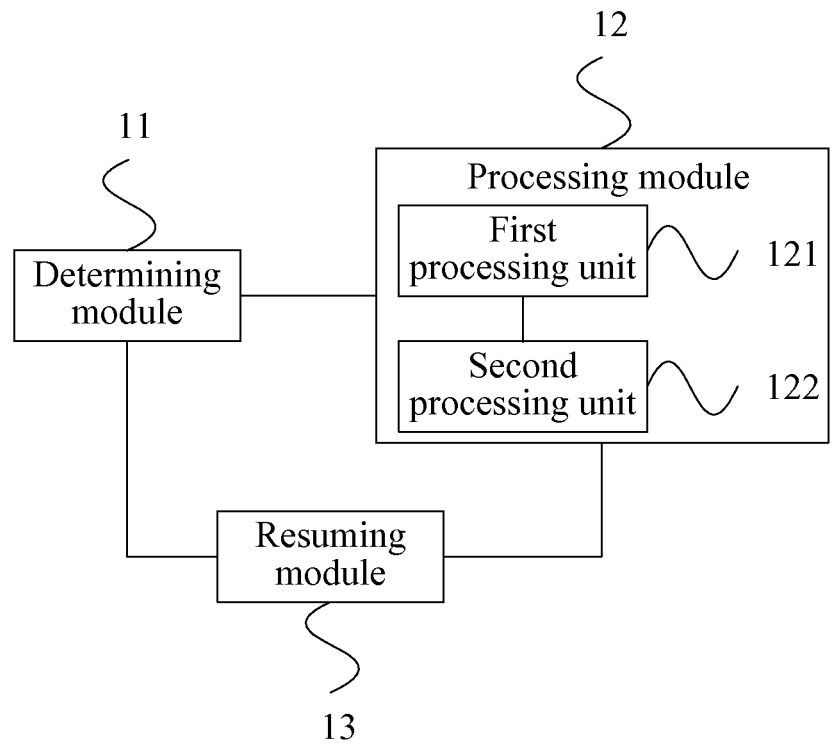
FIG. 16 is a schematic structural diagram of Embodiment 2 of UE according to the present invention.

FIG. 16 is a schematic structural diagram of Embodiment 2 of UE according to the present invention. As shown in FIG. 16, based on the UE structure shown in FIG. 15, further, the UE in this embodiment may further include: a resuming module 13, where the determining module 11 is further configured to: after the processing module 12 stops processing the downlink information that is sent from the base station by using the communication link, further determine whether the communication link between the cell in the active set and the UE meets the preset communication quality requirement; and the resuming module 13 is configured to: if the determining module 11 determines that the communication link between the cell in the active set and the UE meets the preset communication quality requirement, resume processing the downlink information that is sent from the base station by using the communication link.

Further, the processing module 12 may include: a first processing unit 121 and/or a second processing unit 122. The first processing unit 121 is configured to stop processing a transmit power control (TPC) command that is sent from the base station by using the communication link; and the second processing unit 122 is configured to stop processing a DPCCH/DPDCH/F-DPCH/E-RGCH/E-HICH that is sent from the base station by using the communication link.

Optionally, the second processing unit 122 is specifically configured to stop receiving the DPCCH/DPDCH/F-DPCH/E-RGCH/E-HICH that is sent from the base station by using the communication link; or receive a DPDCH that is sent from the base station by using the communication link, and stop using a signal on the DPDCH, which is sent from using the communication link, in combination processing; or receive a DPCCH/DPDCH/F-DPCH that is sent from the base station by using the communication link, and stop using a signal on the DPCCH/DPDCH/F-DPCH in signal to interference ratio (SIR) evaluation; or receive an E-RGCH that is sent from the base station by using the communication link, and stop using a relative grant signal on the E-RGCH in combination processing; or receive an E-RGCH that is sent from the base station by using the communication link, and stop sending relative grant information on the E-RGCH to an upper layer of the UE; or receive an E-HICH that is sent from the base station by using the communication link, and stop using a feedback signal on the E-HICH in combination processing; or receive an E-HICH that is sent from the base station by using the communication link, and stop sending feedback information on the E-HICH to an upper layer of the UE.

The UE in this embodiment can be configured to execute the technical solutions, executed by UE, in the foregoing embodiments of the downlink information processing methods according to the present invention, of which the implementation principles and technical effects are similar, and reference may be made to the related record in the foregoing embodiments for details, which are not described herein again.

In Embodiment 3 of UE according to the present invention, in the UE in this embodiment, based on the UE structure shown in FIG. 15 or FIG. 16, further, in a first feasible implementation manner, the determining module 11 is specifically configured to determine whether a signal to interference ratio (SIR) of a TPC command is less than an SIR threshold, where the TPC command is received by the UE by using the communication link between the cell and the UE; if the SIR of the TPC command is less than the SIR threshold, determine that the communication link does not meet the preset communication quality requirement; and if the SIR of the TPC command is not less than the SIR threshold, determine that the communication link meets the preset communication quality requirement.

In a second feasible implementation manner, the determining module 11 is specifically configured to determine whether a 1B event or a 1A event occurs in the cell; if the 1B event occurs in the cell, determine that the communication link does not meet the preset communication quality requirement; and if the 1A event occurs in the cell, determine that the communication link meets the preset communication quality requirement.

In a third feasible implementation manner, the determining module 11 is specifically configured to determine whether the communication link between the cell and the UE is in downlink out-of-synchronization state or downlink synchronization state; if the communication link between the cell and the UE is in downlink out-of-synchronization state, determine that the communication link does not meet the preset communication quality requirement; and if the communication link between the cell and the UE is in downlink synchronization state, determine that the communication link meets the preset communication quality requirement.

In a fourth feasible implementation manner, the determining module 11 is specifically configured to determine whether a 1B event occurs in the cell and the communication link is in downlink out-of-synchronization state, or whether a 1A event occurs in the cell and the communication link is in downlink synchronization state; if the 1B event occurs in the cell and the communication link is in downlink out-of-synchronization state, determine that the communication link does not meet the preset communication quality requirement; and if the 1A event occurs in the cell and the communication link is in downlink synchronization state, determine that the communication link meets the preset communication quality requirement.

In a fifth feasible implementation manner, the determining module 11 is specifically configured to determine whether quality of a CPICH and/or quality of a DPCCH/DPDCH/F-DPCH/E-RGCH/E-HICH of the cell is less than a preset threshold; if the quality of the CPICH and/or the quality of the DPCCH/DPDCH/F-DPCH/E-RGCH/E-HICH of the cell is less than the preset threshold, determine that the communication link does not meet the preset communication quality requirement; and if the quality of the CPICH and/or the quality of the DPCCH/DPDCH/F-DPCH/E-RGCH/E-HICH of the cell is not less than the preset threshold, determine that the communication link meets the preset communication quality requirement.

The UE in this embodiment can be configured to execute the technical solutions, executed by UE, in the foregoing embodiments of the downlink information processing methods according to the present invention, of which the implementation principles and technical effects are similar, and reference may be made to the related record in the foregoing embodiments for details, which are not described herein again.

It should be noted that, in terms of hardware implementation, the determining module 11, the processing module 12, and the resuming module 13 may be embedded in or independent of a processor of the UE in a form of hardware, or may be stored in a memory of the UE in a form of software, so as to be invoked by the processor to execute operations corresponding to the foregoing modules. The processor may be a central processing unit (CPU), a micro processor, a single chip microcomputer, or the like.

Figure 17:
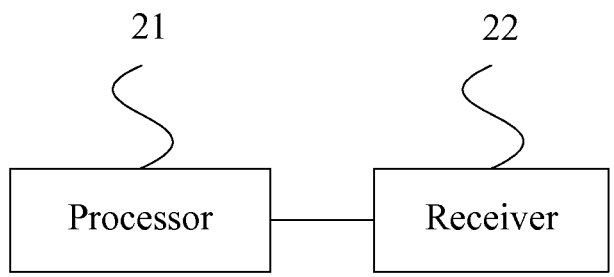
FIG. 17 is a schematic structural diagram of Embodiment 4 of UE according to the present invention.

FIG. 17 is a schematic structural diagram of Embodiment 4 of UE according to the present invention. As shown in FIG. 17, the UE includes: a processor 21, where the processor 21 is configured to determine whether a communication link between a cell in an active set and the UE meets a preset communication quality requirement; and if the communication link between the cell in the active set and the UE does not meet the preset communication quality requirement, stop processing downlink information that is sent from a base station by using the communication link.

Further, the processor 21 is further configured to: after stopping processing the downlink information that is sent from the base station by using the communication link, further determine whether the communication link between the cell in the active set and the UE meets the preset communication quality requirement; and if the communication link between the cell in the active set and the UE meets the preset communication quality requirement, resume processing the downlink information that is sent from the base station by using the communication link.

Optionally, the processor 21 is specifically configured to stop processing a transmit power control (TPC) command that is sent from the base station by using the communication link; and/or stop processing a DPCCH/DPDCH/F-DPCH/E-RGCH/E-HICH that is sent from the base station by using the communication link.

Optionally, the UE in this embodiment may further include a receiver 22. In a first feasible implementation manner, the processor 21 is specifically configured to control the receiver 22 to stop receiving the DPCCH/DPDCH/F-DPCH/E-RGCH/E-HICH that is sent from the base station by using the communication link. In a second feasible implementation manner, the processor 21 is specifically configured to control the receiver 22 to receive a DPDCH that is sent from the base station by using the communication link, and the processor 21 is specifically configured to stop using a signal on the DPDCH, which is sent from using the communication link, in combination processing. In a third feasible implementation manner, the processor 21 is specifically configured to control the receiver 22 to receive a DPCCH/DPDCH/F-DPCH that is sent from the base station by using the communication link, and the processor 21 is specifically configured to stop using a signal on the DPCCH/DPDCH/F-DPCH in signal to interference ratio (SIR) evaluation. In a fourth feasible implementation manner, the processor 21 is specifically configured to control the receiver 22 to receive an E-RGCH that is sent from the base station by using the communication link, and the processor 21 is specifically configured to stop using a relative grant signal on the E-RGCH in combination processing. In a fifth feasible implementation manner, the processor 21 controls the receiver 22 to receive an E-RGCH that is sent from the base station by using the communication link, and the processor 21 is specifically configured to stop sending relative grant information on the E-RGCH to an upper layer of the UE. In a sixth feasible implementation manner, the processor 21 is specifically configured to control the receiver 22 to receive an E-HICH that is sent from the base station by using the communication link, and the processor 21 is specifically configured to stop using a feedback signal on the E-HICH in combination processing. In a seventh feasible implementation manner, the processor 21 is specifically configured to control the receiver 22 to receive an E-HICH that is sent from the base station by using the communication link, and the processor 21 is specifically configured to stop sending feedback information on the E-HICH to an upper layer of the UE.

Furthermore, in a first feasible implementation manner, the processor 21 is specifically configured to determine whether a signal to interference ratio (SIR) of a TPC command is less than an SIR threshold, where the TPC command is received by the UE by using the communication link between the cell and the UE; if the SIR of the TPC command is less than the SIR threshold, determine that the communication link does not meet the preset communication quality requirement; and if the SIR of the TPC command is not less than the SIR threshold, determine that the communication link meets the preset communication quality requirement.

In a second feasible implementation manner, the processor 21 is specifically configured to determine whether a 1B event or a 1A event occurs in the cell; if the 1B event occurs in the cell, determine that the communication link does not meet the preset communication quality requirement; and if the 1A event occurs in the cell, determine that the communication link meets the preset communication quality requirement.

In a third feasible implementation manner, the processor 21 is specifically configured to determine whether the communication link between the cell and the UE is in downlink out-of-synchronization state or downlink synchronization state; if the communication link between the cell and the UE is in downlink out-of-synchronization state, determine that the communication link does not meet the preset communication quality requirement; and if the communication link between the cell and the UE is in downlink synchronization state, determine that the communication link meets the preset communication quality requirement.

In a fourth feasible implementation manner, the processor 21 is specifically configured to determine whether a 1B event occurs in the cell and the communication link is in downlink out-of-synchronization state, or whether a 1A event occurs in the cell and the communication link is in downlink synchronization state; if the 1B event occurs in the cell and the communication link is in downlink out-of-synchronization state, determine that the communication link does not meet the preset communication quality requirement; and if the 1A event occurs in the cell and the communication link is in downlink synchronization state, determine that the communication link meets the preset communication quality requirement.

In a fifth feasible implementation manner, the processor 21 is specifically configured to determine whether quality of a CPICH and/or quality of a DPCCH/DPDCH/F-DPCH/E-RGCH/E-HICH of the cell is less than a preset threshold; if the quality of the CPICH and/or the quality of the DPCCH/DPDCH/F-DPCH/E-RGCH/E-HICH of the cell is less than the preset threshold, determine that the communication link does not meet the preset communication quality requirement; and if the quality of the CPICH and/or the quality of the DPCCH/DPDCH/F-DPCH/E-RGCH/E-HICH of the cell is not less than the preset threshold, determine that the communication link meets the preset communication quality requirement.

The UE in this embodiment can be configured to execute the technical solutions, executed by UE, in the foregoing embodiments of the downlink information processing methods according to the present invention, of which the implementation principles and technical effects are similar, and reference may be made to the related record in the foregoing embodiments for details, which are not described herein again.

Figure 18:
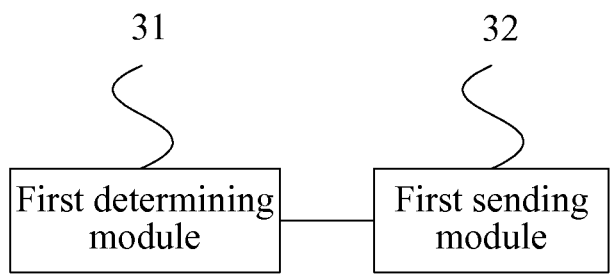
FIG. 18 is a schematic structural diagram of Embodiment 1 of an RNC according to the present invention.

FIG. 18 is a schematic structural diagram of Embodiment 1 of an RNC according to the present invention. As shown in FIG. 18, the RNC in this embodiment may include: a first determining module 31 and a first sending module 32, where the first determining module 31 is configured to: when a serving cell of user equipment (UE) is a micro cell, determine whether a communication link between a cell in an active set and the UE meets a preset communication quality requirement; and the first sending module 32 is configured to: if the first determining module 31 determines that the communication link between the cell in the active set and the UE does not meet the preset communication quality requirement, send a first indication message to a base station, where the first indication message is used for instructing the base station to stop sending a transmit power control (TPC) command to the UE by using the communication link.

The RNC in this embodiment can be configured to execute the technical solutions, executed by an RNC, in the foregoing embodiments of the downlink information processing methods according to the present invention, of which the implementation principles and technical effects are similar, and reference may be made to the related record in the foregoing embodiments for details, which are not described herein again.

Figure 19:
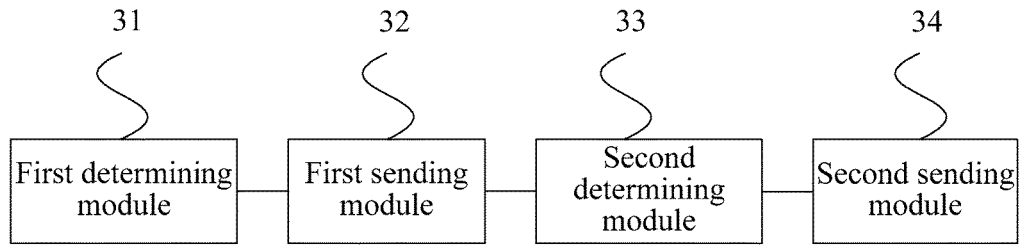
FIG. 19 is a schematic structural diagram of Embodiment 2 of an RNC according to the present invention.

FIG. 19 is a schematic structural diagram of Embodiment 2 of an RNC according to the present invention. As shown in FIG. 19, based on the RNC structure shown in FIG. 18, further, the RNC in this embodiment may further include: a second determining module 33 and a second sending module 34, where the second determining module 33 is configured to determine whether the communication link meets the preset communication quality requirement; and the second sending module 34 is configured to: if the second determining module 33 determines that the communication link meets the preset communication quality requirement, send a second indication message to the base station, where the second indication message is used for instructing the base station to resume sending the TPC command to the UE by using the communication link.

The RNC in this embodiment can be configured to execute the technical solutions, executed by an RNC, in the foregoing embodiments of the downlink information processing methods according to the present invention, of which the implementation principles and technical effects are similar, and reference may be made to the related record in the foregoing embodiments for details, which are not described herein again.

In Embodiment 3 of an RNC according to the present invention, in the RNC in this embodiment, based on the RNC structure shown in FIG. 18 or FIG. 19, further, the first determining module 31 is specifically configured to determine whether a 1B event measurement report of the cell sent from the UE or failure indication information, sent from the base station, of the communication link is received; and if the 1B event measurement report of the cell sent from the UE or the failure indication information, sent from the base station, of the communication link is received, determine that the communication link does not meet the preset communication quality requirement.

Preferably, the first indication message is specifically used for instructing the base station to: after determining that the communication link between the cell and the UE is in uplink out-of-synchronization, stop sending the TPC command to the UE by using the communication link.

Optionally, the first indication message is further used for instructing the base station to stop processing a TPC command that is sent from the UE by using the communication link or stop receiving information that is sent from the UE by using the communication link.

Further, the first sending module 32 is specifically configured to send the first indication message to the base station by using a dedicated data frame or dedicated signaling or common signaling.

Further, the second determining module 33 is specifically configured to determine whether a 1A event measurement report of the cell sent from the UE or recovery indication information, sent from the base station, of the communication link is received; and if the 1A event measurement report of the cell sent from the UE or the recovery indication information, sent from the base station, of the communication link is received, determine that the communication link meets the preset communication quality requirement.

Preferably, the second indication message is specifically used for instructing the base station to: after determining that the communication link between the cell and the UE is in uplink synchronization, resume sending the TPC command to the UE by using the communication link.

Optionally, the second indication message is further used for instructing the base station to resume processing the TPC command that is sent from the UE by using the communication link or resume receiving the information that is sent from the UE by using the communication link.

Further, the second sending module 34 is specifically configured to send the second indication message to the base station by using a dedicated data frame or dedicated signaling or common signaling.

The RNC in this embodiment can be configured to execute the technical solutions, executed by an RNC, in the foregoing embodiments of the downlink information processing methods according to the present invention, of which the implementation principles and technical effects are similar, and reference may be made to the related record in the foregoing embodiments for details, which are not described herein again.

It should be noted that, in terms of hardware implementation, the first sending module 32 and the second sending module 34 may be a transmitter or a transceiver. The first determining module 31 and the second determining module 33 may be embedded in or independent of a processor of the RNC in a form of hardware, or may be stored in a memory of the RNC in a form of software, so as to be invoked by the processor to execute operations corresponding to the foregoing modules. The processor may be a CPU, a micro processor, a single chip microcomputer, or the like.

Figure 20:
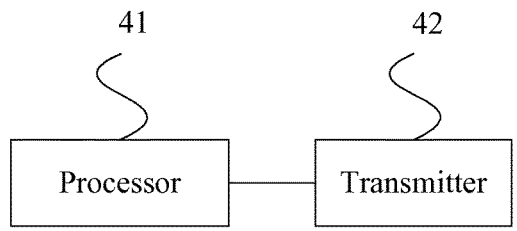
FIG. 20 is a schematic structural diagram of Embodiment 4 of an RNC according to the present invention.

FIG. 20 is a schematic structural diagram of Embodiment 4 of an RNC according to the present invention. As shown in FIG. 20, the RNC in this embodiment may include: a processor 41 and a transmitter 42, where the processor 41 is configured to: when a serving cell of user equipment (UE) is a micro cell, determine whether a communication link between a cell in an active set and the UE meets a preset communication quality requirement; and the transmitter 42 is configured to: if the communication link between the cell in the active set and the UE does not meet the preset communication quality requirement, send a first indication message to a base station, where the first indication message is used for instructing the base station to stop sending a transmit power control (TPC) command to the UE by using the communication link.

Further, the processor 41 is specifically configured to determine whether a 1B event measurement report of the cell sent from the UE or failure indication information, sent from the base station, of the communication link is received; and if the 1B event measurement report of the cell sent from the UE or the failure indication information, sent from the base station, of the communication link is received, determine that the communication link does not meet the preset communication quality requirement.

Preferably, the first indication message is specifically used for instructing the base station to: after determining that the communication link between the cell and the UE is in uplink out-of-synchronization, stop sending the TPC command to the UE by using the communication link.

Optionally, the first indication message is further used for instructing the base station to stop processing a TPC command that is sent from the UE by using the communication link or stop receiving information that is sent from the UE by using the communication link.

Further, the transmitter 42 is specifically configured to send the first indication message to the base station by using a dedicated data frame or dedicated signaling or common signaling.

Furthermore, the processor 41 is further configured to: after the transmitter 42 sends the first indication message to the base station, determine whether the communication link meets the preset communication quality requirement; and the transmitter 42 is further configured to: if the processor 41 determines that the communication link meets the preset communication quality requirement, send a second indication message to the base station, where the second indication message is used for instructing the base station to resume sending the TPC command to the UE by using the communication link.

Further, the processor 41 is specifically configured to determine whether a 1A event measurement report of the cell sent from the UE or recovery indication information, sent from the base station, of the communication link is received; and if the 1A event measurement report of the cell sent from the UE or the recovery indication information, sent from the base station, of the communication link is received, determine that the communication link meets the preset communication quality requirement.

Preferably, the second indication message is specifically used for instructing the base station to: after determining that the communication link between the cell and the UE is in uplink synchronization, resume sending the TPC command to the UE by using the communication link.

Optionally, the second indication message is further used for instructing the base station to resume processing the TPC command that is sent from the UE by using the communication link or resume receiving the information that is sent from the UE by using the communication link.

Further, the transmitter 42 is specifically configured to send the second indication message to the base station by using a dedicated data frame or dedicated signaling or common signaling.

The RNC in this embodiment can be configured to execute the technical solutions, executed by an RNC, in the foregoing embodiments of the downlink information processing methods according to the present invention, of which the implementation principles and technical effects are similar, and reference may be made to the related record in the foregoing embodiments for details, which are not described herein again.

Figure 21:
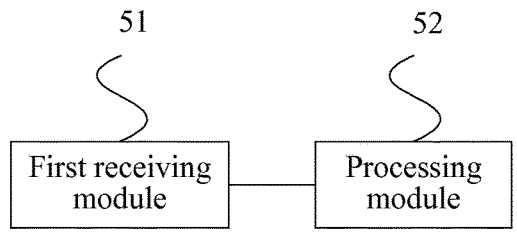
FIG. 21 is a schematic structural diagram of Embodiment 1 of a base station according to the present invention.

FIG. 21 is a schematic structural diagram of Embodiment 1 of a base station according to the present invention. As shown in FIG. 21, the base station in this embodiment may include: a first receiving module 51 and a processing module 52, where the first receiving module 51 is configured to: when a serving cell of user equipment (UE) is a micro cell, receive a first indication message sent from a radio network controller (RNC), where the first indication message is used for instructing the base station to stop sending a transmit power control (TPC) command to the UE by using a communication link between a cell in an active set and the UE; and the processing module 52 is configured to stop, according to the first indication message, sending the TPC command to the UE by using the communication link.

The base station in this embodiment can be configured to execute the technical solutions, executed by a base station, in the foregoing embodiments of the downlink information processing methods according to the present invention, of which the implementation principles and technical effects are similar, and reference may be made to the related record in the foregoing embodiments for details, which are not described herein again.

Figure 22:
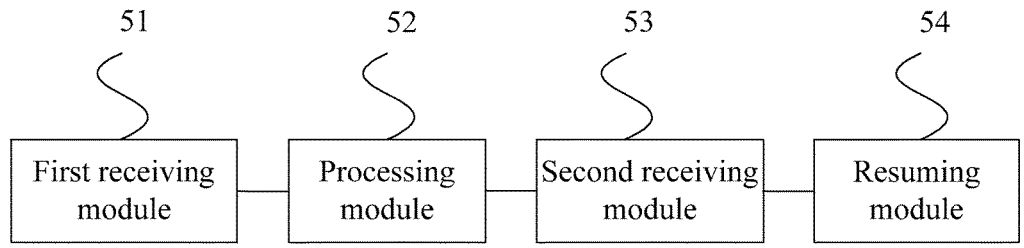
FIG. 22 is a schematic structural diagram of Embodiment 2 of a base station according to the present invention.

FIG. 22 is a schematic structural diagram of Embodiment 2 of a base station according to the present invention. As shown in FIG. 22, based on the base station structure shown in FIG. 21, further, the base station in this embodiment may further include: a second receiving module 53 and a resuming module 54, where the second receiving module 53 is configured to receive a second indication message sent from the RNC, where the second indication message is used for instructing the base station to resume sending the TPC command to the UE by using the communication link; and the resuming module 54 is configured to resume, according to the second indication message, sending the TPC command to the UE by using the communication link.

The base station in this embodiment can be configured to execute the technical solutions, executed by a base station, in the foregoing embodiments of the downlink information processing methods according to the present invention, of which the implementation principles and technical effects are similar, and reference may be made to the related record in the foregoing embodiments for details, which are not described herein again.

In Embodiment 3 of a base station according to the present invention, in the base station of this embodiment, based on the base station structure shown in FIG. 21 or FIG. 22, further, the first indication message is specifically used for instructing the base station to: after determining that the communication link between the cell and the UE is in uplink out-of-synchronization, stop sending the TPC command to the UE by using the communication link; and the processing module 52 is specifically configured to determine, according to the first indication message, that the communication link is in uplink out-of-synchronization; and stop sending the TPC command to the UE by using the communication link.

Optionally, the first indication message is further used for instructing the base station to stop processing a TPC command that is sent from the UE by using the communication link or stop receiving information that is sent from the UE by using the communication link; and the processing module 52 is further configured to: after the first receiving module 51 receives the first indication message sent from the RNC, according to the first indication message, stop processing the TPC command that is sent from the UE by using the communication link or stop receiving the information that is sent from the UE by using the communication link.

Optionally, the first indication message is further used for indicating that the communication link is a non-serving link.

Further, the first receiving module 51 is specifically configured to receive the first indication message that is sent from the RNC by using a dedicated data frame or dedicated signaling or common signaling.

Preferably, the second indication message is specifically used for instructing the base station to: after determining that the communication link is in uplink synchronization, resume sending the TPC command to the UE by using the communication link; and the resuming module 54 is specifically configured to determine, according to the second indication message, that the communication link is in uplink synchronization; and resume sending the TPC command to the UE by using the communication link.

Optionally, the second indication message is further used for instructing the base station to resume processing the TPC command that is sent from the UE by using the communication link or resume receiving the information that is sent from the UE by using the communication link; and the resuming module 54 is further configured to: after the second receiving module 53 receives the second indication message sent from the RNC, according to the second indication message, resume processing the TPC command that is sent from the UE by using the communication link or resume receiving the information that is sent from the UE by using the communication link.

Further, the second receiving module 53 is specifically configured to receive the second indication message that is sent from the RNC by using a dedicated data frame or dedicated signaling or common signaling.

The base station in this embodiment can be configured to execute the technical solutions, executed by a base station, in the foregoing embodiments of the downlink information processing methods according to the present invention, of which the implementation principles and technical effects are similar, and reference may be made to the related record in the foregoing embodiments for details, which are not described herein again.

It should be noted that, in terms of hardware implementation, the first receiving module 51 and the second receiving module 53 may be a receiver or a transceiver. The processing module 52 and the resuming module 54 may be embedded in or independent of a processor of the base station in a form of hardware, or may be stored in a memory of the base station in a form of software, so as to be invoked by the processor to execute operations corresponding to the foregoing modules. The processor may be a CPU, a micro processor, a single chip microcomputer, or the like.

Figure 23:
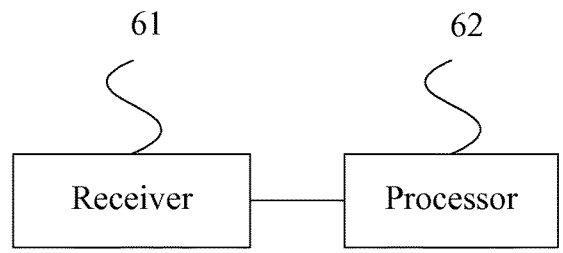
FIG. 23 is a schematic structural diagram of Embodiment 4 of a base station according to the present invention.

FIG. 23 is a schematic structural diagram of Embodiment 4 of a base station according to the present invention. As shown in FIG. 23, the base station in this embodiment may include: a receiver 61 and a processor 62, where the receiver 61 is configured to: when a serving cell of user equipment (UE) is a micro cell, receive a first indication message sent from a radio network controller (RNC), where the first indication message is used for instructing the base station to stop sending a transmit power control (TPC) command to the UE by using a communication link between a cell in an active set and the UE; and the processor 62 is configured to stop, according to the first indication message, sending the TPC command to the UE by using the communication link.

Preferably, the first indication message is specifically used for instructing the base station to: after determining that the communication link between the cell and the UE is in uplink out-of-synchronization, stop sending the TPC command to the UE by using the communication link; and the processor 62 is specifically configured to determine, according to the first indication message, that the communication link is in uplink out-of-synchronization; and stop sending the TPC command to the UE by using the communication link.

Optionally, the first indication message is further used for instructing the base station to stop processing a TPC command that is sent from the UE by using the communication link or stop receiving information that is sent from the UE by using the communication link; and the processor 62 is further configured to: after the receiver 61 receives the first indication message sent from the RNC, according to the first indication message, stop processing the TPC command that is sent from the UE by using the communication link or stop receiving the information that is sent from the UE by using the communication link.

Optionally, the first indication message is further used for indicating that the communication link is a non-serving link.

Further, the receiver 61 is specifically configured to receive the first indication message that is sent from the RNC by using a dedicated data frame or dedicated signaling or common signaling.

Furthermore, the receiver 61 is configured to receive a second indication message sent from the RNC, where the second indication message is used for instructing the base station to resume sending the TPC command to the UE by using the communication link; and the processor 62 is further configured to resume, according to the second indication message, sending the TPC command to the UE by using the communication link.

Preferably, the second indication message is specifically used for instructing the base station to: after determining that the communication link is in uplink synchronization, resume sending the TPC command to the UE by using the communication link; and the processor 62 is specifically configured to determine, according to the second indication message, that the communication link is in uplink synchronization; and resume sending the TPC command to the UE by using the communication link.

Optionally, the second indication message is further used for instructing the base station to resume processing the TPC command that is sent from the UE by using the communication link or resume receiving the information that is sent from the UE by using the communication link; and the processor 62 is further configured to: after the receiver 61 receives the second indication message sent from the RNC, according to the second indication message, resume processing the TPC command that is sent from the UE by using the communication link or resume receiving the information that is sent from the UE by using the communication link.

Further, the receiver 61 is specifically configured to receive the second indication message that is sent from the RNC by using a dedicated data frame or dedicated signaling or common signaling.

The base station in this embodiment can be configured to execute the technical solutions, executed by a base station, in the foregoing embodiments of the downlink information processing methods according to the present invention, of which the implementation principles and technical effects are similar, and reference may be made to the related record in the foregoing embodiments for details, which are not described herein again.

Figure 24:
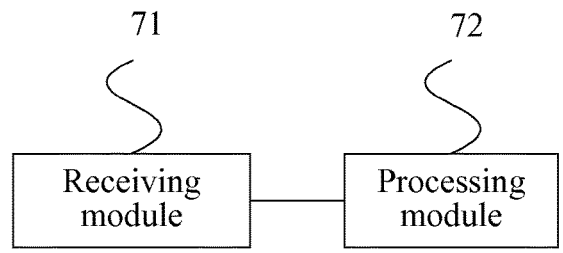
FIG. 24 is a schematic structural diagram of Embodiment 5 of UE according to the present invention.

FIG. 24 is a schematic structural diagram of Embodiment 5 of UE according to the present invention. As shown in FIG. 24, the UE in this embodiment may include: a receiving module 71 and a processing module 72, where the receiving module 71 is configured to receive stop indication information sent from a network side device, where the stop indication information is used for instructing the UE to stop processing downlink information that is sent from a base station by using a communication link between a cell in an active set and the UE; and the processing module 72 is configured to stop, according to the stop indication information, processing the downlink information that is sent from the base station by using the communication link.

Optionally, the receiving module 71 is specifically configured to receive the stop indication information sent from the base station; or receive the stop indication information sent from a radio network controller (RNC).

The UE in this embodiment can be configured to execute the technical solutions, executed by UE, in the foregoing embodiments of the downlink information processing methods according to the present invention, of which the implementation principles and technical effects are similar, and reference may be made to the related record in the foregoing embodiments for details, which are not described herein again.

Figure 25:
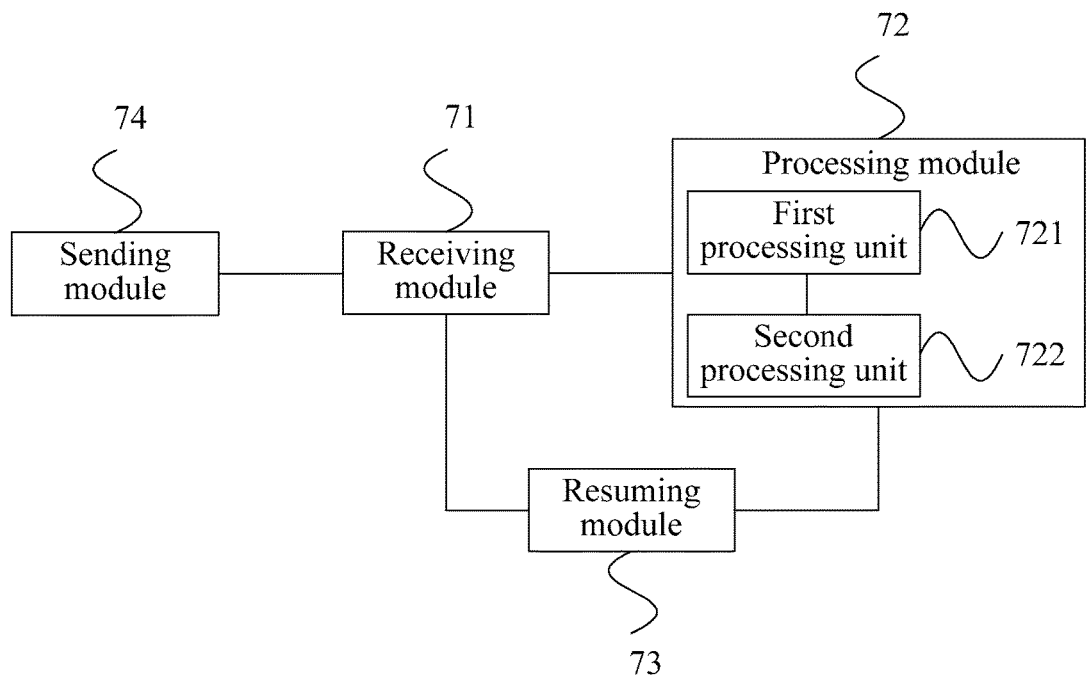
FIG. 25 is a schematic structural diagram of Embodiment 6 of UE according to the present invention.

FIG. 25 is a schematic structural diagram of Embodiment 6 of UE according to the present invention. As shown in FIG. 25, based on the UE structure shown in FIG. 24, further, the UE in this embodiment may further include: a resuming module 73, where the receiving module 71 is further configured to: after the processing module 72 stops, according to the stop indication information, processing the downlink information that is sent from the base station by using the communication link, receive resumption indication information sent from the network side device, where the resumption indication information is used for instructing the UE to resume processing the downlink information that is sent from the base station by using the communication link; and the resuming module 73 is configured to resume, according to the resumption indication information, processing the downlink information that is sent from the base station by using the communication link.

Optionally, the processing module 72 includes: a first processing unit 721 and/or a second processing unit 722, where the first processing unit 721 is configured to stop processing a transmit power control (TPC) command that is sent from the base station by using the communication link; and the second processing unit 722 is configured to stop processing a dedicated physical control channel (DPCCH)/dedicated physical data channel (DPDCH)/F-dedicated physical channel (DPCH)/enhanced dedicated channel relative grant channel (E-RGCH)/enhanced dedicated channel hybrid automatic repeat request acknowledgment indicator channel (E-HICH) that is sent from the base station by using the communication link.

Optionally, the second processing unit 722 is specifically configured to stop receiving the DPCCH/DPDCH/F-DPCH/E-RGCH/E-HICH that is sent from the base station by using the communication link; or receive a DPDCH that is sent from the base station by using the communication link, and stop using a signal on the DPDCH in combination processing; or receive a DPCCH/DPDCH/F-DPCH that is sent from the base station by using the communication link, and stop using a signal on the DPCCH/DPDCH/F-DPCH in signal to interference ratio (SIR) evaluation; or receive an E-RGCH that is sent from the base station by using the communication link, and stop using a relative grant signal on the E-RGCH in combination processing; or receive an E-RGCH that is sent from the base station by using the communication link, and stop sending relative grant information on the E-RGCH to an upper layer of the UE; or receive an E-HICH that is sent from the base station by using the communication link, and stop using a feedback signal on the E-HICH in combination processing; or receive an E-HICH that is sent from the base station by using the communication link, and stop sending feedback information on the E-HICH to an upper layer of the UE.

Optionally, the UE in this embodiment may further include: a sending module 74, where the sending module 74 is configured to: before the receiving module 71 receives the stop indication information sent from the network side device, send capability indication information to the network side device, where the capability indication information is used for indicating that the UE has a capability of stopping processing the downlink information and/or resuming processing the downlink information.

The UE in this embodiment can be configured to execute the technical solutions, executed by UE, in the foregoing embodiments of the downlink information processing methods according to the present invention, of which the implementation principles and technical effects are similar, and reference may be made to the related record in the foregoing embodiments for details, which are not described herein again.

It should be noted that, in terms of hardware implementation, the receiving module 71 may be a receiver or a transceiver, the sending module 74 may be a transmitter or a transceiver, and the receiving module 71 and the sending module 74 may be integrated to form a transceiver unit, which, corresponding to hardware implementation, is a transceiver. The processing module 72 and the resuming module 73 may be embedded in or independent of a processor of the UE in a form of hardware, or may be stored in a memory of the UE in a form of software, so as to be invoked by the processor to execute operations corresponding to the foregoing modules. The processor may be a CPU, a micro processor, a single chip microcomputer, or the like.

Figure 26:
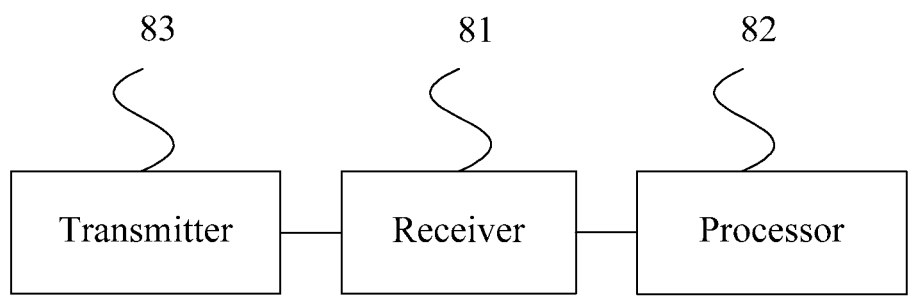
FIG. 26 is a schematic structural diagram of Embodiment 7 of UE according to the present invention.

FIG. 26 is a schematic structural diagram of Embodiment 7 of UE according to the present invention. As shown in FIG. 26, the UE in this embodiment may include: a receiver 81 and a processor 82, where the receiver 81 is configured to receive stop indication information sent from a network side device, where the stop indication information is used for instructing the UE to stop processing downlink information that is sent from a base station by using a communication link between a cell in an active set and the UE; and the processor 82 is configured to stop, according to the stop indication information, processing the downlink information that is sent from the base station by using the communication link.

Optionally, the receiver 81 is specifically configured to receive the stop indication information sent from the base station; or receive the stop indication information sent from a radio network controller (RNC).

Optionally, the receiver 81 is further configured to: after the processor 82 stops, according to the stop indication information, processing the downlink information that is sent from the base station by using the communication link, receive resumption indication information sent from the network side device, where the resumption indication information is used for instructing the UE to resume processing the downlink information that is sent from the base station by using the communication link; and the processor 82 is further configured to resume, according to the resumption indication information, processing the downlink information that is sent from the base station by using the communication link.

Optionally, the processor 82 is specifically configured to stop processing a transmit power control (TPC) command that is sent from the base station by using the communication link; and/or stop processing a dedicated physical control channel (DPCCH)/dedicated physical data channel (DPDCH)/F-dedicated physical channel (DPCH)/enhanced dedicated channel relative grant channel (E-RGCH)/enhanced dedicated channel hybrid automatic repeat request acknowledgment indicator channel (E-HICH) that is sent from the base station by using the communication link.

Further, in a first feasible implementation manner, the processor 82 is specifically configured to stop receiving the DPCCH/DPDCH/F-DPCH/E-RGCH/E-HICH that is sent from the base station by using the communication link.

In a second feasible implementation manner, the receiver 81 is further configured to receive a DPDCH that is sent from the base station by using the communication link, and the processor 82 is specifically configured to stop using a signal on the DPDCH in combination processing.

In a third feasible implementation manner, the receiver 81 is further configured to receive a DPCCH/DPDCH/F-DPCH that is sent from the base station by using the communication link, and the processor 82 is specifically configured to stop using a signal on the DPCCH/DPDCH/F-DPCH in signal to interference ratio (SIR) evaluation.

In a fourth feasible implementation manner, the receiver 81 is further configured to receive an E-RGCH that is sent from the base station by using the communication link, and the processor 82 is specifically configured to stop using a relative grant signal on the E-RGCH in combination processing.

In a fifth feasible implementation manner, the receiver 81 is further configured to receive an E-RGCH that is sent from the base station by using the communication link, and the processor 82 is specifically configured to stop sending relative grant information on the E-RGCH to an upper layer of the UE.

In a sixth feasible implementation manner, the receiver 81 is further configured to receive an E-HICH that is sent from the base station by using the communication link, and the processor 82 is specifically configured to stop using a feedback signal on the E-HICH in combination processing.

In a seventh feasible implementation manner, the receiver 81 is further configured to receive an E-HICH that is sent from the base station by using the communication link, and the processor 82 is specifically configured to stop sending feedback information on the E-HICH to an upper layer of the UE.

Optionally, the UE in this embodiment may further include: a transmitter 83, where the transmitter 83 is configured to: before the receiver 81 receives the stop indication information sent from the network side device, send capability indication information to the network side device, where the capability indication information is used for indicating that the UE has a capability of stopping processing the downlink information and/or resuming processing the downlink information.

The UE in this embodiment can be configured to execute the technical solutions, executed by UE, in the foregoing embodiments of the downlink information processing methods according to the present invention, of which the implementation principles and technical effects are similar, and reference may be made to the related record in the foregoing embodiments for details, which are not described herein again.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. In a communications system in which a first base station continues to transmit to a user equipment (UE) after the UE stops processing information from the first base station, a downlink information processing method comprising:

receiving, by the UE, stop indication information sent from a network side device,
wherein the stop indication information instructs the UE to stop receiving downlink information received over any available dedicated physical control channel (DPCCH), dedicated physical data channel (DPDCH) and/or F-dedicated physical channel (F-DPCH) of a communication link that is one of multiple communication links between the UE and the first base station or any other available base station; and stopping, by the UE according to the stop indication information, the receiving of downlink information received over the available DPCCH, DPDCH and/or F-DPCH while not affecting uplink transmission of the UE over any of the multiple communication links and while the first base station continues to transmit information to the UE such that the UE does not process information over any available DPCCH, DPDCH and/or F-DPCH from the first base station or any of the other any base stations.

2. The method according to claim 1, wherein receiving stop indication information from the network side device further comprises:

receiving, by the UE, the stop indication information sent from the first base station.

3. The method according to claim 1, wherein after stopping the receiving of information over any of the available DPCCH, DPDCH and/or F-DPCH, the method further comprises:

receiving, by the UE, resumption indication information from the network side device, wherein the resumption indication information instructs the UE to resume receiving information over the DPCCH, DPDCH and F-DPCH from the first base station by way of the communication link; and resuming, by the UE according to the resumption indication information, the receiving of downlink information obtained from the DPCCH, DPDCH and F-DPCH.

4. The method according to claim 1, wherein before receiving the stop indication information sent from the network side device, the method further comprises:

sending, by the UE, capability indication information to the network side device, wherein the capability indication information indicates that the UE has a capability to stop receiving downlink information and/or resuming the receiving of downlink information obtained from the DPCCH, DPDCH and F-DPCH.

5. The method according to claim 1, wherein receiving stop indication information from a network side device further comprises receiving, by the UE, the stop indication information sent from a radio network controller (RNC).

6. In a communications system in which a first base station continues to transmit to a user equipment (UE) after the UE stops processing information from the first base station, the UE comprising:

a processor;
a receiver configured to cooperate with the processor to receive stop indication information sent from a network side device,
wherein the stop indication information instructs the UE to stop receiving downlink information over any available dedicated physical control channel (DPCCH), dedicated physical data channel (DPDCH), or F-dedicated physical channel (F-DPCH) of a communication link that is one of multiple communication links between a base station and the UE and the first base station or any other available base station; and the processor configured to stop, according to the stop indication information, the receiving of downlink information received over the available DPCCH, DPDCH and/or F-DPCH while not affecting uplink transmission of the UE over any of the multiple communication links and while the first base station continues to transmit information to the UE such that the UE does not process information over any available DPCCH, DPDCH and/or F-DPCH from the first base station or any of the other any base stations.

7. The UE according to claim 6, wherein the network side device is the first base station.

8. The UE according to claim 6, wherein the receiver is further configured to cooperate with the processor to receive resumption indication information sent from the network side device after the processor stops receiving downlink information over any of the available DPCCH, DPDCH and F-DPCH from the first base station, wherein the resumption indication information instructs the UE to resume receiving downlink information provided by each of the DPCCH, DPDCH and F-DPCH from the first base station by way of the communication link; and the processor is further configured to resume, according to the resumption indication information, receiving downlink information from the DPCCH, DPDCH and F-DPCH using the communication link.

9. The UE according to claim 6, wherein the processor is further configured to stop processing a transmit power control (TPC) command from the first base station by way of the communication link.

10. The UE according to claim 6, further comprising:
a transmitter configured to cooperate with the processor to send capability indication information to the network side device before the receiver receives the stop indication information sent from the network side device, wherein the capability indication information indicates that the UE is capable of stopping the receiving of downlink information and/or resuming the receiving of the downlink information.

11. The UE according to claim 6, wherein the network side device is a radio network controller (RNC).

12. In a communications system in which a first base station continues to transmit to a user equipment (UE) after the UE stops processing information from the first base station, a downlink information control method comprising:
determining, by a radio network controller (RNC), whether a first communication link between a micro cell and the UE meets a communication quality requirement; and
sending, by the RNC, a stop message to the UE when the first communication link does not meet the communication quality requirement, wherein the stop message instructs the UE to stop receiving and processing downlink information over any available dedicated physical control channel (DPCCH), dedicated physical data channel (DPDCH) and/or F-dedicated physical channel (F-DPCH) of the first base station or any other available base station while the first base station continues to transmit information to the UE such that the UE does not process information over any available DPCCH, DPDCH and/or F-DPCH from the first base station or any of the other base stations.

13. The method according to claim 12, wherein the RNC sends a first indication message to the first base station for instructing the first base station to (a) stop processing a transmit power control (TPC) command sent from the UE by way of the communication link or (b) stop receiving uplink information sent from the UE by way of the communication link.

14. In a communications system in which a base station continues to transmit to a user equipment (UE) after the UE stops processing information from the base station, a downlink information control method comprising:
receiving, by a base station, a first indication message from a radio network controller (RNC) when a cell serving the UE is a micro cell, wherein the first indication message instructs the base station to stop sending a transmit power control (TPC) command to the UE by way of a communication link between the base station and the UE when the communication link between the base station and the UE does not meet a signal quality requirement;
sending, by the base station, stop indication information to the UE, wherein the stop indication information instructs the UE to stop receiving downlink information received over any available dedicated physical control channel (DPCCH), dedicated physical data channel (DPDCH) and/or F-dedicated physical channel (F-DPCH) of the communication link that is one of multiple communication links between the base station and the UE; and
stopping, by the base station according to the first indication message, sending the TPC command to the UE by way of the communication link while continuing to otherwise transmit information to the UE.

15. The method according to claim 14, wherein the first indication message is further used for instructing the base station to (a) stop processing a TPC command sent from the UE by way of the communication link or (b) stop receiving uplink information sent from the UE by way of the communication link; and
after receiving the first indication message from an RNC, the method further comprises (a) stopping, by the base station, the processing of the TPC command from the UE by way of the communication link or (b) stopping the receiving of the uplink information from the UE by way of the communication link.

16. In a communications system in which a base station continues to transmit to a user equipment (UE) after the UE stops processing information from the base station, a radio network controller (RNC) comprising:
a processor configured to determine whether a first communication link between a micro cell and the UE meets a first communication quality requirement; and
a transmitter configured to cooperate with the processor and, when a second communication link between the base station and the UE does not meet a second communication quality requirement,
a) send a first indication message to the base station, wherein the first indication message instructs the base station to stop sending a transmit power control (TPC) command to the UE by way of the second communication link, and
b) send stop indication information to the UE, wherein the stop indication information instructs the UE to stop receiving downlink information received over any available dedicated physical control channel (DPCCH), dedicated physical data channel (DPDCH) and/or F-dedicated physical channel (F-DPCH) of the second communication link that is one of multiple communication links between the base station and the UE while the base station continues to transmit information to the UE.

17. The RNC according to claim 16, wherein the first indication message is further used for instructing the base station to (a) stop processing a TPC command sent from the UE by way of the communication link or (b) stop receiving uplink information sent from the UE by way of the second communication link.

18. In a communications system in which a base station continues to transmit to a user equipment (UE) after the UE stops processing information from the base station, the base station comprising:
- a processor;
- a receiver configured to cooperate with the processor to receive a first indication message from a radio network controller (RNC) when a cell serving the UE is a micro cell, wherein the first indication message is used for instructing the base station to stop sending a transmit power control (TPC) command to the UE by way of a communication link between the base station and the UE when the communication link between the base station and the UE does not meet a signal quality requirement;
- a transmitter configured to cooperate with the processor to send stop indication information to the UE, wherein the stop indication information instructs the UE to stop receiving downlink information received over any available dedicated physical control channel (DPCCH), dedicated physical data channel (DPDCH) and/or F-dedicated physical channel (F-DPCH) of the communication link that is one of multiple communication links between the base station and the UE; and
- the processor configured to stop, according to the first indication message, sending the TPC command to the UE by way of the communication link while continuing to cooperate with the transmitter to send downlink information to the UE after sending the stop indication information to the UE.

19. The base station according to claim 18, wherein the first indication message is further used for instructing the base station to (a) stop processing a TPC command from the UE by way of the communication link or (b) stop receiving uplink information sent from the UE by way of the communication link; and
- the processor is further configured to respond to the first indication message by (a) stop processing the TPC command from the UE by way of the communication link or (b) stop receiving uplink information from the UE by way of the communication link.

* * * * *